US011321126B2

(12) United States Patent
Cayssials

(10) Patent No.: US 11,321,126 B2
(45) Date of Patent: May 3, 2022

(54) MULTIPROCESSOR SYSTEM FOR FACILITATING REAL-TIME MULTITASKING PROCESSING

(71) Applicant: Ricardo Luis Cayssials, Bahia Blanca (AR)

(72) Inventor: Ricardo Luis Cayssials, Bahia Blanca (AR)

( * ) Notice: Subject to any disclaimer, the term of this patent is extended or adjusted under 35 U.S.C. 154(b) by 0 days.

(21) Appl. No.: 17/005,192

(22) Filed: Aug. 27, 2020

(65) Prior Publication Data

US 2022/0066817 A1 Mar. 3, 2022

(51) Int. Cl.
| | |
|---|---|
| *G06F 9/48* | (2006.01) |
| *G06F 15/80* | (2006.01) |
| *G06F 9/54* | (2006.01) |
| *G06F 9/38* | (2018.01) |

(52) U.S. Cl.
CPC .......... *G06F 9/4881* (2013.01); *G06F 9/3836* (2013.01); *G06F 9/4812* (2013.01); *G06F 9/542* (2013.01); *G06F 15/80* (2013.01)

(58) Field of Classification Search
None
See application file for complete search history.

(56) References Cited

U.S. PATENT DOCUMENTS

| | | | | |
|---|---|---|---|---|
| 7,401,112 B1* | 7/2008 | Matz | ..................... | G06F 9/5038 |
| | | | | 379/265.02 |
| 7,990,989 B2* | 8/2011 | Jensen | ..................... | H04L 47/50 |
| | | | | 370/412 |
| 10,180,855 B1 | 1/2019 | Koryakin et al. | | |
| 10,754,706 B1* | 8/2020 | Mo | ........................ | G06F 9/4887 |
| 2003/0191795 A1* | 10/2003 | Bernardin | ............... | G06F 9/505 |
| | | | | 718/105 |
| 2008/0040720 A1* | 2/2008 | McKenney | ............. | G06F 9/526 |
| | | | | 718/103 |
| 2015/0074676 A1* | 3/2015 | Maruyama | ............ | G06F 9/4812 |
| | | | | 718/103 |

FOREIGN PATENT DOCUMENTS

| | | |
|---|---|---|
| CN | 106155792 B | 11/2016 |
| CN | 108710536 A | 10/2018 |
| WO | WO2013123251 A1 | 8/2013 |
| WO | WO2018050243 A1 | 3/2018 |

* cited by examiner

*Primary Examiner* — Michael Sun

(57) ABSTRACT

Disclosed herein is a multiprocessor system for facilitating real-time multitasking processing. The multiprocessor system may include a task scheduler and a plurality of processors. Further, the task scheduler may be configured for receiving an event associated with the multiprocessor system, evaluating a plurality of task priorities associated with a plurality of tasks based on the event, determining a plurality of new task priorities for the plurality of tasks and assigning the plurality of tasks to a plurality of lists based on the determining. Further, the plurality of processors may be communicatively coupled with the task scheduler. Further, the plurality of processors serves the plurality of lists. Further, a processor of the plurality of processors may be configured for processing the plurality of tasks assigned to a list of the plurality of lists based on the plurality of new task priorities.

18 Claims, 52 Drawing Sheets

| Structure | Description |
|---|---|
| KCB | Kernel Control Block |
| TCB | Task Control Block |
| ECB | Event Control Block |
| RCB | Resource Control Block |
| Semaphore | Semaphore dependent RCB |
| Message | Message dependent RCB |
| MCB | Message Control Block |
| SCB | Signal Control Block |
| LCB | List Control Block |
| PCB | Processor Control Block |
| RRDS | Resource Request Data Structure |

1200 — Structure/KCB
1201 — TCB
1202 — ECB
1203 — RCB
1204 — Semaphore
1205 — Message
1206 — MCB
1207 — SCB
1208 — LCB
1209 — PCB
1210 — RRDS

FIG. 12

| | Name | Number of Lists | Description |
|---|---|---|---|
| 1500 | | | |
| 1501 | ECBAEL | Up to 1 per ECB | ECB Associated Event List |
| 1502 | ECBASL | Up to 1 per ECB | ECB Associated Signal List |
| 1503 | ECBFL | 1 | ECB Free List |
| 1504 | ECBTL | 1 | ECB Time List |
| 1505 | LCBFPL | Up to 1 per LCB | LCB Free Processor List |
| 1506 | LCBL | 1 | LCB List |
| 1507 | MCBFL | 1 | MCB Free List |
| 1508 | MCBQL | Up to 1 per RCB | MCB Message Queue List |
| 1509 | RCBASL | Up to 1 per RCB | RCB Associated Signal List |
| 1510 | RCBFL | 1 | RCB Free List |
| 1511 | RCBGEL | Up to 1 per RCB | RCB Granted Event List |
| 1512 | RCBWEL | Up to 1 per RCB | RCB Waiting Event List |
| 1513 | RRDSASL | Up to 1 per RRDS | RRDS Associated Signal List |
| 1514 | RRDSFL | 1 | RRDS Free List |
| 1515 | SCBFL | 1 | SCB Free List |
| 1516 | TCBAEL | Up to 1 per TCB | TCB Associated Event List |
| 1517 | TCBASL | Up to 1 per TCB | TCB Associated Signal List |
| 1518 | TCBFL | 1 | TCB Free List |
| 1519 | TCBPSL | Up to 1 per TCB | TCB Pending Signal List |
| 1520 | TCBRDYL | Up to 1 per LCB | TCB Ready List |
| 1521 | TCBRUNL | Up to 1 per LCB | TCB Running List |
| 1522 | TCBWL | 1 | TCB Waiting List |
| 1523 | KCBASL | 1 | KCB Associated Signal List |
| | SCBAPSL | Up to 1 per SCB | SCB Associated Pending Signal List |

FIG. 15

TASK COMPONENTS AND STRUCTURE

MULTIPROCESSOR SYSTEM FOR FACILITATING REAL-TIME MULTITASKING PROCESSING

FIELD OF THE INVENTION

Generally, the present disclosure relates to the field of electrical computers and digital processing systems. More specifically, the present disclosure relates to a multiprocessor system for facilitating real-time multitasking processing.

BACKGROUND OF THE INVENTION

Operating systems help designers to implement applications on a computer system. Ideally, an operating system includes different components, so it should be possible to design implementations at a high abstraction level from the target hardware architecture. One of the most common components of an operating system is the scheduler. The scheduler implements a priority discipline that determines the highest priority task for execution. The scheduler may be implemented as a timer interrupt routine that periodically executes every timer tick. The time between two consecutive timer ticks is adopted as the time unit for the system and, consequently, the time precision depends on the selection of this time period. Every time the scheduler is executed, the status of the system updates and a task switch is performed if the highest priority task requires execution changes. This scheduler mechanism produces system overhead when the scheduler does not produce any change in the system status. In a timer-tickless operating system, the timer interrupt is programmed for the next time timed event. Therefore, the processor is interrupted only when a system update is required. Moreover, in a timer-tickless mechanism, the time precision of the system may be orders of magnitude greater than in a timer-tick mechanism, since the lower limit of the time unit is the system clock period.

In multiprocessor systems, the scheduler may be implemented in three main configurations namely master-slave, separate scheduler, and floating scheduler. Further, the master-slave configuration may include the scheduler always executing on the same processor, named the master, and determines the work for all slave processors. The master processor oversees synchronization and determines the execution of tasks among the slave processors. Further, the separate scheduler may include each processor executing its own scheduler. Processors may share resources. Tasks are assigned to processors and each processor's scheduler determines the next task to be executed among those assigned to that processor. Further, the floating scheduler may include any processor executing the scheduler. Load balance among processors is easily achieved dynamically during runtime. This configuration is commonly used in symmetrical multiprocessor architectures.

Each of these configurations requires synchronizing the execution of tasks among all processors.

Additionally, there exist two main mechanisms for scheduling tasks in multiprocessor systems namely global scheduling and partitioned scheduling. Further, the global scheduling includes all processors serve a single ready queue of tasks and tasks may be executed by any of the available processors. Further, the partitioned scheduling includes tasks statically assigned to processors during the offline phase or dynamically assigned during runtime and each processor is scheduled individually.

While global scheduling balances the load of the processors, partitioned scheduling is more predictable, in some cases, because the interactions among the group of tasks that share a processor are known.

Different priority disciplines, ranging from static to dynamic, have been proposed in the literature to schedule tasks during runtime. In static priority disciplines, the priority of the task is assigned at system startup and remains fixed during runtime. The Fixed Priority (FP) discipline is widely used because of its low runtime overhead, its low complexity to implement and its predictability.

In a dynamic priority discipline, the priority of a task may change during runtime. For instance, in a round-robin priority discipline (RR), the priority of a task is reduced proportionally to the time it is executed in order to produce a balanced execution of tasks. The proposed earliest-deadline first priority discipline (EDF) is a real-time one in which the highest priority is assigned to the task with the earliest deadline.

There have been many proposals for commercial and academic operating systems with different scheduling mechanisms, priority disciplines, fault-tolerant applications, energy consumption strategies and number of processors. However, each of them implements one of the above alternatives and they cannot be partially changed.

Therefore, there is a need for an improved multiprocessor system for facilitating real-time multitasking processing that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a multiprocessor system for facilitating real-time multitasking processing, the multiprocessor system may include a task scheduler and a plurality of processors. Further, the task scheduler may be configured for receiving an event associated with the multiprocessor system. Further, the task scheduler may be configured for evaluating a plurality of task priorities associated with a plurality of tasks based on the event. Further, the task scheduler may be configured for determining a plurality of new task priorities for the plurality of tasks. Further, the task scheduler may be configured for assigning the plurality of tasks to a plurality of lists based on the determining Further, the plurality of processors may be communicatively coupled with the task scheduler. Further, the plurality of processors serves the plurality of lists. Further, a processor of the plurality of processors may be configured for processing the plurality of tasks assigned to a list of the plurality of lists based on the plurality of new task priorities.

Further disclosed herein is a multiprocessor system for facilitating real-time multitasking processing. Further, the multiprocessor system may include a task scheduler and a plurality of processors. Further, the task scheduler may be configured for receiving a plurality of events associated with the multiprocessor system. Further, each event of the plurality of events may be associated with a plurality of event characteristics. Further, the task scheduler may be configured for analyzing the plurality of events. Further, the task scheduler may be configured for determining an event of the plurality of events based on the analyzing. Further, the task scheduler may be configured for evaluating a plurality of task priorities associated with a plurality of tasks based on the event. Further, the task scheduler may be configured for determining a plurality of new task priorities for the plurality of tasks. Further, the task scheduler may be configured for assigning the plurality of tasks to a plurality of lists based on the determining. Further, the plurality of processors may be communicatively coupled with the task scheduler. Further, the plurality of processors serves the plurality of lists. Further, a processor of the plurality of processors may be configured for processing the plurality of tasks assigned to a list of the plurality of lists based on the plurality of new task priorities.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 12 shows an embodiment of the data structures of the computer program.

FIG. 15 shows an embodiment of the different data structure lists of the computer program.

DETAILED DESCRIPTION OF THE INVENTION

Figure 1:
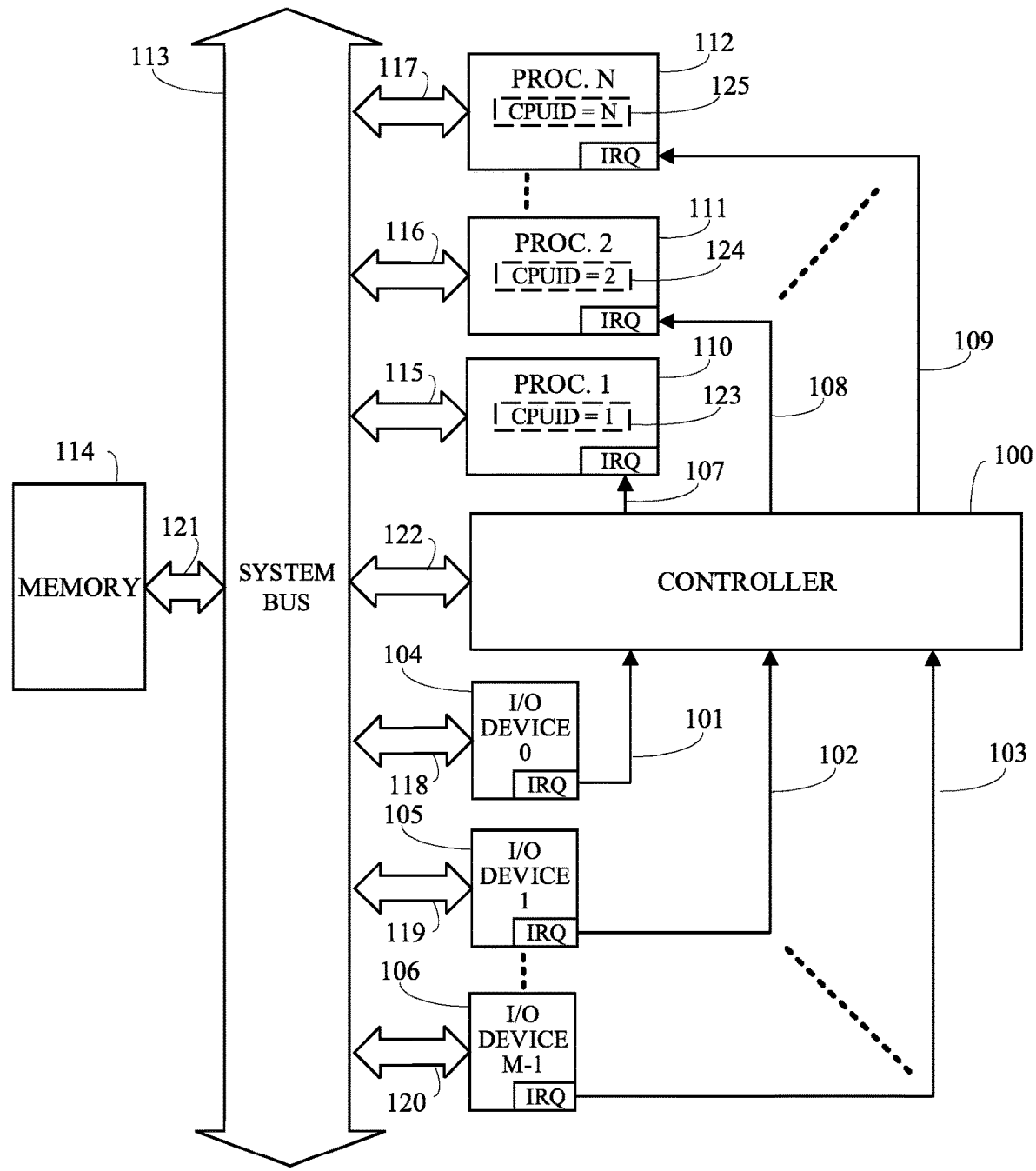
FIG. 1 shows an embodiment of the controller apparatus in a multiprocessor architecture, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of a multiprocessor system for facilitating real-time multitasking processing, embodiments of the present disclosure are not limited to use only in this context.

Further, one or more steps of the method disclosed herein may be initiated, maintained, controlled and/or terminated based on a control input received from one or more devices operated by one or more users such as, for example, but not limited to, an end-user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human-readable secret data (e.g. username, password, passphrase, PIN, secret question, secret answer, etc.) and/or possession of a machine-readable secret data (e.g. encryption key, decryption key, bar codes, etc.) and/or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human-readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor, etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Overview:

The present disclosure describes a multiprocessor system for facilitating real-time multitasking processing. Further, each task is assigned to a list and one or more processors may serve that list. Processors may serve one or more lists of tasks, thereby allowing the predictability of partitioned scheduling with a flexible balance of processor loads. Scheduling overhead can be reduced using a timer-tickless scheduler. Floating scheduling reduces the overhead for the highest priority tasks and isolates the design of the system from the number of processors of the hardware architecture. The generic feature allows partial configuring global and partitioned scheduling. The present disclosure describes a multiprocessor computer system for managing the execution of several tasks. Scheduling mechanism, priority disciplines, number of processors and fault-tolerance strategies can be global or partitioned and partially or totally implemented in a generic, timer-tickless and event-driven computer program. The event-driven nature of the computer program lets it produce low-overhead and high predictability. The frozen and unfrozen modes allow a responsive mechanism suitable for both fault tolerance implementations and the management of saturated situations.

In a multiprocessor architecture, a set of N processors shares a common memory and M input/output devices through a common bus. FIG. 1 shows an embodiment of the controller apparatus 100 in a multiprocessor architecture. The controller apparatus 100 receives a plurality of device interrupt requests (DIRQs) 101-103 from a plurality of input/output peripheral devices 104-106. The controller apparatus 100 sends a plurality of processor interrupt requests (PIRQs) 107-109 to a plurality of processors 110-112-. The system bus 113 allows the plurality of processors 110-112 to share the system memory 114. Accesses to the system bus 113 can be done, among others, through a plurality of processor ports 115-117, a plurality of input/output peripheral device ports 118-120, the memory port 121 or the controller apparatus port 122. Each processor of the plurality of processors 110-112 has a unique internal identification register CPUID 123-125.

Controller Apparatus Hardware

Figure 2:
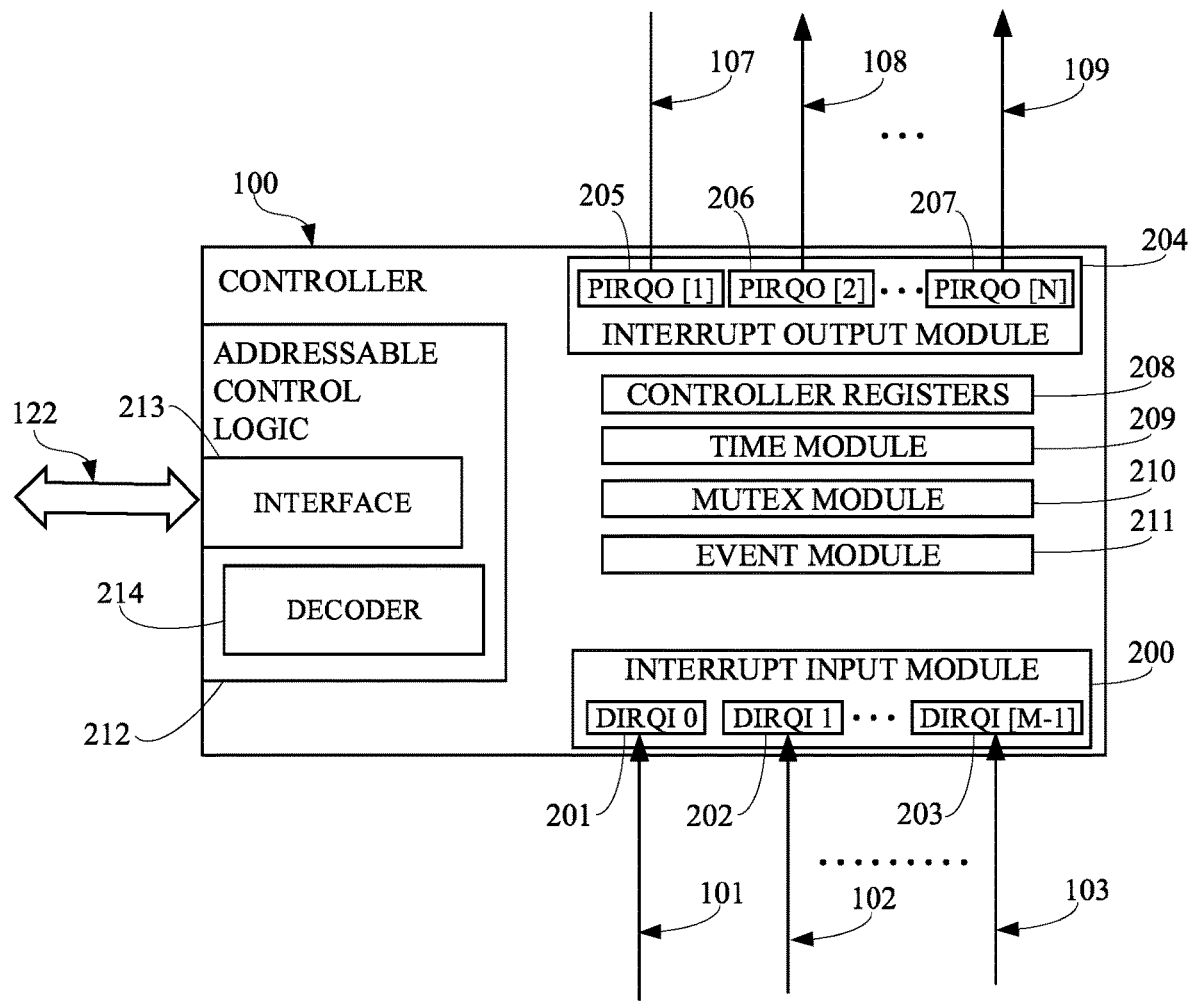
FIG. 2 shows the controller apparatus in accordance with some embodiments.

As shown in FIG. 2, the controller apparatus 100 includes the interrupt input module 200 containing a plurality of device interrupt request inputs (DIRQIs) 201-203 that receives the plurality of device interrupt requests (DIRQs) 101-103, the interrupt output module 204 containing a plurality of processor interrupt request outputs (PIRQOs) 205-207 sending the plurality of processor interrupt requests (PIRQs) 107-109, the controller registers 208, the time module 209, the mutex module 210, the event module 211 and the addressable control logic 212 including an interface element 213 and a decoder element 214.

Set of Registers

Figure 3:
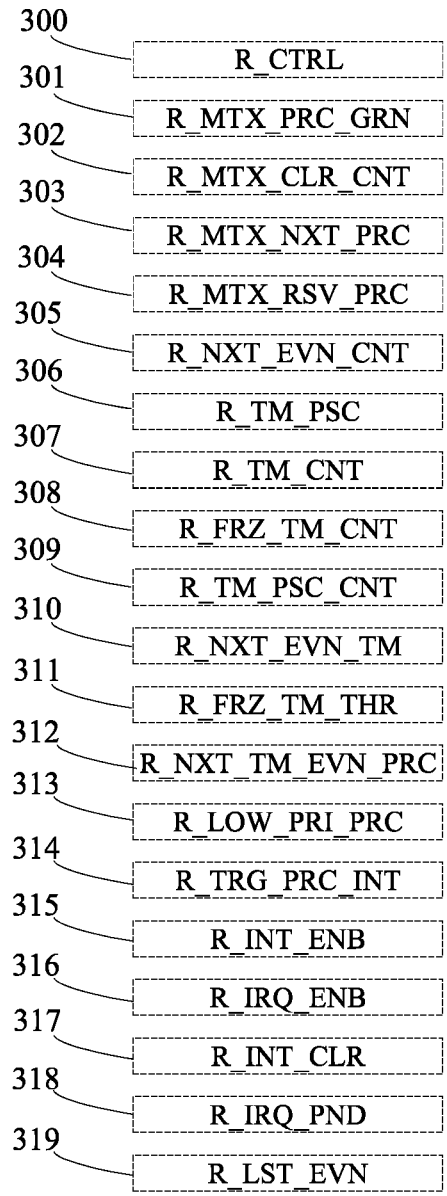
FIG. 3 shows an embodiment of the controller registers.

The behavior of the controller apparatus 100 is determined by a set of controller registers 208. FIG. 3 shows an embodiment of the controller registers 208. Some of these registers may be configured through the interface element 213. For instance, the R_CTRL register 300 can be used to configure some functions of the controller apparatus 100 such as enabling or disabling the frozen mode.

Figure 4:
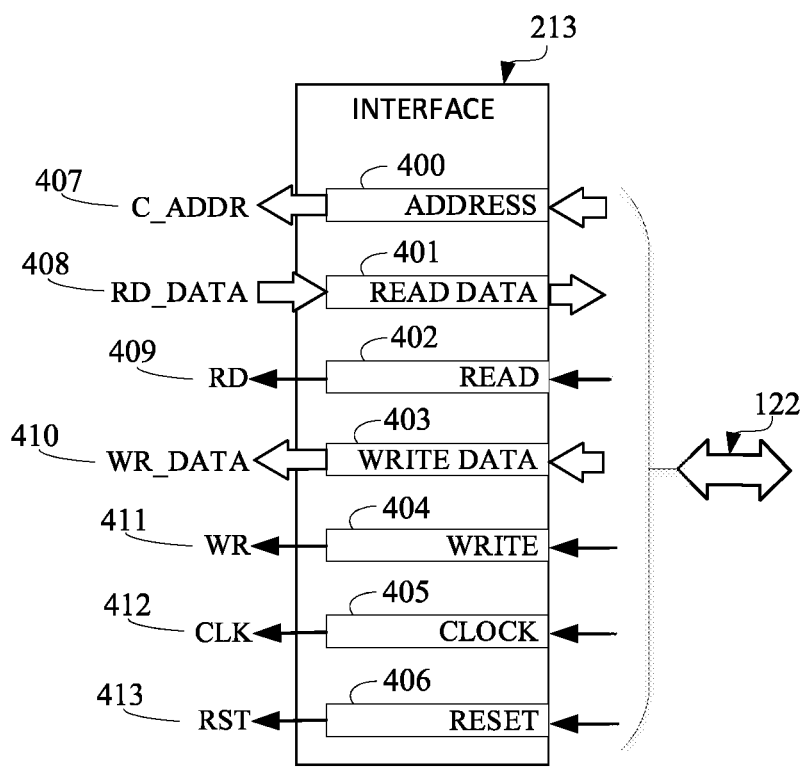
FIG. 4 is a representation of an embodiment of a functional signal of the system bus
Figure 5:
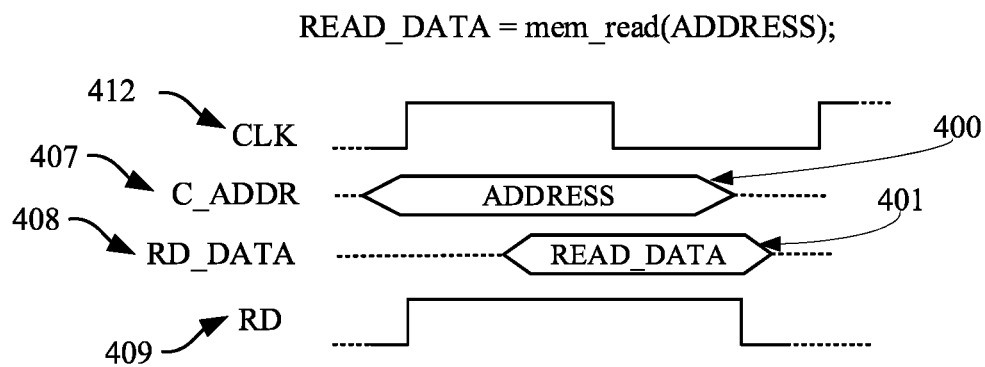
FIG. 5 is a representation of memory read sequence in the system bus, in accordance with some embodiments.
Figure 6:
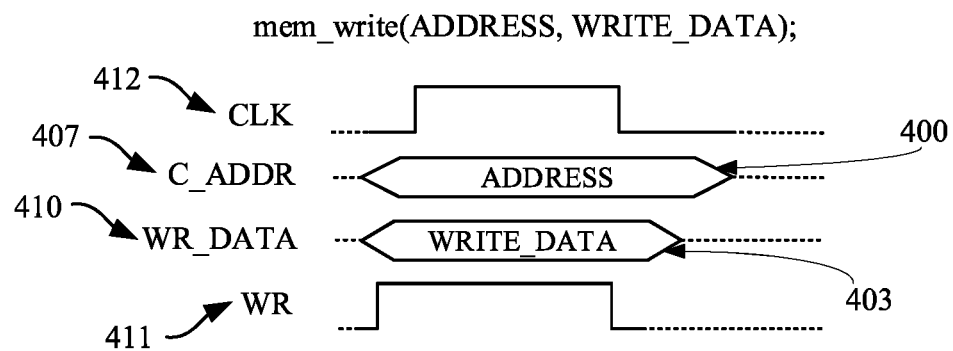
FIG. 6 is a representation of a memory write sequence in the system bus, in accordance with some embodiments.

FIG. 4 shows an embodiment of the interface element 213 that takes: the address bus 400, the read data bus 401, the read signal 402, the write data bus 403, the write signal 404, the system clock signal 405 and the system reset signal 406 from the controller apparatus port 122 and maps them into the C_ADDR bus 407, the RD_DATA bus 408, the RD signal 409, the WR_DATA bus 410, the WR signal 411, the CLK signal 412 and RST signal 413, respectively. The CLK signal 412 is the clock signal for all the registers of the controller apparatus 100 and the RST signal 413 is the reset signal for all the registers of the controller apparatus 100. FIG. 5 shows an embodiment of a timing waveform of a read transaction when a READ_DATA=mem_read(ADDRESS) instruction is executed by a processor of the plurality of processors 110-112 connected to the controller apparatus port 122. FIG. 6 shows an embodiment of a timing waveform of a write transaction when a mem_write(ADDRESS, WRITE_DATA) instruction is executed by a processor of the plurality of processors 110-112 connected to the controller apparatus port 122. The input/output peripheral devices 104-106 and the controller registers 208 are mapped in the system memory 114 of the system and they can be accessed by the plurality of processors 110-112 through their assigned address.

Figure 7:
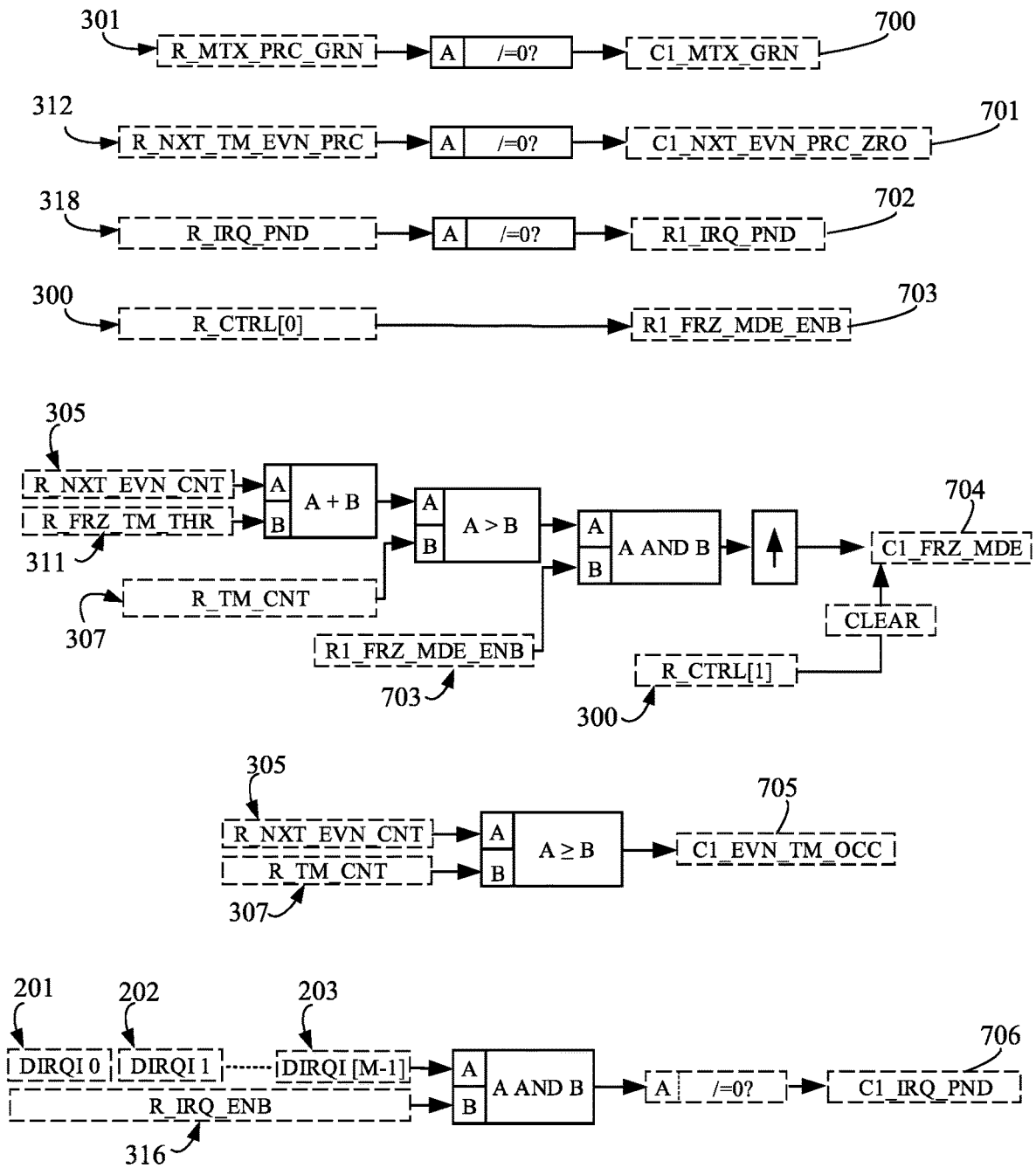
FIG. 7 shows an embodiment of the internal signals of the controller apparatus.

FIG. 7 shows an embodiment of internal signals used to indicate special states of the controller apparatus 100 logic.

Mutex Module 210

In a multiprocessor system, a hardware-implemented mutex is required to preserve coherency in critical sections among the plurality of processors 110-112. The R_MTX_PRC_GRN register 301, it is called the mutex register, is the main register of the mutex module 210 and it is used to implement a critical section among the plurality of processors 110-112. A processor of the plurality of processors 110-112 may execute a critical section when the value of the R_MTX_PRC_GRN register 301 is equal to its internal identification register CPUID 123-125. The R_MTX_PRC_GRN register 301 can take three different kinds of values:

0: there is no processor of the plurality of processors 110-112 that grants the critical section. A processor of the plurality of processors 110-112 may request the mutex by executing a mem_write(ADDR_MTX_GRN, internal identification register CPUID 123-125) instruction when the R_MTX_PRC_GRN register 301 equals to 0.

values from 1 to M: the critical section is granted to the processor of the plurality of processors 110-112 with internal identification register CPUID 123-125 equal to the R_MTX_PRC_GRN register 301.

constant MTX_BLCK: the critical section is blocked when the R_MTX_CLR_CNT register 302 is different from 0. The value MTX_BLCK is assigned to the R_MTX_PRC_GRN register 301 when the critical section is released by a processor of the plurality of processors 110-112, which grants it by executing a mem_write(ADDR_MTX_RLS, internal identification register CPUID 123-125) instruction. This mechanism blocks the critical section until the count of the R_MTX_CLR_CNT register 302 reaches a value equal to 0. The next processor of the plurality of processors 110-112 to grant the critical section is stored in the R_MTX_NXT_PRC register 303. The R_MTX_NXT_PRC register 303 may be used by the current granted critical section processor of the plurality of processors 110-112 to avoid competition among the plurality of processors 110-112 that are requesting access to the mutex.

The internal signal C1_MTX_GRN signal 700 is 0 when the R_MTX_PRC_GRN register 301 is equal to 0; otherwise, it is 1.

Before a processor of the plurality of processors 110-112 starts executing a critical section of the computer program, the processor of the plurality of processors 110-112 may request the mutex by repeatedly executing the mem_write (ADDR_MTX_GRN, internal identification register CPUID 123-125) instruction and verifying that the mutex is granted to it by checking that internal identification register CPUID 123-125=mem_read(R_MTX_PRC_GRN). However, this mechanism may be inefficient when several processors of the plurality of processors 110-112 simultaneously request the mutex. A more efficient embodiment may be implemented using the R_MTX_RSV_PRC register 304. Each processor of the plurality of processors 110-112 sets the corresponding bit of the R_MTX_RSV_PRC register 304 according to its internal identification register CPUID 123-125 executing the mem_write(ADDR_MTX_RSV_SET, internal identification register CPUID 123-125) instruction when the processor of the plurality of processors 110-112 requests access to the mutex. The controller apparatus 100 halts a processor of the plurality of processors 110-112 when its corresponding bit is set to 1 in the R_MTX_RSV_PRC register 304 and the mutex is not granted to it. An embodiment of the processor halt mechanism may be implemented by asserting a wait_request signal for each processor in the interface element 213 of the controller apparatus 100. The processor of the plurality of processors 110-112 that grants the critical section checks the R_MTX_RSV_PRC register 304 and sets the R_MTX_NXT_PRC register 303 with the value of the chosen requesting processor of the plurality of processors 110-112 before leaving the critical section. In this way, a mechanism may be implemented for sharing the critical section among the plurality of processors 110-112. If no value is set in the R_MTX_NXT_PRC register 303 of the controller apparatus 100, then the critical section is assigned to one of the plurality of processors 110-112 with active bits in the R_MTX_RSV_PRC register 304.

Time Module 209

Figure 8:
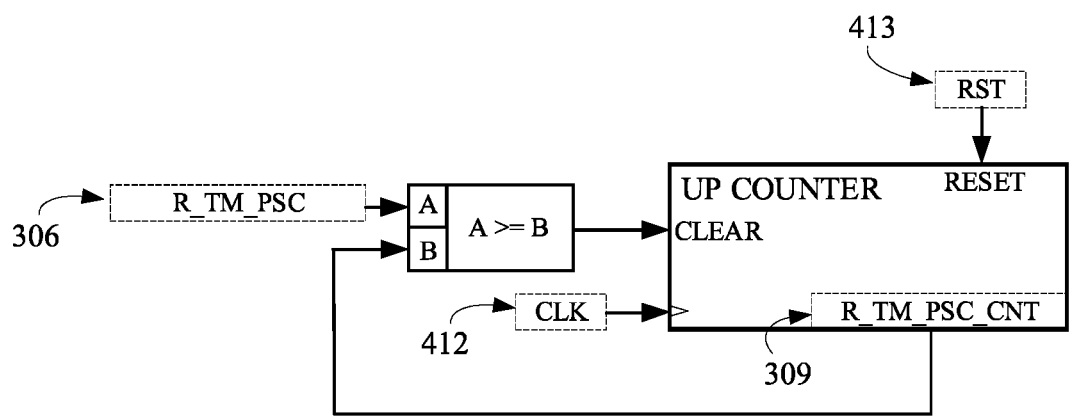
FIG. 8 shows an embodiment of the time prescaler module of the controller apparatus.
Figure 9:
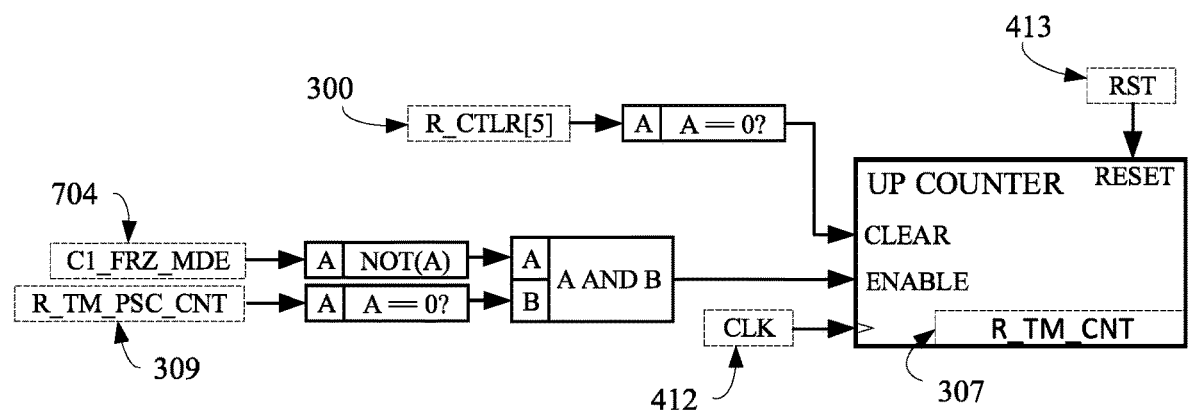
FIG. 9 shows an embodiment of the time module of the controller apparatus.
Figure 10:
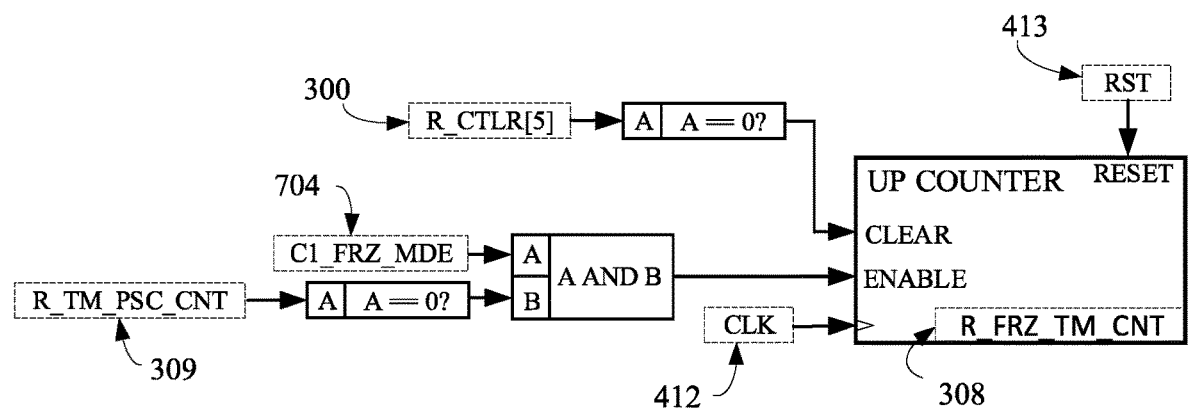
FIG. 10 shows an embodiment of the time frozen module of the controller apparatus.

Most applications require time support. FIG. 8-10 show an embodiment of the time module 209 of the controller apparatus 100. The CLK signal 412 is prescaled through the up counter R_TM_PSC_CNT register 309, as shown in FIG. 8. The modulus of the up-counter R_TM_PSC_CNT register 309 is equal to the value configured in the R_TM_PSC register 306 plus 1. The R_TM_PSC register 306 should be configured to obtain the desired system time unit, prescaling the CLK signal 412. The value stored in the R_TM_PSC register 306 is set by executing a mem_write (ADDR_TM_PSC, data) instruction.

The controller apparatus 100 may stay in one of two time modes:

1) unfrozen mode: the controller apparatus 100 is in unfrozen mode when the following condition holds:

$$(R\_FRZ\_TM\_THR \text{ register } 311 + R\_NXT\_EVN\_CNT \text{ register } 305 < R\_TM\_CNT \text{ register } 307 \text{ and } C1\_FRZ\_MDE\_ENB \text{ signal } 703 == 1) \quad (1)$$
$$\text{or}$$
$$C1\_FRZ\_MDE\_ENB \text{ signal } 703 == 0$$

An embodiment of Equation 1 is implemented by the C1_FRZ_MDE signal 704. The up-counter R_TM_CNT register 307, it is called the time counting register, is incremented at the system time unit rate when the controller apparatus 100 is in unfrozen mode. FIG. 9 shows an embodiment of the up-counter R_TM_CNT register 307.

2) frozen mode: the controller apparatus 100 is in frozen mode when the C1_FRZ_MDE_ENB signal 703 is equal to one and the time elapsed since the next time event, stored in the R_NXT_EVN_CNT register 305, is greater than the threshold time configured in the R_FRZ_TM_THR register 311. In frozen mode, the up-counter R_FRZ_TM_CNT register 308, it is called the frozen time counting register, is incremented at the system time unit rate. FIG. 10 shows an embodiment of the up-counter R_FRZ_TM_CNT register 308.

During runtime, the normal mode should be the unfrozen mode. In this mode, the system time is held in the up counter R_TM_CNT register 307. The controller apparatus 100 holds the next time event in the R_NXT_EVN_CNT register 305. Each time that the up counter R_TM_CNT register 307 reaches the value stored in the R_NXT_EVN_CNT register 305, a time event is considered to have occurred. If the code associated with the time event is being executed by a system processor of the plurality of processors 110-112 (the C1_NXT_EVN_PRC_ZRO signal 701 is asserted), then the processor of the plurality of processors 110-112 executing such code is interrupted; otherwise, the system processor 110-112 with the lowest priority is interrupted. The interrupted system processor of the plurality of processors 110-112 should execute the code to process the time event and then the R_NXT_EVN_CNT register 305 should be updated with the next system event. In this mode, the events are processed according to the time they happen. However, if the event processing takes longer than a certain threshold, it becomes convenient in some applications to freeze this dynamic in order to avoid a domino effect over the system events. When the frozen mode is enabled (C1_FRZ_MDE_ENB signal 703 is equal to one) and the next event remains unprocessed, with an interval equal to or greater than the time defined in the R_FRZ_TM_THR register 311, then the controller apparatus 100 switches to frozen mode. In frozen mode, the up-counter R_TM_CNT register 307 is frozen and the up-counter R_FRZ_TM_CNT register 308 is incremented at the system time unit rate. Consequently, the up-counter R_TM_CNT register 307 keeps the time (in system time units) that the controller apparatus 100 remains in unfrozen mode, while the up counter R_FRZ_TM_CNT register 308 keeps the time (in system time units) that the controller apparatus 100 remains in frozen mode. When the controller apparatus 100 switches to frozen mode, the controller apparatus 100 produces an event. When all the time events are processed, the controller apparatus 100 can be switched back to unfrozen mode.

Interrupt Input Module 200 and Interrupt Output Module 204

For most cases, an application is implemented as a set of tasks that has to be executed by system processors (such as the plurality of processors 110-112). A task may be defined as a program code that is executed by a processor of the plurality of processors 110-112 in order to produce a certain function of an application. Because there may be more tasks than system processors (such as the plurality of processors 110-112), a priority is assigned to each task in order to determine the order that tasks are scheduled on the system processors (such as the plurality of processors 110-112). Higher priority tasks are executed first. Lower priority tasks are executed when highest priority tasks do not require system processors (such as the plurality of processors 110-112) to be executed.

The pattern of the tasks requiring execution changes during runtime according to the events that occur. When one event takes place, a system processor (such as the plurality of processors 110-112) must be interrupted in order to execute the code that processes that event. At a controller apparatus 100 level, events that produce processor interrupt requests (PIRQs) of the plurality of processor interrupt requests (PIRQs) 107-109, may be classified as:

time events: these events are configured to happen at a certain system time. Time events may be sorted according to the occurrence time in a total order relationship. The next time the event is the earliest time event. Several embodiments may be utilized to break ties when two or more time events are configured with the same occurrence time. A time event takes place when the following condition holds:

$$R\_NXT\_EVN\_CNT \text{ register } 305 \geq R\_TM\_CNT \text{ register } 307 \quad (2)$$

where the R_NXT_EVN_CNT register 305 holds the earliest occurrence time event and the up-counter R_TM_CNT register 307 keeps the system time. The C1_EVN_TM_OCC signal 705 is asserted when Equation 2 is true; otherwise, it is de-asserted. In the R_NXT_TM_EVN_PRC register 312, the bit corresponding to the processor of the plurality of processors 110-112 that executes the task associated with the next timed event is set to 1. Otherwise, if the next time event is not associated with an executing task, all the bits of the R_NXT_TM_EVN_PRC register 312 should be set to 0.

a plurality of device interrupt requests (DIRQs) 101-103 events: these events are produced by the plurality of input/output peripheral devices 104-106 connected to the plurality of input/output peripheral device ports 118-120. Most of these events require the execution of the associated interrupt service routine (ISR) in order to satisfy the demand of the input/output peripheral devices 104-106. Interrupt requests from a plurality of device interrupt requests (DIRQs) 101-103 may be enabled or disabled by setting or clearing, respectively, the corresponding bit in the R_IRQ_ENB register 316. Therefore, a device interrupt request of the plurality of device interrupt requests (DIRQs) 101-103 will produce a processor interrupt request (PIRQ) of the plurality processor interrupt request (PIRQ) 107-109 when there exists a request from that device and the corresponding bit in the R_IRQ_ENB register 316 is enabled.

internal interrupt trigger events: a processor of the plurality of processors 110-112 may interrupt another processor of the plurality of processors 110-112 using the R_TRG_PRC_INT register 314. Setting the corresponding bit of the R_TRG_PRC_INT register 314 triggers the interrupt (bit 0: processor 1, bit 1: processor 2, etc.).

The processor interrupt requests (PIRQs) of the plurality of processor interrupt requests (PIRQs) 107-109 may be enabled or disabled by setting the corresponding bit of the R_INT_ENB register 315. When there exists at least a pending interrupt, then the C1_IRQ_PND signal 706 is set to 1, otherwise, it is set to 0.

A processor of the plurality of processors 110-112 should be interrupted (the corresponding processor interrupt request (PIRQ) of the plurality of processor interrupt requests (PIRQs) 107-109 of the controller apparatus 100 should be asserted) when:

Critical section is not granted to any processor of the plurality of processors 110-112 (the C1_MTX_GRN signal 700 is not set), the processor interrupt is enabled (the corresponding bit of the R_INT_ENB register 315 is set) and:

the processor of the plurality of processors 110-112 is executing the task associated with the next time event (the corresponding bit of the R_NXT_TM_EVN_PRC register 312 is set) and a time event occurred (the C1_EVN_TM_OCC signal 705 is set), or the processor of the plurality of processors 110-112 is executing the lowest priority task (the corresponding bit of the R_LOW_PRI_PRC register 313 is set) and there is an IRQ request pending (the C1_IRQ_PND signal 706 is set), or the processor of the plurality of processors 110-112 is executing the lowest priority task (the corresponding bit of the R_LOW_PRI_PRC register 313 is set), a time event occurred (the C1_EVN_TM_OCC signal 705 is set) and no processor of the plurality of processors 110-112 is executing the next time event (the C1_EVN_TM_OCC signal 705 is not set).

Trigger processor interrupt is set (the corresponding bit of the R_TRG_PRC_INT register 314 is set) and the processor interrupt is enabled (the corresponding bit of the R_INT_ENB register 315 is set).

The plurality of processor interrupt request outputs (PIRQOs) 205-207 are registered to avoid spurious triggers. The R_IRQ_PND register 318 preserves the status of the pending processor interrupts that should be reset by the proper processor when it executes the interrupt handler routine (ISR). The R_INT_CLR register 317 allows clearing the bit in the R_IRQ_PND register 318 of the corresponding processor interrupt in the controller apparatus 100. The R1_IRQ_PND signal 702 is asserted when a pending interrupt is set.

When a processor of the plurality of processors 110-112 is interrupted, it should execute the interrupt service routine (ISR). When the ISR is executed, the processor interrupt is disabled in the controller apparatus 100 (R_INT_ENB register 315). To avoid being interrupted in the ISR, the mutex is requested for access to the critical section and then the processor of the plurality of processors 110-112 waits until the mutex access is granted.

When the system requires a processor of the plurality of processors 110-112 to execute a higher priority task, the controller apparatus 100 interrupts the processor of the plurality of processors 110-112 that is executing the lowest priority task. In the R_LOW_PRI_PRC register 313, the bit corresponding to the processor of the plurality of processors 110-112 that is executing the lowest priority task is set to 1; otherwise, it is set to 0.

Event Module 211

Figure 11:
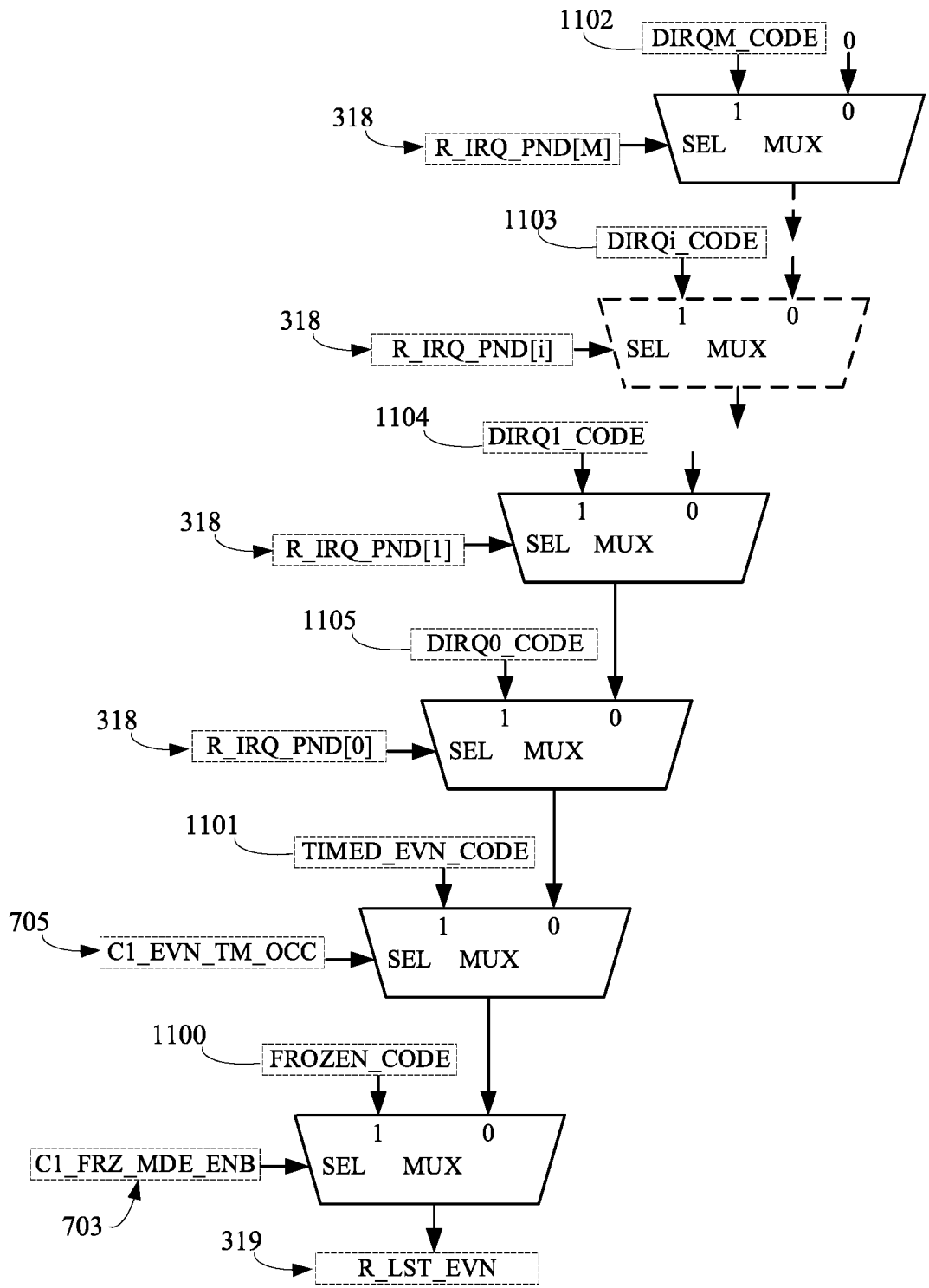
FIG. 11 shows an embodiment of the event module of the controller apparatus.

The controller apparatus 100 should handle a set of events and determine the way they are managed to preserve the consistency of the system. When a processor of the plurality of processors 110-112 is interrupted because an event happened, it must execute the event handler routine associated with that event. Once the critical section is granted in the ISR, the processor of the plurality of processors 110-112 must get the event that produced the interrupt by reading the event code in the R_LST_EVN register 319. FIG. 11 shows an embodiment of the combinational logic for the R_LST_EVN register 319.

When a processor of the plurality of processors 110-112 executes the mem_read(ADDR_EVN_OCC) instruction, the R_LST_EVN register 319 is transferred through the interface element 213 to the processor of the plurality of processors 110-112. Several events may be asserted when the processor of the plurality of processors 110-112 reads the R_LST_EVN register 319. In order to avoid inconsistency, the event module 211 sorts the events and assigns to the R_LST_EVN register 319 the code of the asserted event with the lowest sorted order. The following table shows an embodiment of the sorted list of events of the controller apparatus 100:

| Sorted Order | Event Code | Description |
| --- | --- | --- |
| 1 | FROZEN event code (FROZEN_CODE 1100) | This event takes place when the controller apparatus 100 changes from unfrozen mode to frozen mode. The C1_PRZ_MDE_ENB signal 703 should be clear to allow accessing the rest of events when the controller apparatus 100 is in frozen mode |
| 2 | TIMED event code (TIMED_EVN_CODE 1101) | This event takes place when a time event happens (Equation 2 holds) |
| 3 to ... | DIRQi_CODE (DIRQ event codes 1102-1105) | The DIRQi_CODE is asserted when there is a pending request from the plurality of device interrupt requests (DIRQs) 101-103 with the index i |

SOFTWARE Data Structures and Linked Lists

The computer program contains a set of software data structures to support all features of the multiprocessor system. FIG. 12 shows an embodiment of the data structures, named control blocks.

Figure 13:
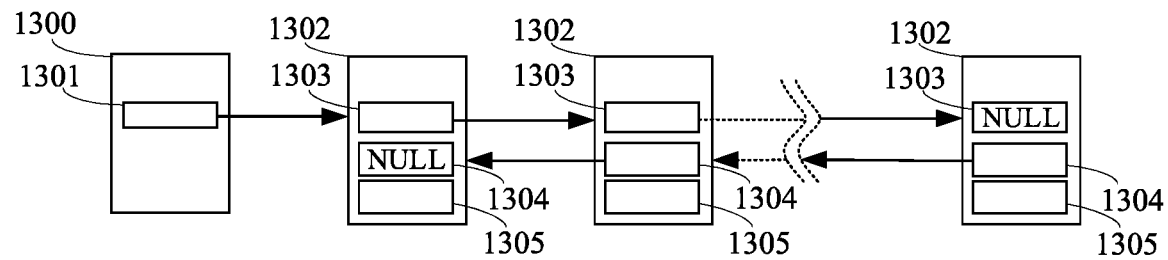
FIG. 13 shows an embodiment of the list architecture implemented for the data structures by the computer program.
Figure 14:
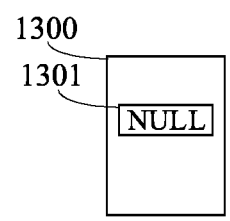
FIG. 14 shows an embodiment of the list architecture implemented for the data structures by the computer program.

Control blocks are highly linked through several linked lists. FIG. 13 shows an embodiment of the components of a linked list:

root block 1300: this is the root block of the list containing the linking field 1301 that points to the first element of the linked list. The root block 1300 may be a different data structure from the rest of the blocks of the linked list. An empty list has only the root block 1300, as shown in FIG. 14.

list element 1302: this is a block of the nodes of the linked list. Each list element 1302 contains a linking field 1301 to the next element 1303 and may contain a linking field 1301 to the previous element 1304.

The list element 1302 may be sorted according to certain criteria stored in a sort field 1305 of the list element 1302.

FIG. 15 shows an embodiment of the set of the defined linked lists.

System Components and Data Structures

Task

Figure 16:
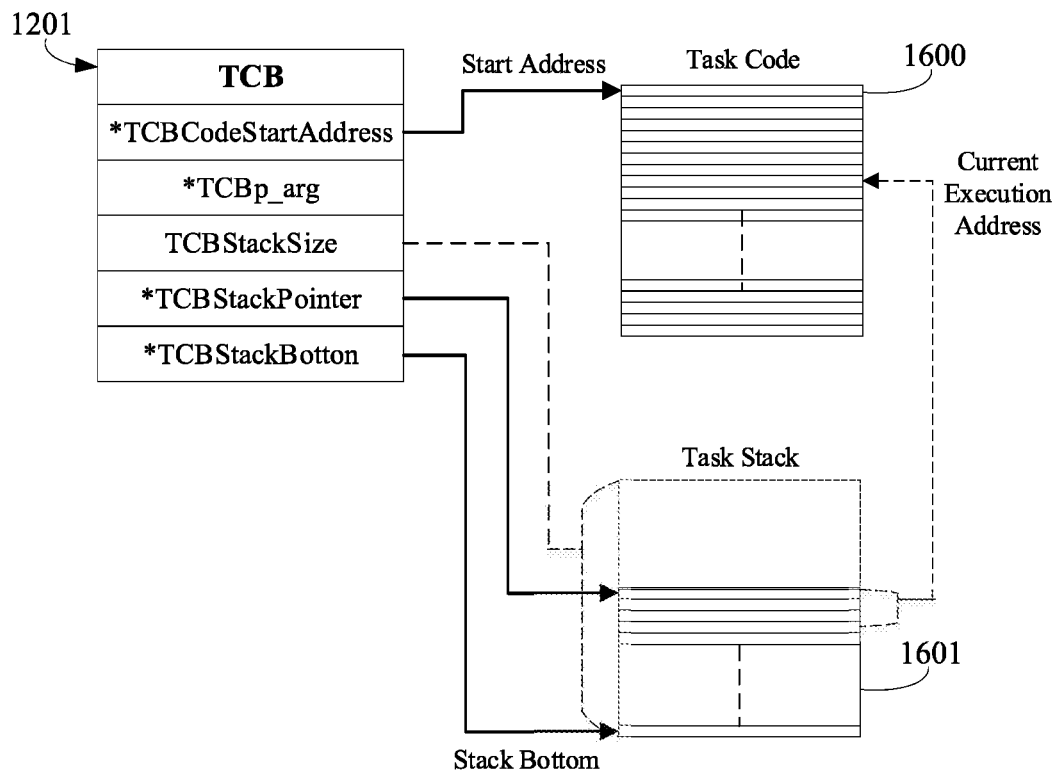
FIG. 16 shows an embodiment of the task components and structure.

A task is defined as a unit of execution. FIG. 16 shows an embodiment of a task implementation that consists of:

TCB data structure 1201: this is a control block that stores the information required for task management.

task code 1600: this is the executable code, loaded into the system memory 114, that implements a task function when it is executed by a processor of the plurality of processors 110-112.

task stack 1601: this is data storage to preserve the status of a suspended task in order to resume it properly and store subroutine data.

Figure 17:
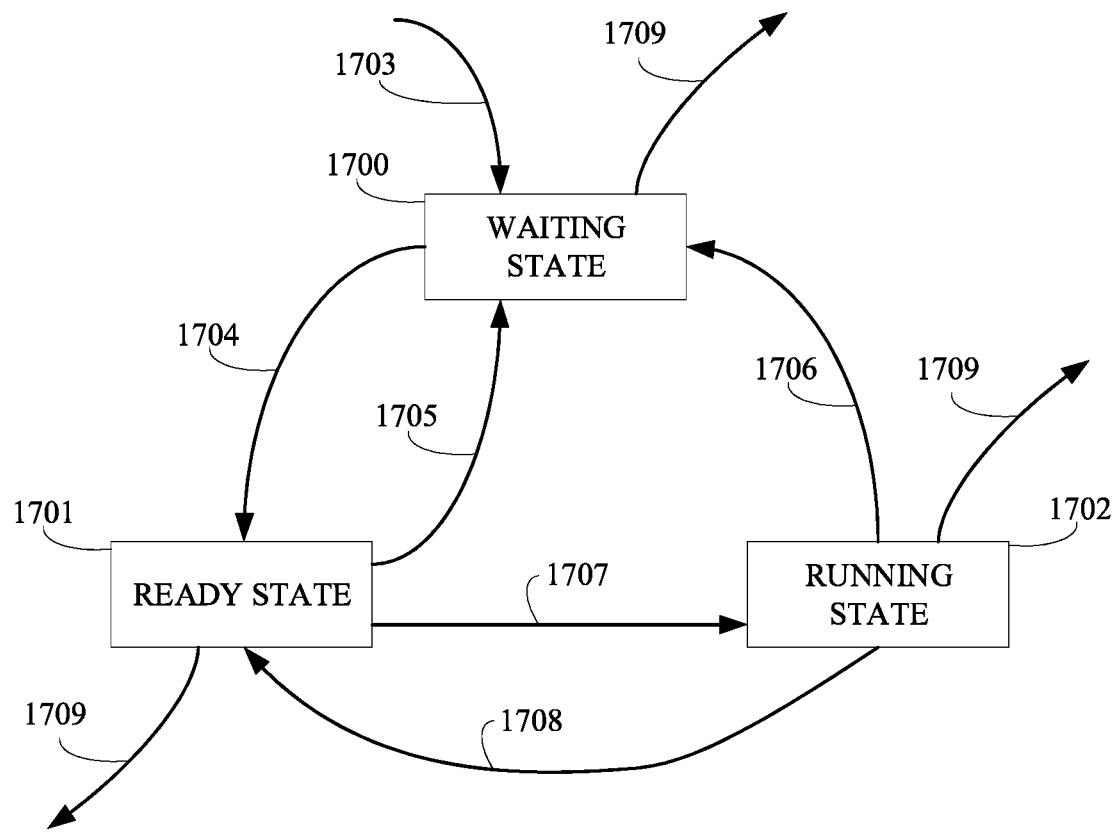
FIG. 17 shows a state diagram of the task states, in accordance with some embodiments.

Tasks are executed by the plurality of processors 110-112 to produce their designed function. A task may stay in different states. FIG. 17 shows an embodiment of these states and the different events that produce their changes:

waiting state 1700: the task is waiting for an event to release. When a task is in the waiting state 1700 it is called a "waiting task".

ready state 1701: the task is ready to be executed and it is waiting to grant a processor of the plurality of processors 110-112 for execution. A task in the ready state 1701 is called a "ready task".

running state 1702: the task is executing on a processor of the plurality of processors 110-112. A task is executed until it finishes the execution or is preempted by a higher priority task. A task in the running state 1702 is called an "executing task".

There are different causes of changes in the state of a task such as an event in a plurality of device interrupt requests (DIRQs) 101-103, an internal time event, an event produced by another task or, the availability of a requested resource as well as other events specified in the system. In FIG. 17, the state changes are grouped in the following set of events:

create events 1703: create a task and set its state as the waiting state 1700. All tasks should be created through a create event 1703. When a task is created, its stack is initialized to start execution from the start address of the task.

release events 1704: change the state of the task from the waiting state 1700 to the ready state 1701. The state of a task changes to the ready state 1701 when that task is ready to be executed by a processor of the plurality of processors 110-112.

suspend events 1705: change the state of a task from the ready state 1701 to the waiting state 1700. The status of the task is saved into the task stack 1601 in order to restore it when it is resumed.

blocking events 1706: change the state of a task from the running state 1702 to the waiting state 1700.

execution events 1707: change the state of a task from the ready state 1701 to the running state 1702. A processor of the plurality of processors 110-112 restores its status from the task stack 1601.

deallocate events 1708: change the state of a task from the running state 1702 to the ready state 1701. When a task is deallocated, its status is saved in the task stack 1601 in order to restore it when an execution event 1707 returns it to the running state 1702. Consequently, the task executes as if it had not been deallocated.

finish events 1709: destroy a task. A finish event destroys a task-independent of its state.

The embodiments of the tasks may be classified into three kinds:

User Task: this task is released for execution according to the configuration that the user performed. It can be executed periodically or when an internal event occurs.

Event Handler Routine Task: this task is released when an event occurs in a device interrupt request (DIRQ) of the plurality device interrupt requests (DIRQs) 101-103. An Event Handler Routine Task is associated with that device interrupt request (DIRQ) of the plurality device interrupt requests (DIRQs) 101-103. Event Handler Routine Tasks are created when an ISR is associated with the device interrupt request (DIRQ) of the plurality device interrupt requests (DIRQs) 101-103. These Event Handler Routine tasks will be the code of the task to be released each time that the associated, and enabled, device interrupt request (DIRQ) of the plurality device interrupt requests (DIRQs) 101-103 occurs.

Idle Task: this task is executed when neither user tasks nor interrupt tasks are ready for execution. An idle task may turn a processor of the plurality of processors 110-112 to a low power consumption state until the next event that requires processing.

Tasks and events are closely related because events change the status of the tasks.

Events

The computer program supports external and internal events. External events come from the controller apparatus 100 to the plurality of processors 110-112 through the processor interrupt requests (PIRQs) of the plurality of processor interrupt requests (PIRQs) 107-109 and are processed by the computer program in the interrupt handler routine of the system.

Internal events are produced by different conditions, such as when an executing task is deallocated, an executing task completes, etc. The computer program uses ECB data structures 1202 to handle all the events of the system. ECB data structures 1202 are linked with TCB data structure 1201 to properly manage changes in the states of tasks.

Time

Time is important because it marks when events occur. The R_TM_CNT register 307 of the controller apparatus 100 holds the system time and the R_FRZ_TM_CNT register 308 holds the length of time the system stayed in frozen mode. The controller apparatus 100 produces a time event (C1_EVN_TM_OCC signal 705) each time the R_TM_CNT register 307 reaches the value stored in the R_NXT_EVN_CNT register 305.

Resources

In a multitasking system, tasks may share the utilization of the system's resources, such as data memory sections, code memory sections or input/output devices as well as other special resources. To manage the utilization of these resources and share them among tasks efficiently, an operating system should offer an adequate resource management mechanism. This mechanism offers data structures and functions to handle the sharing of system resources among the tasks that require their utilization.

The computer program implements the data structure of a resource in the RCB data structure 1203. The RCB data structure 1203 supports a linked list to ECB data structures 1202 to manage the events associated with resources, in addition to the data fields required to implement the functionalities of specific kinds of resources. When a task requests a resource, (1) the resource may be granted to the task if it is available or (2) the task may be blocked if it must wait until the resource becomes available. Moreover, a timeout may need to be specified in order to avoid a task either granting or waiting for a resource for a long time, which would impede the adequate sharing of resources among tasks.

Figure 21:
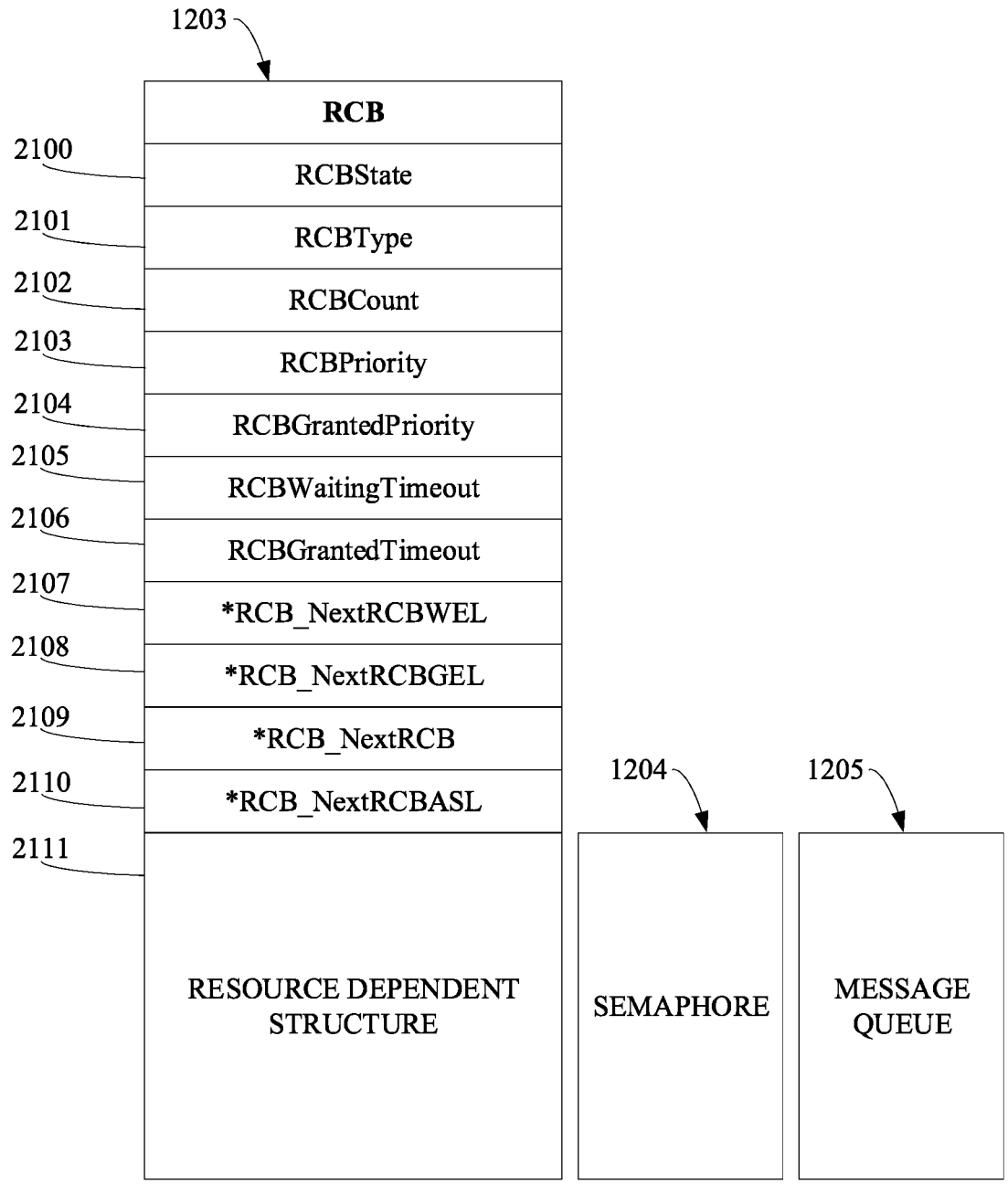
FIG. 21 shows an embodiment for the fields of the RCB data structure of the computer program.

FIG. 21 shows an embodiment with a resource-dependent structure 2111 to support semaphore or message queue functionality that can be extended to different kinds of system resources.

Signals

Signals in operating systems handle exceptional conditions that may happen during runtime. Signals allow tasks to execute associated code when a certain condition takes place. Some of these conditions may be defined, for instance, as when a task is created, a resource is granted or a task is blocked. The SCB data structure 1207 is defined to store the signal information and it is linked to data structures accordingly.

The SCB data structure 1207 points to the code to be executed when the condition of the signal occurs. This code is executed prior to the execution of the code of the task with which the signal is associated.

Ready and Running Linked Lists (TCBRDYL List 1519 and TCBRUNL List 1520)

Figure 25:
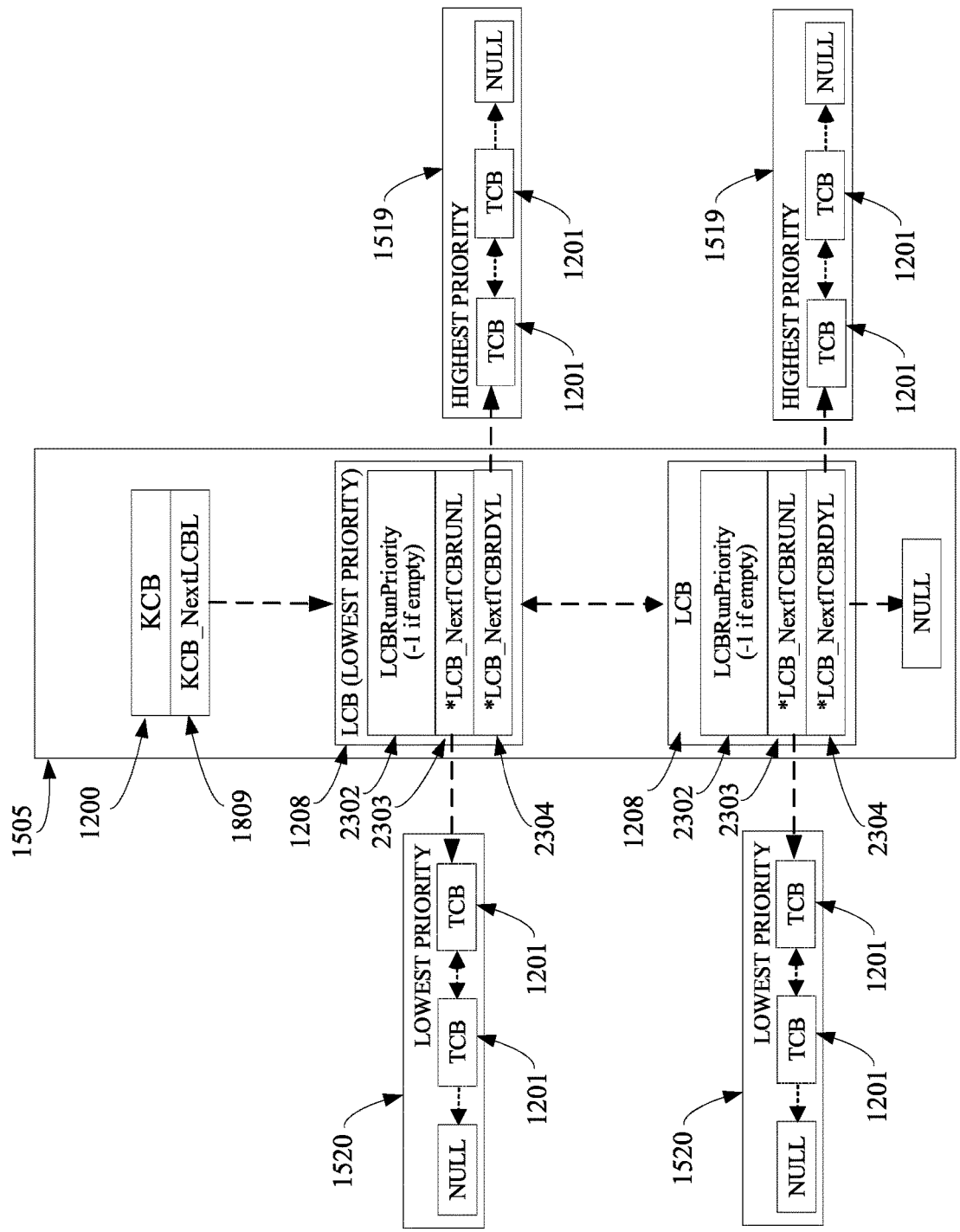
FIG. 25 shows an embodiment of the links of the LCL list.

Tasks in the ready state 1701 are grouped in the Ready Linked Lists. LCB data structures 1208 allow holding information about the tasks ready for execution and the tasks currently executing in a determined TCBRDYL list 1519. A plurality of ready linked lists may be defined in order to group the tasks of the system according to each one's function and the function of the group. FIG. 25 shows an embodiment of the LCBL list 1505 that links all the LCB data structures 1208 of the system. When a task is in the ready state 1701, it should be linked to a TCBRDYL list 1519; when a task is in the running state 1702, it should be linked to a TCBRUNL list 1520.

Processors 110-112

The plurality of processors 110-112 executes the code of the operating system, tasks, and signals. The operating system is in charge of sharing the utilization of the plurality of processors 110-112 among the system tasks. Each processor of the plurality of processors 110-112 should be assigned to execute the highest priority tasks in the ready state 1701. A PCB data structure 1209 stores the state of a processor of the plurality of processors 110-112 and the ready linked lists that the processor of the plurality of processors 110-112 may serve. A processor of the plurality of processors 110-112 may serve several TCBRDYL lists 1519 and several processors of the plurality of processors 110-112 may serve to the same TCBRDYL list 1519.

The embodiment of the LCBL list 1505 shown in FIG. 25 sorts the LCB data structures 1208 according to the priority of the tasks executed by each processor of the plurality of processors 110-112. In this way, it is easy to determine the lowest priority processor of the plurality of processors 110-112 to be defined in the R_LOW_PRI_PRC register 313 of the controller apparatus 100.

RRDS Data Structure 1210

Each request for a resource may include an RRDS data structure 1210 that contains the specific information for that request. If the pointer to an RRDS data structure 1210 in the RCBType field 2101 is NULL, then the default values of the resource are considered.

An embodiment of an RRDS data structure 1210 may contain the following fields:

| Parameter | Description |
| --- | --- |
| Waiting Timeout | Timeout for waiting for the resource |
| Granted Timeout | Timeout for granting the resource |
| Waiting Priority | Priority for waiting for the resource |
| Granted Priority | Priority for granting the resource |
| SCBAL | Associated SCB linked list |

Control Block Fields

Each of the control blocks holds all the information required to perform its functions and the links required for the linked lists in fields of the data structure.

KCB Data Structure 1200

Figure 18:
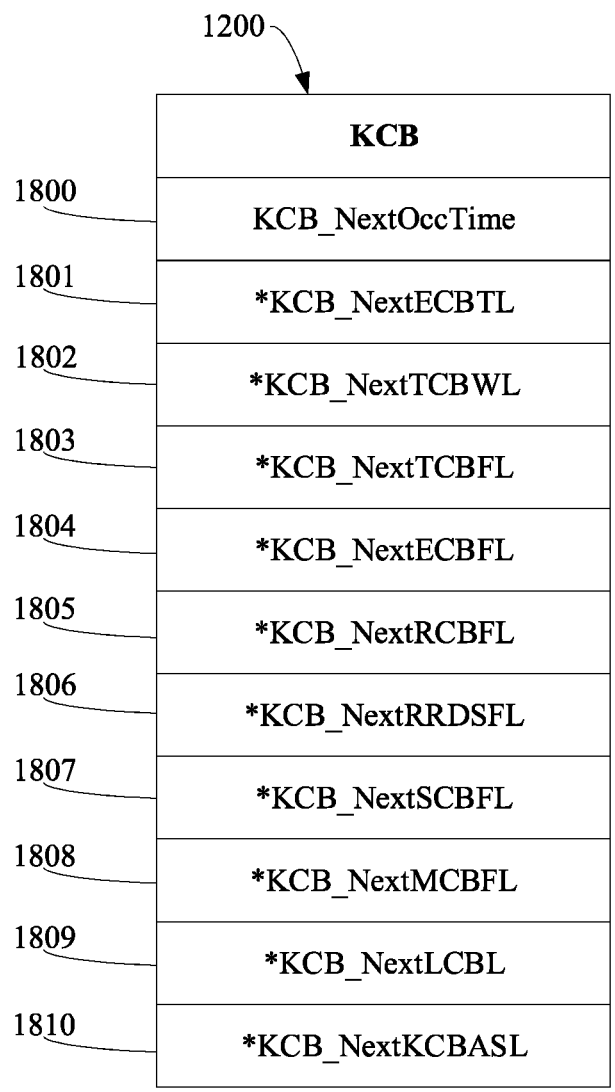
FIG. 18 shows an embodiment for the fields of the KCB data structure of the computer program.

The KCB data structure 1200 holds the main information about the computer program. FIG. 18 shows an embodiment of the fields of the KCB data structure 1200, that includes:

KCB_NextOccTime field 1800: this field holds the time that the earliest time event shall take place, if at all. When the KCB_NextOccTime field 1800 changes its value, it is written to the R_NXT_EVN_TM register 310 of the controller apparatus 100.

*KCB_NextECBTL field 1801: this field is the root block 1300 of the ECBTL list 1503. It points to the first-time ECB data structure 1202 in the ECBTL list 1503 or NULL if there is not any ECB data structure 1202 in the ECBTL list 1503.

*KCB_NextTCBWL field 1802: this field is the root block 1300 of the TCBWL list 1521. It points to the first-waiting TCB data structure 1201 in the TCBWL list 1521 or NULL if there is not any TCB data structure 1201 in the TCBWL list 1521.

*KCB_NextTCBFL field 1803: this field is the root block 1300 of the TCBFL list 1517. It points to the first-free TCB data structure 1201 in the TCBFL list 1517 or NULL if there is not any TCB data structure 1201 in the TCBFL list 1517.

*KCB_NextECBFL field 1804: this field is the root block 1300 of the ECBFL list 1502. It points to the first-free ECB data structure 1202 in the ECBFL list 1502 or NULL if there is not any ECB data structure 1202 in the ECBFL list 1502.

*KCB_NextRCBFL field 1805: this field is the root block 1300 of the RCBFL list 1509. It points to the first-free RCB data structure 1203 in the RCBFL list 1509 or NULL if there is not any RCB data structure 1203 in the RCBFL list 1509.

*KCB_NextRRDSFL field 1806: this field is the root block 1300 of the RRDSFL list 1513. It points to the first-free RRDS data structure 1210 in the RRDSFL list 1513 or NULL if there is not any RRDS data structure 1210 in the RRDSFL list 1513.

*KCB_NextSCBFL field 1807: this field is the root block 1300 of the SCBFL list 1514. It points to the first-free SCB data structure 1207 in the SCBFL list 1514 or NULL if there is not any SCB data structure 1207 in the SCBFL list 1514.

*KCB_NextMCBFL field 1808: this field is the root block 1300 of the MCBFL list 1506. It points to the first-free MCB data structure 1206 in the MCBFL list 1506 or NULL if there is not any MCB data structure 1206 in the MCBFL list 1506.

*KCB_NextLCBL field 1809: this field is the root block 1300 of the LCBL list 1505. It points to the first-free LCB data structure 1208 in the LCBL list 1505 or NULL if there is not any LCB data structure 1208 in the LCBL list 1505.

*KCB_NextKCBASL field 1810: this field is the root block 1300 of the KCBASL list 1522. It points to the first SCB data structure 1207 associated with the KCB data structure 1200.

TCB Data Structure 1201

Figure 19:
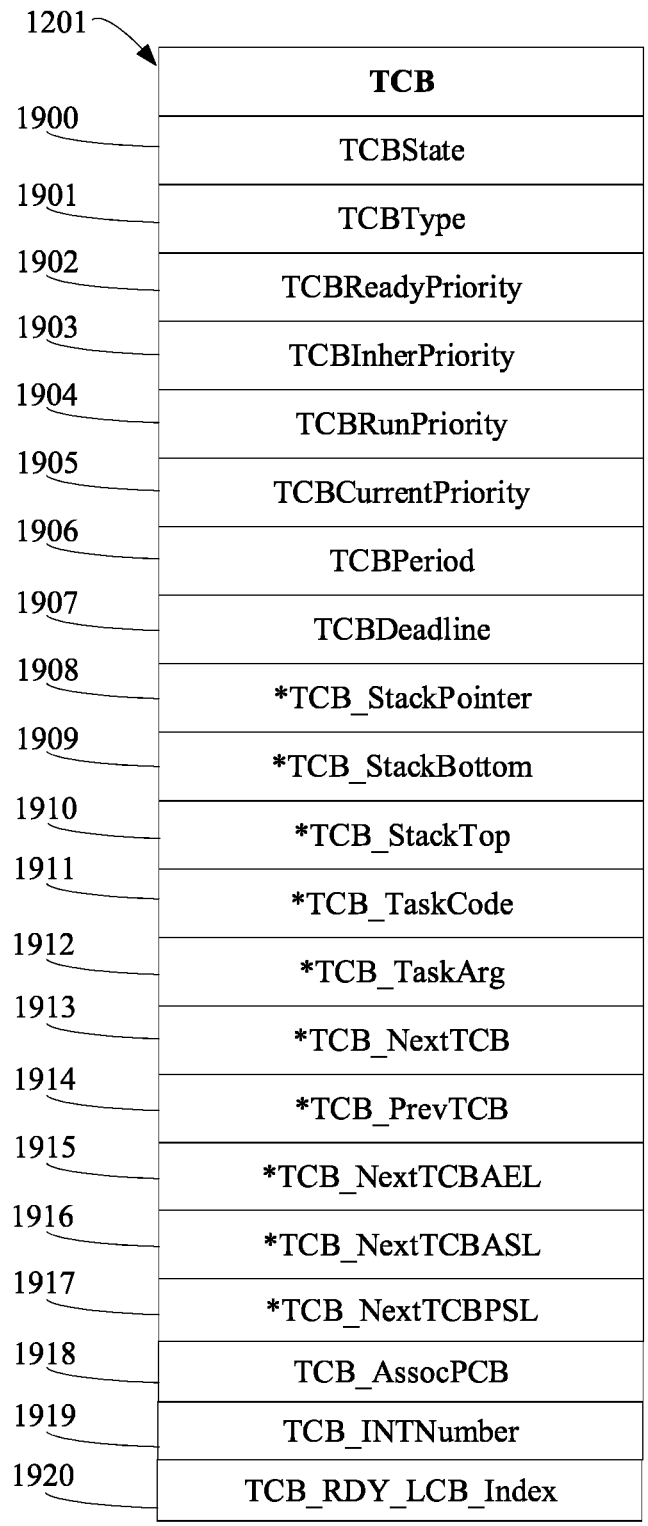
FIG. 19 shows an embodiment for the fields of the TCB data structure of the computer program.

The TCB data structure 1202 holds the support information required for the tasks. FIG. 19 shows an embodiment of the fields of the TCB data structure 1201, that includes:

TCBState field 1900: this field holds the state of the TCB data structure 1201. The state may be used to determine the action to be performed during runtime. For instance, to unlink a TCB data structure 1201 from the current linked list, the TCB State field 1900 can be used to select the adequate unlink function.

TCBType field 1901: this field holds the type of the TCB data structure 1201. The type may be used to determine the action to be performed during runtime. For instance, if it is a periodic task, then the release time event should be updated periodically.

TCBReadyPriority field 1902: this field holds the priority of the task associated with the TCB data structure 1201 when it is in the ready state 1701. The task that is ready for execution with the lowest value in the TCBReadyPriority field 1902 (highest priority) is chosen for execution when a processor of the plurality of processors 110-112 is available.

TCBInherPriority field 1903: this field holds the priority that the task inherits when a resource is granted. The priority of the resource may be inherited by the task when the resource is granted to the task.

TCBRunPriority field 1904: this field holds the priority of the task associated with the TCB data structure 1201 when it is in the running state 1702.

TCBCurrentPriority field 1905: this field holds the current priority of the task associated with the TCB data structure 1201 according to its state. For instance, when a task is in the running state 1702, the current priority may be set according to the highest priority between the TCBRunPriority field 1904 and the TCBInherPriority field 1903 when it grants a resource.

TCBPeriod field 1906: this field may hold the period of the task associated with the TCB data structure 1201.

TCBDeadline field 1907: this field may hold the deadline of the task associated with the TCB data structure 1201.

*TCB_StackPointer field 1908: this field holds the current stack pointer of the task when it is not in the running state 1702.

*TCB_StackBottom field 1909: this field holds a pointer to the bottom of the task stack 1601.

*TCB_StackTop field 1910: this field holds a pointer to the top of the task stack 1601.

*TCB_TaskCode field 1911: this field holds a pointer to the starting address of the task code 1600.

*TCB_TaskArg field 1912: this field holds a pointer to the starting arguments of the task.

*TCB_NextTCB field 1913: this field points to the next element 1303 of the list that the TCB data structure 1201 is linked.

*TCB_PrevTCB field 1914: this field points to the previous element 1304 of the list that the TCB data structure 1201 is linked.

*TCB_NextTCBAEL field 1915: this field is the root of the TCBAEL list 1515. It points to the first ECB data structure 1202 in the TCBAEL list 1515 or NULL if there is not any ECB data structure 1202 in the TCBAEL list 1515.

*TCB_NextTCBASL field 1916: this field is the root of the TCBASL list 1516. It points to the first SCB data structure 1207 in the TCBASL list 1516 or NULL if there is not any SCB data structure 1207 in the TCBASL list 1516.

*TCB_NextTCBPSL field 1917: this field is the root of the TCBPSL list 1518. It points to the first SCB data structure 1207 in the TCBPSL list 1518 or NULL if there is not any SCB data structure 1207 in the TCBPSL list 1518.

TCB_AssocPCB field 1918: this field holds the value of the internal identification register CPUID 123-125 of the processor of the plurality of processors 110-112 that is currently executing the task associated with the TCB data structure 1201.

TCB_INTNumber field 1919: this field holds the IRQ number of the device interrupt request (DIRQ) of the plurality device interrupt requests (DIRQs) 101-103 input when TCB data structure 1201 is associated with an Interrupt Task (TCBType field 1901 is equal to ISR).

TCB_RDY_LCB_Index field 1920: this field holds the index of the LCBL list 1505 to be linked when it is in the ready state 1701.

ECB Data Structure 1202

Figure 20:
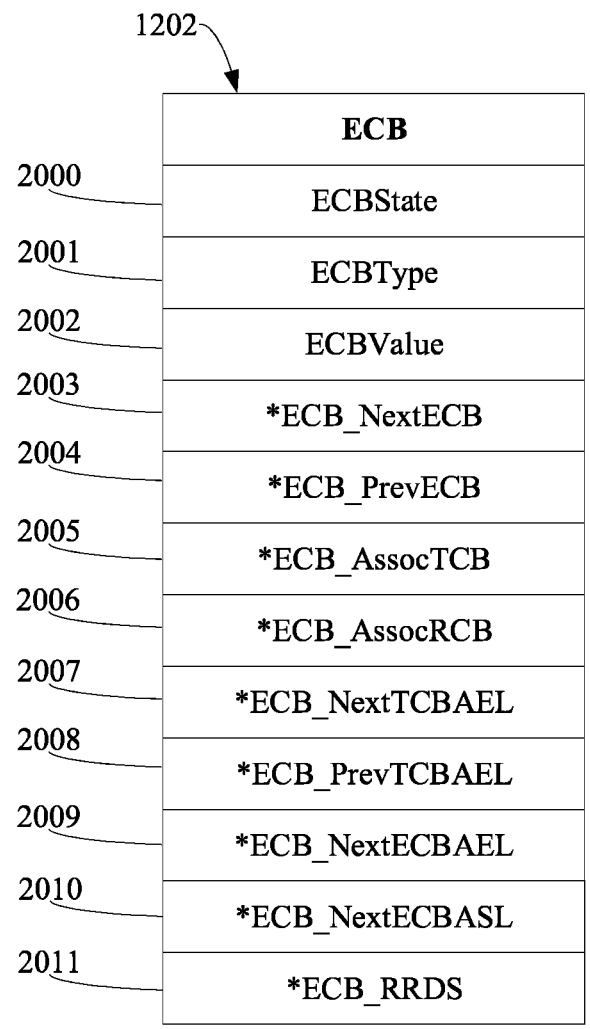
FIG. 20 shows an embodiment for the fields of the ECB data structure of the computer program.

The ECB data structure 1202 holds information about events. FIG. 20 shows an embodiment of the fields of the ECB data structure 1202, that includes:

ECBState field 2000: this field holds the state of the ECB data structure 1202. The state may be used to determine the action to be performed during runtime. For instance, to unlink an ECB data structure 1202 from the current linked list, the ECB State field 2000 is used to select the adequate unlink function.

ECBType field 2001: this field holds the type of the ECB data structure 1202. The type may be used to determine the action to be performed during runtime.

ECB Value field 2002: this field holds the value to be used as a sorting criterion in several linked lists. For instance, it may hold time when the ECB data structure 1202 is used as a time event or the waiting priority when it is used to request a resource.

*ECB_NextECB field 2003: this field points to the next element 1303 of the list with which the ECB data structure 1202 is linked.

*ECB_PrevECB field 2004: this field points to the previous element 1304 of the list with which the ECB data structure 1202 is linked.

*ECB_AssocTCB field 2005: this field points to the TCB data structure 1201 with which the ECB data structure 1202 is associated.

*ECB_AssocRCB field 2006: this field points to the RCB data structure 1203 with which the ECB data structure 1202 is associated.

*ECB_NextTCBAEL field 2007: this field points to the next element 1303 of the TCBAEL list 1515.

*ECB_PrevTCBAEL field 2008: this field points to the previous element 1304 of the TCBAEL list 1515.

*ECB_NextECBAEL field 2009: this field is the root block 1300 of the ECBAEL list 1500. It is NULL if there is no ECB data structure 1202 associated with the ECB data structure 1202.

*ECB_NextECBASL field 2010: this field is the root block 1300 of the ECBASL list 1501. It is NULL if there is no SCB data structure 1207 associated with the ECB data structure 1202.

*ECB_RRDS field 2011: this field points to the RRDS data structure 1210 associated with the ECB data structure 1202. It is NULL if there is no RRDS data structure 1210 associated.

RCB Data Structure 1203

The RCB data structure 1203 holds information about a resource. FIG. 21 shows an embodiment of the fields of the RCB data structure 1203, that includes:

RCB State field 2100: this field holds the state of the RCB data structure 1203. The state may be used to determine the action to be performed during runtime.

RCBType field 2101: this field holds the type of the RCB data structure 1203. The type is used to determine the actions performed on the resource during runtime.

RCBCount field 2102: this field holds the count that determines the availability of the resource for requests.

RCBPriority field 2103: this field holds the priority of the lowest priority task that is granting the resource. This field may be used, for instance, to determine if priority inversion exits between tasks granting and tasks waiting for the resource.

RCBGrantedPriority field 2104: this field holds the priority that a task inherits when it grants the resource.

RCBWaitingTimeout field 2105: this field holds the default waiting timeout for the resource associated with the RCB data structure 1203.

RCBGrantedTimeout field 2106: this field holds the default granted timeout for the resource associated with the RCB data structure 1203.

*RCB_NextRCBWEL field 2107: this field is the root block 1300 of the RCBWEL list 1511. It is NULL if there is no ECB data structure 1202 linked to the RCBWEL list 1511.

*RCB_NextRCBGEL field 2108: this field is the root block 1300 of the RCBGEL list 1510. It is NULL if there is no ECB data structure 1202 linked to the RCBGEL list 1510.

*RCB_NextRCB field 2109: this field points to the next element 1303 of the list with which the RCB data structure 1203 is linked.

*RCB_NextRCBASL field 2110: this field points to the next element 1303 of the RCBASL list 1508.

Different resources can be implemented according to the synchronization features to be achieved. Each one of these synchronization mechanisms requires data structures to hold its status. The resource-dependent structure 2111 is appended to the RCB data structure 1203 to support different synchronization mechanisms. In what follows, a semaphore structure 1204 and a message queue structure 1205 are described as embodiments of a resource-dependent structure 2111.

Semaphore Structure 1204

A semaphore is a widely used synchronization resource for controlling the access of different tasks to critical sections. The fields of this data structure are appended to the RCB data structure 1203. An embodiment of the fields of the semaphore structure 1204 includes SEMMaxCount field: this field holds the maximum number of simultaneous requests that can be granted for the semaphore structure 1204.

Message Queue Structure 1205

Messages are used as a communication resource among different tasks. The messages are organized as a queue list in which the first message sent is the first message to be delivered. An embodiment of the fields of the message queue structure 1205 includes:

MESSize field: this field holds the maximum number of MCB data structures 1206 for the message queue structure 1205.

MESEntries field: this field holds the current number of MCB data structures 1206 of the message queue structure 1205.

*MES_FirstMCB field: this field points to the first MCB data structure 1206 linked to the message queue structure 1205.

*MES_LastMCB field: this field points to the last MCB data structure 1206 linked to the message queue structure 1205.

MCB Data Structure 1206

The MCB data structure 1206 is used to manage the information sent through the message resource. An embodiment of the fields of the MCB data structure 1206 includes:

MCBState field: this field holds the state of the MCB data structure 1206. The state may be used to determine the action to be performed during runtime.

MCB Count field: this field holds the number of tasks to which the message must be delivered.

*MCB_NextMCB field: this field points to the next element 1303 of the message queue list.

*MCB_PrevMCB field: this field points to the previous element 1304 of the message queue list.

*MCB_StartMessage field: this field points to the starting memory address of the message.

*MCB_EndMessage field: this field points to the last memory address of the message.

MCB_ID field: this field contains a unique identification number for the MCB data structure 1206. An embodiment may assign the current time of the computer program to this field.

MCB_RlsCount field: this field begins with the initial count and is decremented each time that the MCB data structure 1206 is delivered. When the count reaches 0, the MCB data structure 1206 is linked to the MCBFL list 1506.

SCB Data Structure 1207

Figure 22:
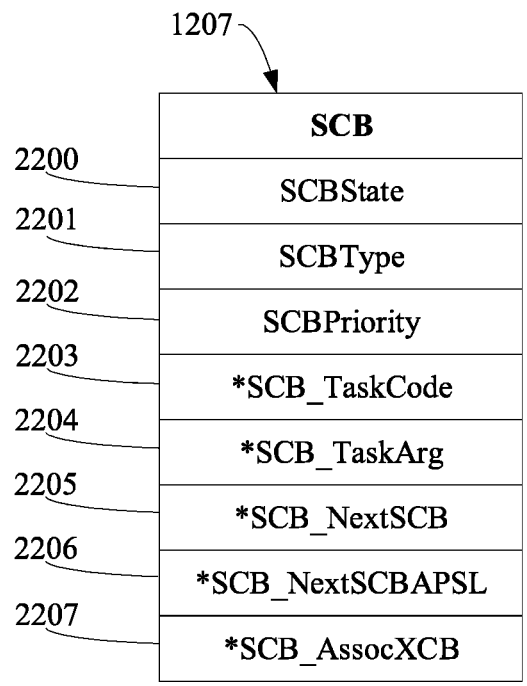
FIG. 22 shows an embodiment for the fields of the SCB data structure of the computer program.

Signals are used to manage internal events that can be produced during runtime. FIG. 22 shows an embodiment of the fields of the SCB data structure 1207, that includes:

SCBState field 2200: this field holds the state of the SCB data structure 1207. The state may be used to determine some actions to be performed during runtime.

SCBType field 2201: this field holds the type of the SCB data structure 1207. The type is used to determine some actions to be performed during runtime.

SCBPriority field 2202: this field holds the priority of the SCB data structure 1207.

This field is used to determine the order in which the pending signals are executed (highest priority first).

*SCB_TaskCode field 2203: this field holds a pointer to the starting address of the signal code.

*SCB_TaskArg field 2204: this field holds a pointer to the starting arguments of the signal.

*SCB_NextSCB field 2205: this field holds pointers to the next element 1303 of the list to which the SCB data structure 1207 is linked.

*SCB_NextSCBAPSL field 2206: this fields links all the pending signals with the signal that generates them.

*SCB_AssocXCB field 2207: points to the data structure with which this SCB data structure 1207 is associated.

LCB Data Structure 1208

Figure 23:
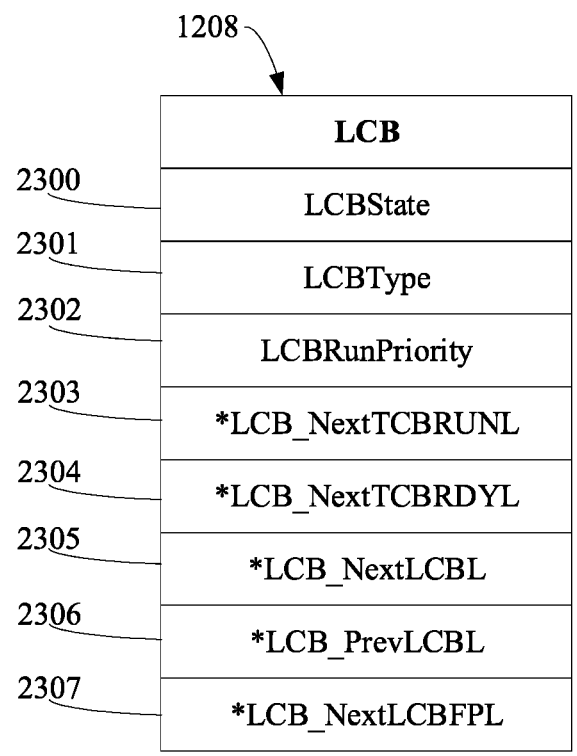
FIG. 23 shows an embodiment for the fields of the LCB data structure of the computer program.

In a multiprocessor system, tasks may be grouped to be executed by either one or several processors in order to produce a certain performance or function. The LCB data structure 1208 allows organizing the group of tasks to be executed by one or several processors and the sharing of processors among LCB data structures 1208. FIG. 23 shows an embodiment of the fields of the LCB data structure 1208, that includes:

LCBState field 2300: this field holds the state of the LCB data structure 1208. The state may be used to determine the action to be performed during runtime.

LCBType field 2301: this field holds the type of the LCB data structure 1208. The type is used to determine the actions to perform during runtime.

LCBRunPriority field 2302: this field holds the lowest priority of the executing tasks linked to the LCB data structure 1208 or the lowest possible priority value if no task is in the running state 1702.

*LCB_NextTCBRUNL field 2303: this field is the root block 1300 of the TCBRUNL list 1520. It is NULL if there is no TCB data structure 1201 associated with the TCBRUNL list 1520.

*LCB_NextTCBRDYL field 2304: this field is the root block 1300 of the TCBRDYL list 1519. It is NULL if there is no TCB data structure 1201 associated with the TCBRDYL list 1519.

*LCB_NextLCBL field 2305: this field holds a pointer to the next element 1303 in the LCBL list 1505.

*LCB_PrevLCBL field 2306: this field holds a pointer to the previous element 1304 in the LCBL list 1505.

*LCB_NextLCBFPL field 2307: this field is the root block 1300 of the LCBFPL list 1504. It is NULL if there is no PCB data structure 1209 linked to the LCBFPL list 1504.

PCB Data Structure 1209

Figure 24:
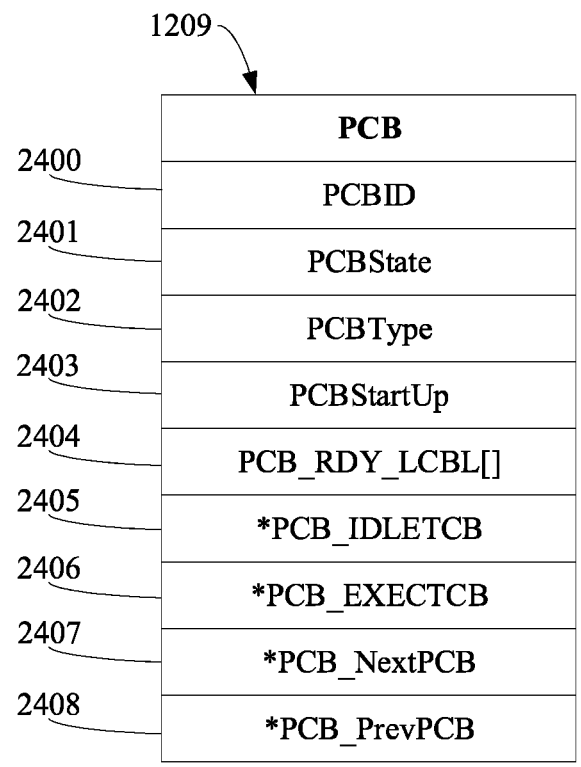
FIG. 24 shows an embodiment for the fields of the PCB data structure of the computer program.

Each processor of the system requires a data structure to preserve its status during runtime. The PCB data structure 1209 holds the information of one processor. FIG. 24 shows an embodiment of the fields of the PCB data structure 1209, that includes:

PCBID field 2400: this field holds the value of the internal identification register CPUID 123-125 of the processor of the plurality of processors 110-112 associated with the PCB data structure 1209.

PCB State field 2401: this field holds the state of the PCB data structure 1209. The state may be used to determine the action to be performed during runtime.

PCBType field 2402: this field holds the type of the PCB data structure 1209. The type is used to determine the actions performed during runtime.

PCBStartUp field 2403: this field is used to synchronize the initialization of the system processors (such as the plurality of processors 110-112).

PCB_RDY_LCBL[ . . . ] field 2404: this field holds an array that contains the index of the LCBL list 1505 that the processor of the plurality of processors 110-112, associated with the PCB data structure 1209, uses to search for a task in the ready state 1701 to execute.

*PCB_IDLETCB field 2405: this field holds a pointer to the TCB data structure 1201 of the idle task associated with the PCB data structure 1209.

*PCB_EXECTCB field 2406: this field holds a pointer to the TCB data structure 1201 of the currently executing task associated with the PCB data structure 1209.

*PCB_NextPCB field 2407: this field holds a pointer to the next element 1303 of the list to which the PCB data structure 1209 is linked.

*PCB_PrevPCB field 2408: this field holds a pointer to the previous element 1304 of the list to which the PCB data structure 1209 is linked.

RRDS Data Structure 1210

The RRDS data structure 1210 is the structure that holds information of the specific resource request. An embodiment of the fields of the RRDS data structure 1210 includes:

RRDSWaitingTimeout field: this field holds the waiting timeout for the specific resource request of the RRDS data structure 1210.

RRDSGrantedTimeout field: this field holds the granted timeout for the specific resource request of the RRDS data structure 1210.

RRDSWaitingPriority field: this field holds the waiting timeout for the specific resource request of the RRDS data structure 1210.

RRDSGrantedPriority field: this field holds the granted timeout for the specific resource request of the RRDS data structure 1210.

*RRDS_NextSCB field: this field is the root block 1300 of a list containing the SCB data structure 1207 associated with the RRDS data structure 1210.

*RRDS_NextRRDS field: this field points to the next element 1303 of the list to which the RRDS data structure 1210 is linked.

*RRDS_RCB_Data field: this field points to an auxiliary structure for the RCB data structure 1203 (e.g. MCB data structure 1206 or any other defined structure)

Linked List Structures

The computer program holds the system information in data structures linked among them in order to preserve the system consistency during runtime. Several linked list structures are established among data structures.

ECBAEL List 1500

Description: ECB Associated Event List. The ECBAEL list 1500 allows relationships among different ECB data structures 1202.

Number of lists: Up to 1 per ECB data structure 1202 root block 1300 type: ECB data structure 1202

Root block linking field 1301: *ECB_NextECBAEL field 2009 list element 1302 type: ECB data structure 1202 linking field 1301 to next element 1303: *ECB_NextECBAEL field 2009 linking field 1301 to the previous element 1304: Not required sort field 1305: Not required Sort criteria: Not required Associated Functions:

| | |
|---|---|
| INT32 gk_ECBAEL_Link(GS_ECB *pecb1, GS_ECB *pecb2) | Links the ECB data structure 1202 pointed to by pecb2 to the ECBAEL list 1500 of the ECB data structure 1202 pointed to by pecb1. |
| INT32 gk_ECBAEL_Unlink(GS_ECB *pecb1, GS_ECB *pecb2) | Unlinks the ECB data structure 1202 pointed to by pecb2 from the ECBAEL list 1500 of the ECB data structure 1202 pointed to by pecb1. |

ECBASL List 1501

Description: ECB Associated Signal List. The ECBASL list 1501 supports the SCB data structures 1207 linked to the ECB data structure 1202 for each one of the SCB data structure 1207 associated with the ECB data structure 1202.
Number of lists: Up to 1 per ECB data structure 1202
root block 1300 type: ECB data structure 1202
Root block linking field 1301: *ECB_NextECBASL field 2010
list element 1302 type: SCB data structure 1207
linking field 1301 to next element 1303: *SCB_NextSCB field 2205
linking field 1301 to the previous element 1304: Not required
sort field 1305: SCBType field 2201
Sort criteria: Not required
Associated Functions:

| | |
|---|---|
| void gk_ECBASL_Link(GS_ECB *pecb, GS_SCB *pscb) | Links the SCB data structure 1207 pointed to by pscb to the ECBASL list 1501 of the ECB data structure 1202 pointed to by pecb. |
| INT32 gk_ECBASL_Unlink(GS_TCB *ptcb, GS_SCB *pscb) | Unlink the SCB data structure 1207 pointed to by pscb from the ECBASL list 1501 of the ECB data structure 1202 pointed to by pecb. |

ECBFL List 1502
Description: ECB Free List. The ECBFL list 1502 links all the free ECB data structures 1202 of the computer program.
Number of lists: 1
root block 1300 type: KCB data structure 1200
Root block linking field 1301: *KCB_NextECBFL field 1804
list element 1302 type: ECB data structure 1202
linking field 1301 to next element 1303: *ECB_NextECB field 2003
linking field 1301 to the previous element 1304: Not required
sort field 1305: Not required
Sort criteria: Not required
Associated Functions:

| | |
|---|---|
| INT32 gk_ECBFL_Link(GS_ECB *pecb) | Links the ECB data structure 1202 pointed to by pecb to the ECBFL list 1502. |
| GS_ECB *gk_ECB_GetFree(void) | Unlinks an ECB data structure 1202 from the ECBFL list 1502 and returns a pointer to the ECB data structure 1202. Returns NULL if there is no ECB data structure 1202 linked to the ECBFL list 1502. |

ECBTL List 1503
Description: ECB Time List. The ECBTL list 1503 links all the timed ECB data structures 1202 sorted by the ECBValue field 2002.
Number of lists: 1
root block 1300 type: KCB data structure 1200
Root block linking field 1301: *KCB_NextECBTL field 1801
list element 1302 type: ECB data structure 1202
linking field 1301 to next element 1303: *ECB_NextECB field 2003
linking field 1301 to the previous element 1304: *ECB_PrevECB field 2004
sort field 1305: ECBValue field 2002
Sort criteria: Ascending
Associated Functions:

| | |
|---|---|
| void gk_ECBTL_Link (GS_ECB *pecb, GS_TCB *ptcb) | Links the ECB data structure 1202 pointed to by pecb to: (1) the ECBTL list 1503 and (2) the TCBAEL list 1515 of the TCB data structure 1201 pointed to by ptcb. |
| void gk_ECBTL_Unlink(GS_ECB *pecb) | Unlinks the ECB data structure 1202 pointed to by pecb from the ECBTL list 1503. |

KCBASL List 1522
Description: KCB Associated Signal List. The KCBASL list 1522 links all the signals associated with the KCB data structure 1200.
Number of lists: 1
root block 1300 type: KCB data structure 1200
Root block linking field 1301: *KCB_NextKCBASL field 1810
list element 1302 type: SCB data structure 1207
linking field 1301 to next element 1303: *SCB_NextSCB field 2205
linking field 1301 to the previous element 1304: Not required
sort field 1305: SCBType field 2201
Sort criteria: Not required
Associated Functions:

| | |
|---|---|
| void gk_KCBASL_Link (GS_SCB *pscb) | Links the SCB data structure 1207 pointed to by pscb to the KCBASL list 1522. |
| INT32 gk_KCBASL_Unlink (GS_SCB *pscb) | Unlinks the SCB data structure 1207 pointed to by pscb from the KCBASL list 1522. |

LCBFPL List 1504
Description: LCB Free Processor List. The LCBFPL list 1504 links all the free PCB data structures 1209 of the computer program.
Number of lists: Up to 1 per LCB data structure 1208
root block 1300 type: LCB data structure 1208
Root block linking field 1301: *LCB_NextLCBFPL field 2307
list element 1302 type: PCB data structure 1209
linking field 1301 to next element 1303: *PCB_NextPCB field 2407
linking field 1301 to the previous element 1304: *PCB_PrevPCB field 2408
sort field 1305: Not required
Sort criteria: Ascending
Associated Functions:

| | |
|---|---|
| void gk_LCBFPL_Link (int processorID) | Links the PCB data structure 1209 associated with processor of the plurality of processors 110-112 with internal identification register CPUID 123-125 equal to processorID to the LCBFPL list 1504. |
| void gk_LCBFPL_Unlink (int processorID) | Unlinks the PCB data structure 1209 associated with processor of the plurality of processors 110-112 with internal identification register CPUID 123-125 equal to processorID from the LCBFPL list 1504. |

LCBL List 1505
Description: LCB List. The LCBL list 1505 links all the LCB data structures 1208 of the computer program.
Number of lists: 1
root block 1300 type: KCB data structure 1200

Root block linking field 1301: *KCB_NextLCBL field 1809
    list element 1302 type: LCB data structure 1208
    linking field 1301 to next element 1303: *LCB_NextLCBL field 2305
    linking field 1301 to the previous element 1304: *LCB_PrevLCBL field 2306
    sort field 1305: LCBRunPriority field 2302
    Sort criteria: Ascending
    Associated Functions:

| | |
|---|---|
| void gk_LCBL_Link(GS_LCB *plcb) | Links the LCB data structure 1208 pointed to by plcb to the LCBL list 1505 sorted by its LCBRunPriority field 2302. |
| void gk_LCBL_UnLink(GS_LCB *plcb) | Unlinks the LCB data structure 1208 pointed to by plcb from the LCBL list 1505. |

MCBFL List 1506
    Description: MCB Free List. The MCBFL list 1506 links all the free MCB data structures 1206 of the computer program.
    Number of lists: 1
    root block 1300 type: KCB data structure 1200
    Root block linking field 1301: *KCB_NextMCBFL field 1808
    list element 1302 type: MCB data structure 1206
    linking field 1301 to next element 1303: *MCB_NextMCB field
    linking field 1301 to the previous element 1304: Not required
    sort field 1305: Not required
    Sort criteria: Not required
    Associated Functions:

| | |
|---|---|
| void gk_MCBFL_Link(GS_MCB *pmcb) | Links the MCB data structure 1206 pointed to by pmcb to the MCBFL list 1506. |
| GS_MCB *gk_MCB_GetFree(void) | Unlinks a MCB data structure 1206 from the MCBFL list 1506 and returns its pointer. Returns NULL if there is no free MCB data structure 1206 available. |

MCBQL List 1507
    Description: MCB Message Queue List. The MCBQL list 1507 links all the MCB data structures 1206 of a Queue List.
    Number of lists: Up to 1 per RCB data structure 1203
root block 1300 type: RCB data structure 1203
Root block linking field 1301: MCB_Start
list element 1302 type: MCB data structure 1206
    linking field 1301 to next element 1303: *MCB_NextMCB field
    linking field 1301 to the previous element 1304: *MCB_PrevMCB field
    sort field 1305: Not required
    Sort criteria: Not required
    Associated Functions:

| | |
|---|---|
| int gk_MCBQL_Link(GS_MCB *pmcb, G_RCB * prcb) | Links the MCB data structure 1206 pointed to by pmcb to the MCBQL list 1507 of the RCB data structure 1203 pointed to by prcb. The MCB_ID field is assigned with the current system time to assure it is unique and monotonic increasing. |
| void gk_MCBQL_Unlink(GS_MCB *pmcb, G_RCB * prcb) | Unlinks the MCB data structure 1206 pointed to by pmcb from the MCBQL list 1507 of the RCB data structure 1203 pointed to by prcb. |
| GS_MCB *gk_MCBQL_GetNextID (mcbid, G_RCB * prcb) | Returns the first MCB data structure 1206 linked to the MCBQL list 1507 of the RCB data structure 1203 pointed to by prcb with MCB_ID field greater than mcbid. Returns NULL if no MCB_ID field is found. |

RCBASL List 1508
    Description: RCB Associated Signal List. The RCBASL list 1508 links all the associated SCB data structures 1207 of an RCB data structure 1203.
    Number of lists: Up to 1 per RCB
    root block 1300 type: RCB data structure 1203
    Root block linking field 1301: *RCB_NextRCBASL field 2110
    list element 1302 type: SCB data structure 1207
    linking field 1301 to next element 1303: *SCB_NextSCB field 2205
    linking field 1301 to the previous element 1304: Not required
    sort field 1305: Not required
    Sort criteria: SCBType field 2201
    Associated Functions:

| | |
|---|---|
| void gk_RCBASL_Link(G_RCB *prcb, GS_SCB *pscb) | Links the SCB data structure 1207 pointed to by pscb to the RCBASL list 1508 of the RCB data structure 1203 pointed to by prcb. |
| void gk_RCBASL_Unlink(G_RCB *prcb, GS_SCB *pscb) | Unlinks the SCB data structure 1207 pointed to by pscb from the RCBASL list 1508 of the RCB data structure 1203 pointed to by prcb. |

RCBFL List 1509
    Description: RCB Free List. The RCBFL list 1509 links all the free RCB data structures 1203 of the computer program.
    Number of lists: 1
    root block 1300 type: KCB data structure 1200
    Root block linking field 1301: *KCB_NextRCBFL field 1805
    list element 1302 type: RCB data structure 1203
    linking field 1301 to next element 1303: *RCB_NextRCB field 2109
    linking field 1301 to the previous element 1304: Not required
    sort field 1305: Not required
    Sort criteria: SCBType field 2201
    Associated Functions:

| | |
|---|---|
| void gk_RCBFL_Link(G_RCB *prcb) | Links the RCB data structure 1203 pointed to by prcb to the RCBFL list 1509. |
| G_RCB *gk_RCB_GetFree(void) | Unlinks an RCB data structure 1203 from the RCBFL list 1509 and returns its pointer. Returns NULL if there is no free RCB data structure 1203 available. |

RCBGEL List 1510
    Description: RCB Granted Event List. The RCBGEL list 1510 links all the associated ECB data structures 1202 that grant the RCB data structure 1203.

Number of lists: Up to 1 per RCB data structure 1203
root block 1300 type: RCB data structure 1203
Root block linking field 1301: *RCB_NextRCBGEL field 2108
list element 1302 type: ECB data structure 1202
linking field 1301 to next element 1303: *ECB_NextECB field 2003
linking field 1301 to the previous element 1304: *ECB_PrevECB field 2004
sort field 1305: ECB Value field 2002
Sort criteria: Ascending
Associated Functions:

| | |
|---|---|
| GS_ECB *gk_RCBGEL_Link(G_RCB *prcb, GS_ECB *pecb) | Links the ECB data structure 1202 pointed to by pecb (or get a free ECB data structure 1202 if pecb is NULL) to the RCBGEL list 1510 of the RCB data structure 1203 pointed to by prcb and returns a pointer to the ECB data structure 1202 linked. |
| void gk_RCBGEL_Unlink(GS_ECB *pecb) | Unlinks the ECB data structure 1202 pointed to by pecb from the RCBGEL list 1510 of the RCB data structure 1203 pointed to by prcb. |
| GS_ECB *gk_TCB_in_RCBGEL (G_RCB *prcb, GS_TCB *ptcb) | Returns the pointer to the ECB data structure 1202 associated with the TCB data structure 1201 that grants the RCB data structure 1203 pointed to by prcb, or NULL if it is not granted. |

RCBWEL List 1511
Description: RCB Waiting Event List. The RCBWEL list 1511 links all the associated ECB data structures 1202 that wait for the RCB data structure 1203.
Number of lists: Up to 1 per RCB data structure 1203
root block 1300 type: RCB data structure 1203
Root block linking field 1301: *RCB_NextRCBWEL field 2107
list element 1302 type: ECB data structure 1202
linking field 1301 to next element 1303: *ECB_NextECB field 2003
linking field 1301 to the previous element 1304: *ECB_PrevECB field 2004
sort field 1305: ECBTimePriority
Sort criteria: Ascending
Associated Functions:

| | |
|---|---|
| GS_ECB *gk_RCBWEL_Link(G_RCB *prcb, GS_ECB *pecb) | Links the ECB data structure 1202 pointed to by pecb to the RCBWEL list 1511 pointed to by prcb. |
| void gk_RCBWEL_Unlink(GS_ECB *pecb) | Unlinks the ECB data structure 1202 from which the RCBWEL list 1511 is linked. |

RRDSASL List 1512
Description: RRDS Associated Signal List. The RRDSASL list 1512 links the associated SCB data structures 1207 of an RRDS data structure 1210.
Number of lists: Up to 1 per RRDS data structure 1210
root block 1300 type: RRDS data structure 1210
Root block linking field 1301: *RRDS_NextSCB field
list element 1302 type: SCB data structure 1207
linking field 1301 to next element 1303: *SCB_NextSCB field 2205
linking field 1301 to the previous element 1304: Not required
sort field 1305: SCBPriority field 2202
Sort criteria: Descending
Associated Functions:

| | |
|---|---|
| void gk_RRDSASL_Link(GS_RRDS *prrds, GS_SCB *pscb) | Links the SCB data structure 1207 pointed to by pscb to the RRDSASL list 1512 of the RRDS data structure 1210 pointed to by prrds. |
| void gk_RRDSASL_UnLink(GS_RRDS *prrds, GS_SCB *pscb) | Unlinks the SCB data structure 1207 pointed to by pscb from the RRDSASL list 1512 of the RRDS data structure 1210 pointed to by prrds. |

RRDSFL List 1513
Description: RRDS Free List. The RRDSFL list 1513 links all the free RRDS data structures 1210 of the computer program.
Number of lists: 1
root block 1300 type: KCB data structure 1200
Root block linking field 1301: *KCB_NextRRDSFL field 1806
list element 1302 type: RRDS data structure 1210
linking field 1301 to next element 1303: *RRDS_NextRRDS field
linking field 1301 to the previous element 1304: Not required
sort field 1305: Not required
Sort criteria: Not required
Associated Functions:

| | |
|---|---|
| void gk_RRDSFL_Link(GS_RRDS *prrds) | Links the RRDS data structure 1210 pointed to by prrds to the RRDSFL list 1513. |
| GS_RRDS *gk_RRDS_GetFree(void) | Unlinks a RRDS data structure 1210 from the RRDSFL list 1513 and returns its pointer (NULL if there is no free RRDS data structure 1210 available). |

SCBFL List 1514
Description: SCB Free List. The SCBFL list 1514 links all the free SCB data structures 1207 of the computer program.
Number of lists: 1
root block 1300 type: KCB data structure 1200
Root block linking field 1301: *KCB_NextSCBFL field 1807
list element 1302 type: SCB data structure 1207
linking field 1301 to next element 1303: *SCB_NextSCB field 2205
linking field 1301 to the previous element 1304: Not required
sort field 1305: Not required
Sort criteria: Not required
Associated Functions:

| | |
|---|---|
| void gk_SCBFL_Link(GS_SCB *pscb) | Links the SCB data structure 1207 pointed to by pscb to the SCBFL list 1514. |
| GS_SCB *gk_SCB_GetFree(void) | Unlinks a SCB data structure 1207 from the SCBFL list 1514 and returns its pointer (NULL if there is no free SCB data structure 1207 available). |

SCBAPSL List 1523

Description: SCB Associated Pending Signal List. The SCBAPSL list 1523 links all the pending SCB data structures 1207.

Number of lists: Up to 1 per SCB data structure 1207
root block 1300 type: SCB data structure 1207
Root block linking field 1301: *SCB_NextSCBAPSL field 2206
list element 1302 type: SCB data structure 1207
linking field 1301 to next element 1303: *SCB_NextSCBAPSL field 2206
linking field 1301 to the previous element 1304: Not required
sort field 1305: Not required
Sort criteria: Not required
Associated Functions:

| | |
|---|---|
| void gk_SCBFL_Link(GS_SCB *pscb_root, GS_SCB *pscb_pend) | Links the SCB data structure 1207 pointed to by pscb_pend to the SCBAPSL list 1523 of the SCB data structure 1207 pointed to by pscb_root. |
| void gk_SCBFL_UnLink(GS_SCB *pscb_root, GS_SCB * pscb_pend) | Unlinks the SCB data structure 1207 pointed to by pscb_pend from the SCBAPSL list 1523 of the SCB data structure 1207 pointed to by pscb_root. |

TCBAEL List 1515

Description: TCB Associated Event List. The TCBAEL list 1515 links all the ECB data structures 1202 associated with a TCB data structure 1201.

Number of lists: Up to 1 per TCB data structure 1201
root block 1300 type: TCB data structure 1201
Root block linking field 1301: *TCB_NextTCBAEL field 1915
list element 1302 type: ECB data structure 1202
linking field 1301 to next element 1303: *ECB_NextTCBAEL field 2007
linking field 1301 to the previous element 1304: *ECB_PrevTCBAEL field 2008
sort field 1305: Not required
Sort criteria: Not required
Associated Functions:

| | |
|---|---|
| void gk_TCBAEL_Link(GS_ECB *pecb, GS_TCB *ptcb) | Links the ECB data structure 1202 pointed to by pecb to the TCBAEL list 1515 of the TCB data structure 1201 pointed to by ptcb. |
| void gk_TCBAEL_Unlink(GS_ECB *pecb) | Unlinks the ECB data structure 1202 pointed to by pecb from the TCBAEL list 1515 of the associated TCB data structure 1201. |

TCBASL List 1516

Description: TCB Associated Signal List. The TCBASL list 1516 links all the SCB data structures 1207 associated with a TCB data structure 1201.

Number of lists: Up to 1 per TCB data structure 1201
root block 1300 type: TCB data structure 1201
Root block linking field 1301: *TCB_NextTCBASL field 1916
list element 1302 type: SCB data structure 1207
linking field 1301 to next element 1303: *SCB_NextSCB field 2205
linking field 1301 to the previous element 1304: Not required
sort field 1305: SCBType field 2201
Sort criteria: Ascending
Associated Functions:

| | |
|---|---|
| void gk_TCBASL_Link(GS_TCB *ptcb, GS_SCB *pscb) | Links the SCB data structure 1207 pointed to by pscb to the TCBASL list 1516 of the TCB data structure 1201 pointed to by ptcb. |
| void gk_TCBASL_Unlink(GS_TCB *ptcb, GS_SCB *psignal) | Unlinks the SCB data structure 1207 pointed to by pscb from the TCBASL list 1516 of the TCB data structure 1201 pointed to by ptcb. |

TCBFL List 1517

Description: TCB Free List. The TCBFL list 1517 links all the free TCB data structure 1201 of the computer program.

Number of lists: 1
root block 1300 type: KCB data structure 1200
Root block linking field 1301: *KCB_NextTCBFL field 1803
list element 1302 type: TCB data structure 1201
linking field 1301 to next element 1303: *TCB_NextTCB field 1913
linking field 1301 to the previous element 1304: Not required
sort field 1305: Not required
Sort criteria: Not required
Associated Functions:

| | |
|---|---|
| void gk_TCBFL_Link(GS_TCB *ptcb) | Links the TCB data structure 1201 pointed to by ptcb to the TCBFL list 1517. |
| GS_TCB *gk_TCB_GetFree(void) | Unlinks a TCB data structure 1201 from the TCBFL list 1517 and returns its pointer (NULL if there is no free TCB data structure 1201 available). |

TCBPSL List 1518

Description: TCB Pending Signal List. The TCBPSL list 1518 links all the pending SCB data structures 1207 of the TCB data structure 1201.

Number of lists: Up to 1 per TCB data structure 1201
root block 1300 type: TCB data structure 1201
Root block linking field 1301: *TCB_NextTCBPSL field 1917
list element 1302 type: SCB data structure 1207
linking field 1301 to next element 1303: *SCB_NextSCB field 2205
linking field 1301 to the previous element 1304: Not required
sort field 1305: SCBPriority field 2202
Sort criteria: Descending
Associated Functions:

| | |
|---|---|
| void gk_TCBPSL_Link (GS_TCB *ptcb, GS_SCB *pscb) | Links the SCB data structure 1207 pointed to by pscb to the TCBPSL list 1518 of the TCB data structure 1201 pointed to by ptcb. |
| void gk_TCBPSL_Unlink (GS_TCB *ptcb, GS_SCB *pscb) | Unlinks the SCB data structure 1207 pointed to by pscb from the TCBPSL list 1518 of the TCB data structure 1201 pointed to by ptcb. |

TCBRDYL List 1519

Description: TCB Ready List. The TCBRDYL list 1519 links all the TCB data structures 1201 of the tasks in the ready state 1701 associated with a LCB data structure 1208.

Number of lists: Up to 1 per LCB data structure 1208
root block 1300 type: LCB data structure 1208
Root block linking field 1301: *LCB_NextTCBRDYL field 2304
   list element 1302 type: TCB data structure 1201
   linking field 1301 to next element 1303: *TCB_NextTCB field 1913
   linking field 1301 to the previous element 1304: *TCB_PrevTCB field 1914
   sort field 1305: TCBCurrentPriority field 1905
   Sort criteria: Ascending
   Associated Functions:

| | |
|---|---|
| void gk_TCBRDYL_Link (GS_TCB *ptcb) | Links the TCB data structure 1201 pointed to by ptcb to its TCBRDYL list 1519. |
| void gk_TCBRDYL_Unlink (GS_TCB *ptcb) | Unlinks the TCB data structure 1201 pointed to by ptcb from its TCBRDYL list 1519 |

TCBRUNL List 1520
Description: TCB Running List. The TCBRUNL list 1520 links all the TCB data structures 1201 of the tasks in the running state 1702 associated with an LCB data structure 1208.
   Number of lists: Up to 1 per LCB data structure 1208
   root block 1300 type: LCB data structure 1208
   Root block linking field 1301: *LCB_NextTCBRUNL field 2303
   list element 1302 type: TCB data structure 1201
   linking field 1301 to next element 1303: *TCB_NextTCB field 1913
   linking field 1301 to the previous element 1304: *TCB_PrevTCB field 1914
   sort field 1305: TCBCurrePriority
   Sort criteria: Descending
   Associated Functions:

| | |
|---|---|
| void gk_TCBRUNL_Link (GS_TCB *ptcb) | Links the TCB data structure 1201 pointed to by ptcb to its TCBRUNL list 1520 |
| void gk_TCBRUNL_Unlink (GS_TCB *ptcb) | Unlinks the TCB data structure 1201 pointed to by ptcb from the TCBRUNL list 1520 |

TCBWL List 1521
Description: TCB Waiting List. The TCBWL list 1521 links all the TCB data structures 1201 of the tasks in the waiting state 1700.
   Number of lists: 1
   root block 1300 type: KCB data structure 1200
   Root block linking field 1301: *KCB_NextTCBWL field 1802
   list element 1302 type: TCB data structure 1201
   linking field 1301 to next element 1303: *TCB_NextTCB field 1913
   linking field 1301 to the previous element 1304: *TCB_PrevTCB field 1914
   sort field 1305: Not required
   Sort criteria: Not required
   Associated Functions:

| | |
|---|---|
| void gk_TCBWL_Link (GS_TCB *ptcb) | Links the TCB data structure 1201 pointed to by ptcb to the TCBWL list 1521 |
| void gk_TCBWL_Unlink (GS_TCB *ptcb) | Unlinks the TCB data structure 1201 pointed to by ptcb from the TCBWL list 1521 |

Additional Functions Associated with Data Structures and Lists.

Additional functions may be defined over data structures and lists. An embodiment of additional functions may be:

| | |
|---|---|
| TIME gk_now (void) | Returns the current time by reading the value of the R_TM_CNT register 307. |
| GS_TCB *gk_TCB_GetCurrent(void) | Returns a pointer to the TCB data structure 1201 that is executed in the current processor of the plurality of processors 110-112. |
| INT32 gk_MCB_Copy (pmcb2, pmcb1) | Copies the MCB data structure 1206 pointed to by pmcb1 to the MCB data structure 1206 pointed to by pmcb2, cloning the message pointed to by *MCB_StartMessage field and *MCB_EndMessage field. |

Data structures may be linked to different lists according to the specific state of each one during runtime. For instance, a TCB data structure 1201 may be linked to: TCBFL list 1517, TCBRDYL list 1519, TCBRUNL list 1520 or TCBWL list 1521. The TCB_Unlink function unlinks a TCB data structure 1201 according to the list to which it is linked. An embodiment of associated data structure functions may include:

| | |
|---|---|
| void gk_TCB_Unlink (GS_TCB *ptcb) | Unlinks the TCB data structure 1201 according to the list to which it is linked. |
| void gk_ECB_Unlink (GS_ECB *pecb) | Unlinks the ECB data structure 1202 according to the list to which it is linked. |
| void gk_SCB_Unlink (GS_SCB *pscb) | Unlinks the SCB data structure 1207 according to the list to which it is linked. |

Data structures can only be modified by a processor of the plurality of processors 110-112 that grants the critical section.

Computer Program Code Structure

Figure 26:
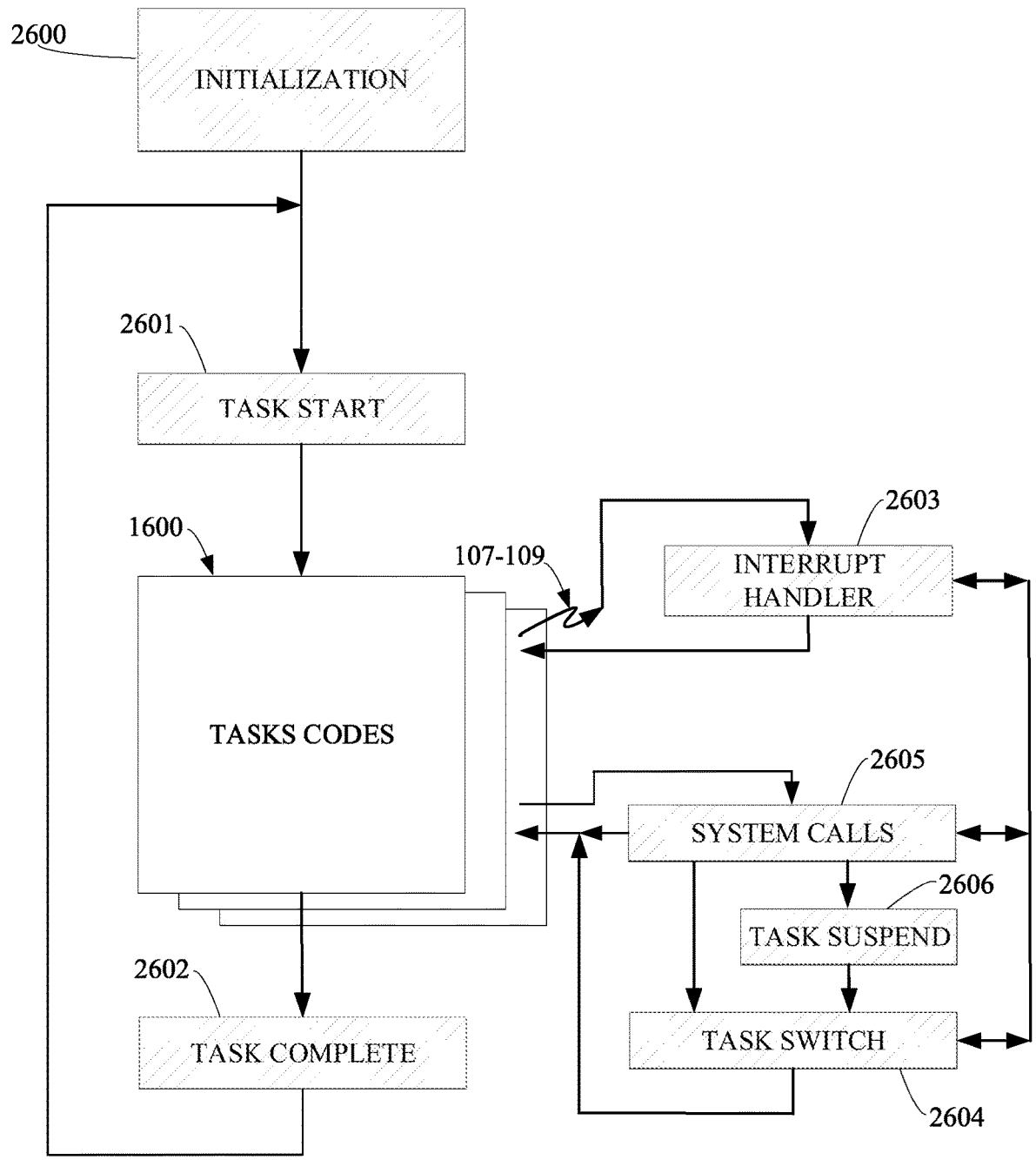
FIG. 26 shows an embodiment of the structure of the computer program.

FIG. 26 shows an embodiment of the code structure of the computer program. Shadow sections are executed in the critical section of the controller apparatus 100. The embodiment includes the following sections:
   initialization section 2600: initializes the data structures of the computer program.
   task start section 2601: restores the state of the next task to be executed by the processor of the plurality of processors 110-112.
   interrupt handler section 2603: the code section that should be executed when the controller apparatus 100 asserts a processor interrupt request (PIRQ) of the plurality of processor interrupt requests (PIRQs) 107-109. The code of this section is executed in the critical section of the controller apparatus 100.
   task switch section 2604: checks if task context switching is required and saves and restores the task status accordingly. It also checks when a pending signal must be executed and sets the task stack 1601 for its execution.
   system call section 2605: groups the functions that the computer program allows to call from tasks. System calls may be called from tasks but require granting the critical section of the controller apparatus 100 to be executed.
   tasks codes 1600: are executed by system processors (such as the plurality of processors 110-112). Tasks codes 1600 are executed outside the critical section of the controller apparatus 100, but the critical section may be requested when a task code 1600 calls a system call. The task stack 1601 stores the data and information required for the task code 1600 to be executed during runtime. A TCB data structure 1201 is associated with each task to hold all the task statuses required by the computer program for execution.

task suspend section 2606: some system calls produce blocking events 1706 that require saving the status of the task and restoring the status of the highest priority task in order to execute the next ready task while the calling task waits for a release event 1704.

task complete section 2602: is executed when a task completes its execution. The task state is changed to the waiting state 1700 and its status is saved. Then, the start task section is called.

Details on each section are given below.

Task Switch Section 2604

Figure 27:
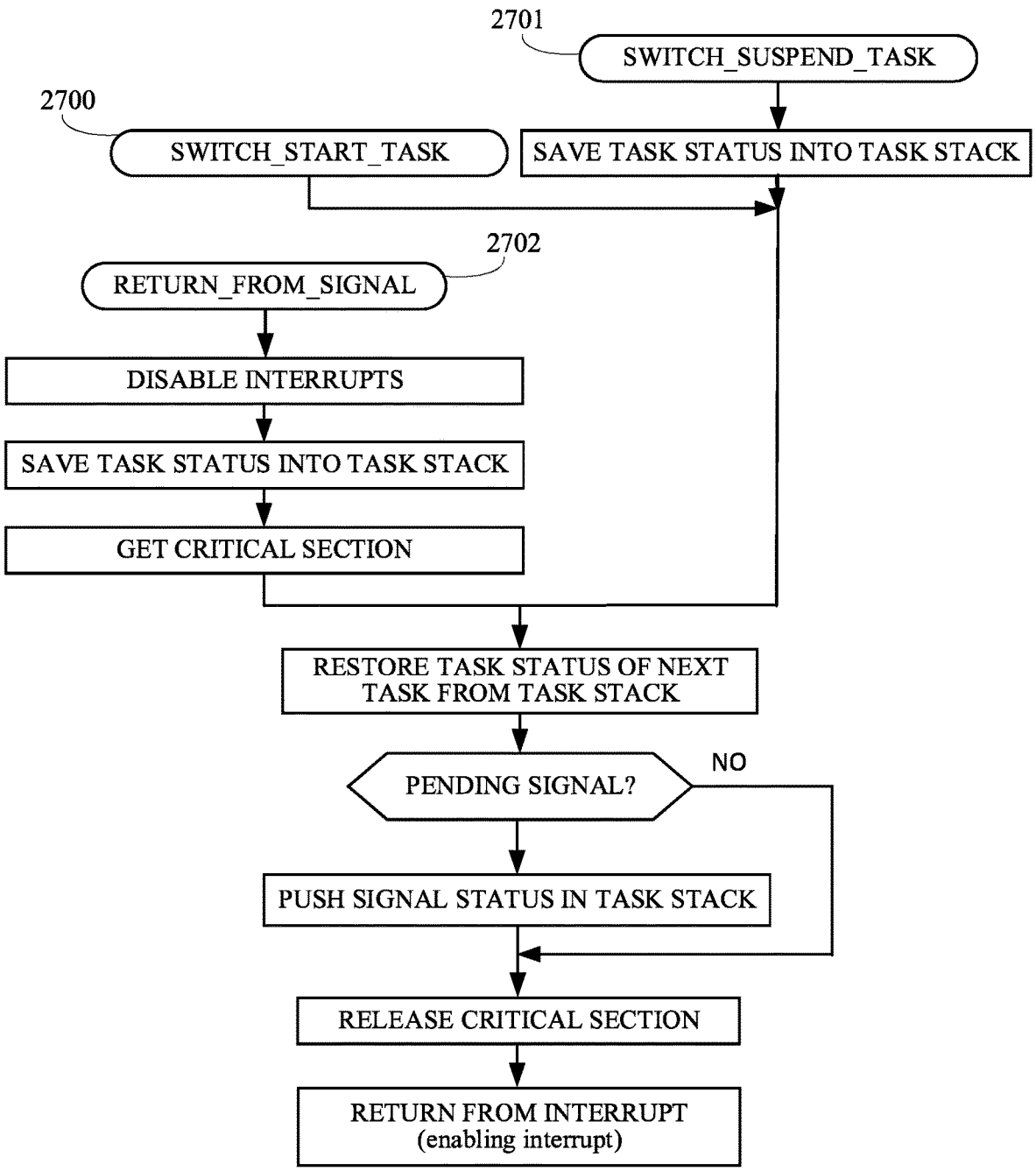
FIG. 27 shows an embodiment of a flow diagram of the context switch routine of the computer program.

FIG. 27 shows an embodiment of the task switch section 2604. This section implements the methods for saving and restoring task statuses according to the states of the tasks. Prior to executing the code of the next task, the pending signals are executed and then, when there is no other pending signal, the code of the task is resumed. The task switch section 2604 presents three entry points:

SWITCH_START_TASK 2700 entry point: restores the status of the next task to be executed.

SWITCH_SUSPEND_TASK 2701 entry point: saves the status of the current task and then restores the status of the next task to be executed.

RETURN_FROM_SIGNAL 2702 entry point: when there exists a pending signal for a task, the RETURN_FROM_SIGNAL 2702 is configured as the return entry point.

The task switch section 2604 is completed by executing a return from interrupt in order to enable the processor interrupt. Before leaving the section, the critical section is released and the corresponding processor interrupt request (PIRQ) of the plurality of processor interrupt requests (PIRQs) 107-109 of the controller apparatus 100 is enabled.

Initialization Section 2600

Figure 28:
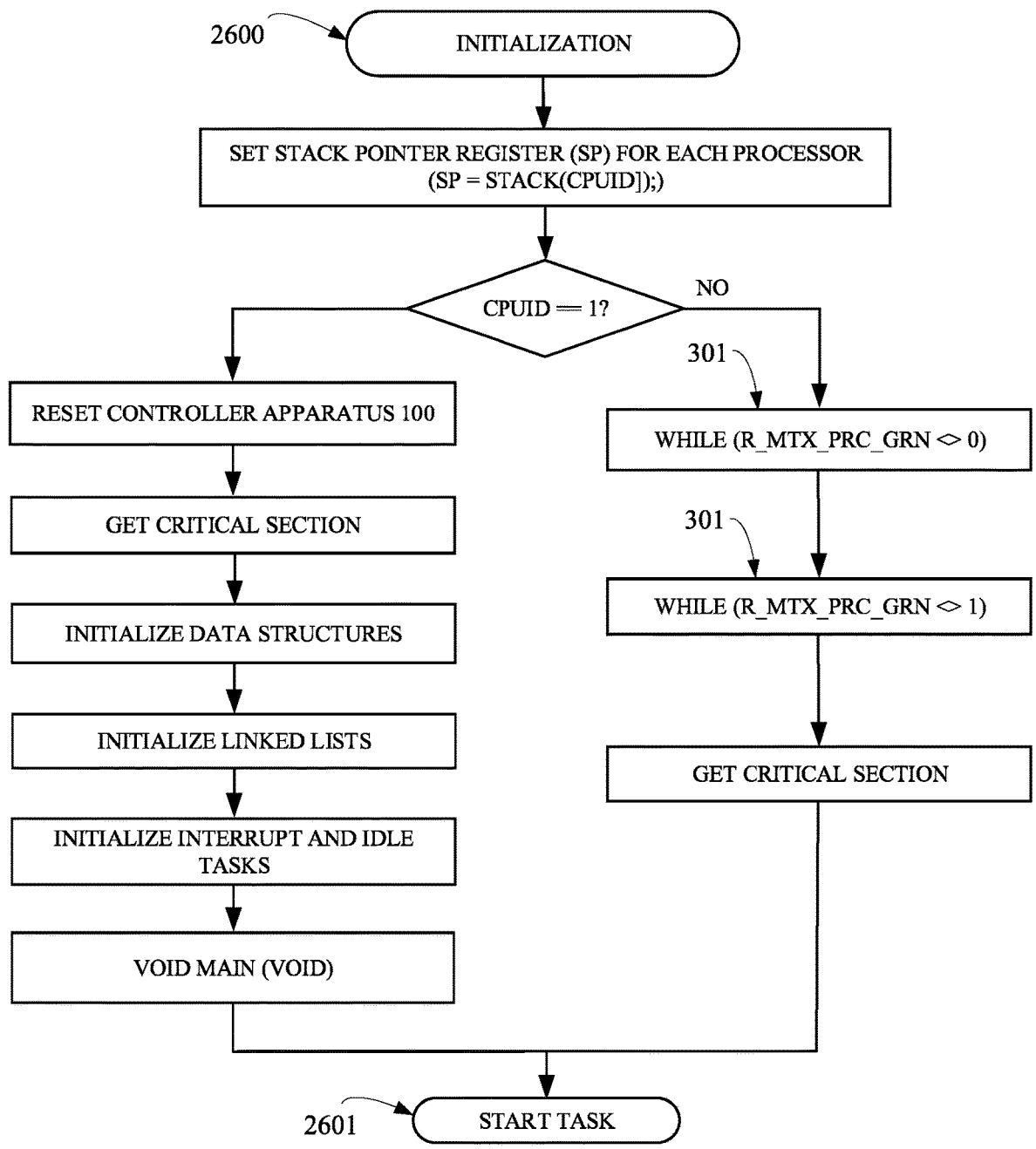
FIG. 28 shows an embodiment of a flow diagram of the initialization routine of the computer program.

FIG. 28 shows an embodiment of the initialization section 2600 that sets the initial value of the data structures of the computer program. At the beginning, the stack pointer register (SP) of each processor of the plurality of processors 110-112 is configured with a unique stack memory address to avoid conflicts among processors of the plurality of processors 110-112. In order to synchronize the initialization, only the processor of the plurality of processors 110-112 whose internal identification register CPUID 123-125 is equal to 1 executes the configuration code of the data structures and the controller apparatus 100. The rest of the processors of the plurality of processors 110-112 waits, until the critical section is granted to the processor of the plurality of processors 110-112 with an internal identification, register CPUID 123-125 equal to 1. Then, they request the critical section and wait for it to be granted. This mechanism guarantees that: (1) the initialization code section is executed before any other section and (2) the rest of processors of the plurality of processors 110-112 start executing tasks codes 1600 after the initialization of the system.

The processor of the plurality of processors 110-112 with an internal identification register CPUID 123-125 equal to 1:

resets the controller apparatus 100: sets bit 0 of the R_CTRL register 300 to 1 (R_CTRL[0]=1) by executing a mem_write(ADDR_CTRL_SET,1) instruction, the internal registers of the controller apparatus 100 are set to their initial values.

gets access to the critical section of the controller apparatus 100: to avoid consistency errors when data structures and linked lists are initialized.

initializes data structures: all the data structures of the computer program are created with their initial values.

initializes linked lists: all linked lists are created in their initial states.

initializes interrupt and idle tasks: creates the interrupt task associating the ISR of each device interrupt request (DIRQ) of the plurality device interrupt requests (DIRQs) 101-103. An idle task is created for each processor of the plurality of processors 110-112 of the system.

executes the main routine (main( )) defined in the user program. The user initializes and creates the user tasks and interrupt tasks in this routine.

The rest of the processors of the plurality of processors 110-112:

wait while the critical section is not granted to a processor of the plurality of processors 110-112 (the R_MTX_PRC_GRN register 301 is equal to 0). When the controller apparatus 100 is reset, the R_MTX_PRC_GRN register 301 is initialized with 0.

wait while the critical section is granted to the processor of the plurality of processors 110-112 with an internal identification register CPUID 123-125 equal to 1 (the R_MTX_PRC_GRN register 301 is equal to 1).

get the critical section: processors of the plurality of processors 110-112 are synchronized to start the execution of user tasks requesting the critical section of the controller apparatus 100.

When the initialization section 2600 is executed, the start task section is executed.

Task Start Section 2601

Figure 29:
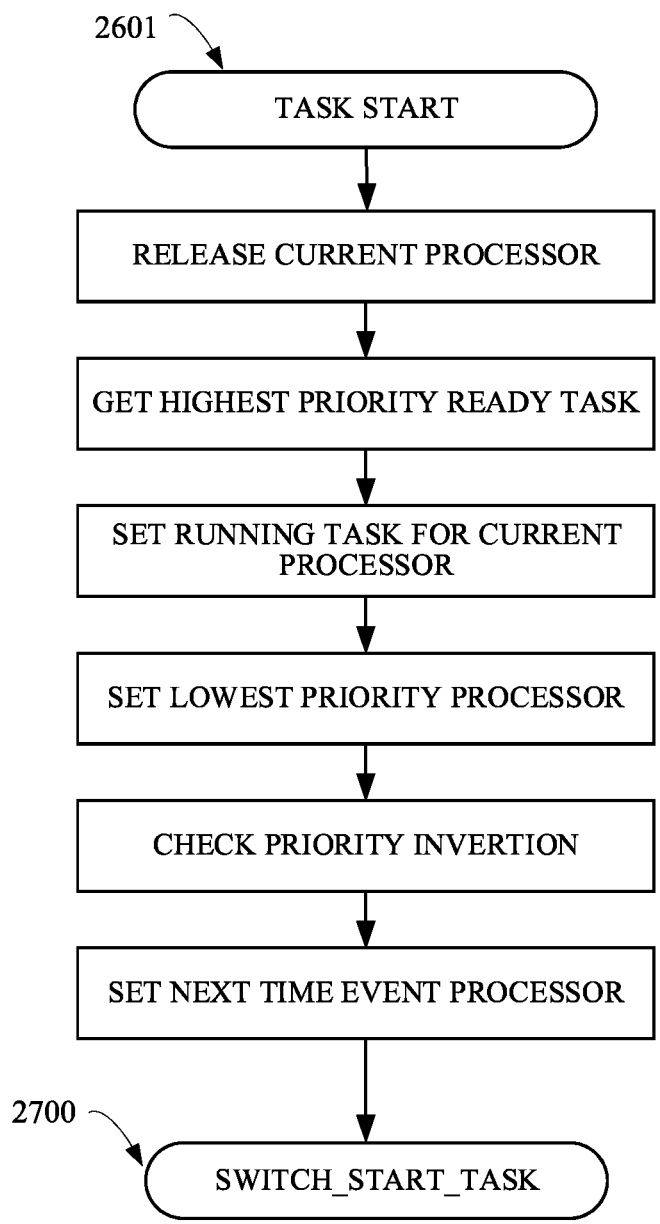
FIG. 29 shows an embodiment of a flow diagram of the start task routine of the computer program.

FIG. 29 shows an embodiment of the task start section 2601. This section is always executed in the critical section of the controller apparatus 100. The processor of the plurality of processors 110-112, when executing this section, performs the following actions:

releases the status of the current processor of the plurality of processors 110-112: the PCB data structure 1209 of the current processor of the plurality of processors 110-112 is set to "no task is assigned to it for execution".

gets the highest priority ready task: the TCBRDYL list 1519 of the processor of the plurality of processors 110-112 is searched for the highest task in the ready state 1701. The search is performed according to the priority that each TCBRDYL list 1519 is assigned in the PCB data structure 1209 of the current processor of the plurality of processors 110-112. If no ready task is found, then the idle task of the processor of the plurality of processors 110-112 is returned.

sets the current executing task in the PCB data structure 1209 of the current processor of the plurality of processors 110-112 equal to the task returned in the previous step. The TCB data structure 1201 of the task is linked to the TCBRUNL list 1520 of the processor of the plurality of processors 110-112 with a priority equal to the running priority of the task.

sets the lowest priority processor in the controller apparatus 100 equal to the internal identification register CPUID 123-125 of the processor of the plurality of processors 110-112 that executes the lowest priority executing task. The lowest priority processor is determined by: the processor of the plurality of processors 110-112 assigned to the first TCB data structure 1201 in the TCBRUNL list 1520 of the first LCB data structure 1208 of the LCB list of the system:

Lowest Priority Processor=*KCB_Next*LCBL* field
1809→*LCB_Next*TCBRUNL* field
2303→*TCB_Assoc*PCB* field 1918.

Consequently, the lowest priority processor in the controller apparatus 100 is configured by setting the R_LOW_PRI_PRC register 313 when the mem_write (ADDR_LOW_PRC_SET, Lowest Priority Processor) instruction is executed.

checks for priority inversions: the current processor of the plurality of processors 110-112 checks whether the lowest priority executing task of its TCBRUNL list 1520 is lower than the highest priority ready task of the same LCB data structure 1208. If this is true, then the trigger interrupt is enabled in the controller apparatus 100 for the processor of the plurality of processors 110-112 that is executing the lowest priority executing task of its TCBRUNL list 1520 of the current processor of the plurality of processors 110-112 by setting the R_TRG_PRC_INT register 314.

sets the next time event processor: sets the bit of the R_NXT_TM_EVN_PRC register 312 associated with the internal identification register CPUID 123-125 of the processor of the plurality of processors 110-112 that executes the task with the next time event to 0 if the next time event is associated with a task that is not in the running state 1702. The next time event processor is the processor of the plurality of processors 110-112 associated with the TCB data structure 1201 linked to the first ECB data structure 1202 of the EBCTL list Next Time Event Processor=*KCB*_Next*ECBTL* field
1801→*ECB*Assoc*TCB*→*TCB_*Assoc*PCB* field 1918.

Consequently, the next time event processor in the controller apparatus 100 is configured by setting the R_TRG_PRC_INT register 314 when the mem_write (ADDR_NXT_TM_PRC_SET, Next Time Event Processor) is executed.

calls the SWITCH_START_TASK 2700 entry point routine to change the status of the processor of the plurality of processors 110-112 to execute the selected task.

Interrupt Handler Section 2603

Figure 30:
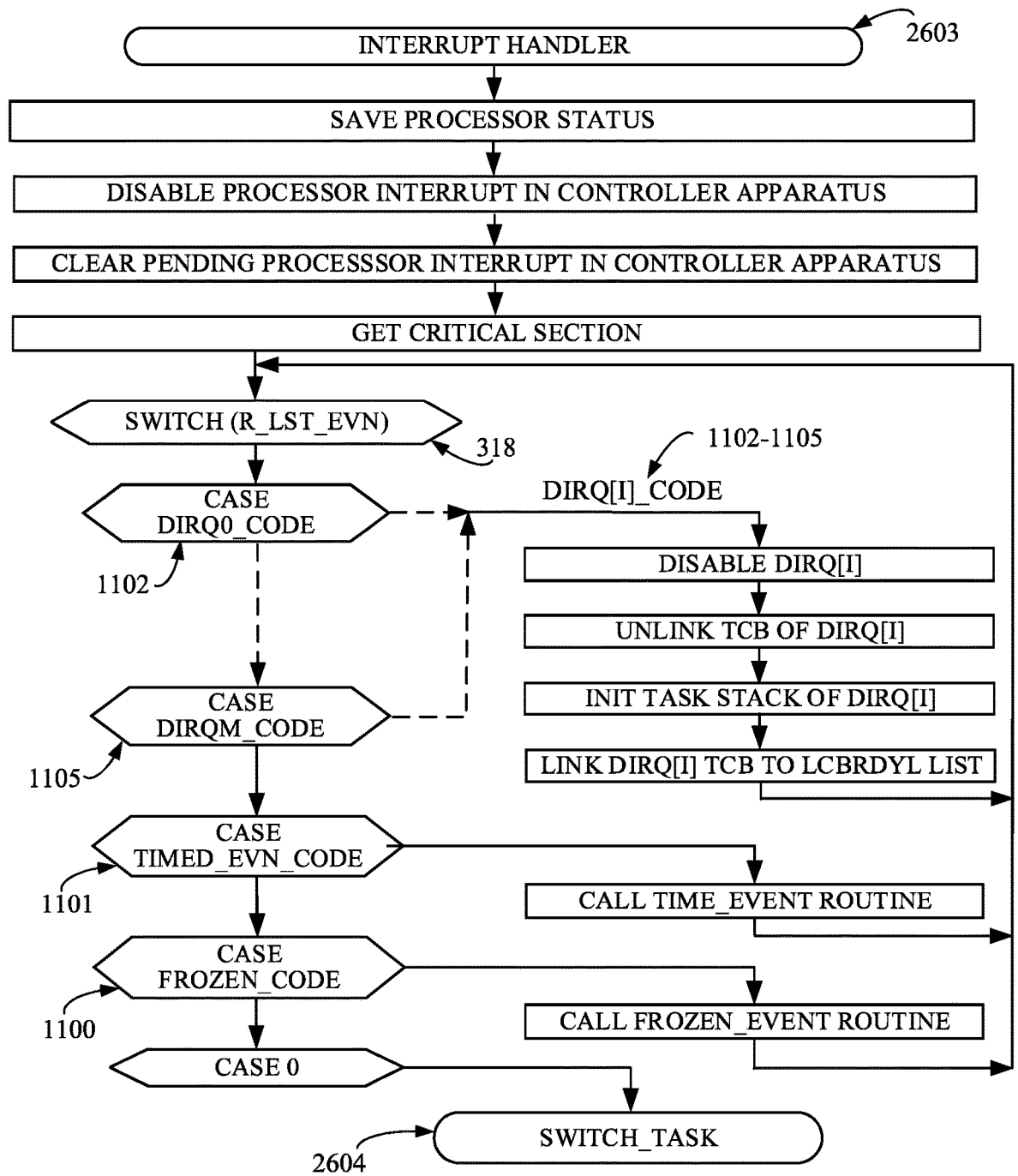
FIG. 30 shows an embodiment of a flow diagram of the IRQ handler routine of the computer program.

FIG. 30 shows an embodiment of the interrupt handler section 2603. The code of this section is executed by processors of the plurality of processors 110-112 when some of them receive a processor interrupt request (PIRQ) of the plurality of processor interrupt requests (PIRQs) 107-109 from the controller apparatus 100 and produces a C1_IRQ_PND signal 706. When a processor of the plurality of processors 110-112 receives an interrupt request from a device interrupt request (DIRQ) of the plurality device interrupt requests (DIRQs) 101-103, the processor of the plurality of processors 110-112 disables the processor interrupt and starts executing the interrupt handler section 2603. In the interrupt handler section 2603, the processor of the plurality of processors 110-112 performs the following procedures:

the status of the processor of the plurality of processors 110-112 is saved into the task stack 1601. All the processor registers are pushed into the task stack 1601 in order to restore them when the interrupted task is resumed.

the processor interrupt request (PIRQ) of the plurality of processor interrupt requests (PIRQs) 107-109 of the controller apparatus 100 associated with the processor of the plurality of processors 110-112 is disabled. No new interrupt will be produced to the processor of the plurality of processors 110-112 by the controller apparatus 100 while it is executing the interrupt handler section 2603.

the processor interrupt request (PIRQ) of the plurality of processor interrupt requests (PIRQs) 107-109 of the controller apparatus 100 associated with the processor of the plurality of processors 110-112 is cleared. The interrupt request is cleared to avoid a new request when it is enabled.

the critical section of the controller apparatus 100 is requested. The processor of the plurality of processors 110-112 waits while requesting the critical section of the controller apparatus 100 until it is granted to the processor of the plurality of processors 110-112.

the R_LST_EVN register 319 of the controller apparatus 100 is read to get the last event that occurred. According to the code read from the R_LST_EVN register 319 of the controller apparatus 100, the following is performed:

Code FROZEN CODE 1100: the FROZEN EVENT routine is called to perform the procedure according to the type of time event that produced the interrupt while the system time is frozen.

Code TIMED_EVN_CODE 1101: the TIME_EVENT routine is called to perform the procedure according to the type of time event that produced the current TIMED_EVN_CODE 1101 event.

Code DIRQLCODE 1102-1105: (1) the requesting device interrupt request (DIRQ) of the plurality device interrupt requests (DIRQs) 101-103 is disabled in the controller apparatus 100, (2) the TCB data structure 1201 associated with the task interrupt of the device interrupt request (DIRQ) of the plurality device interrupt requests (DIRQs) 101-103 is unlinked from the list to which it is currently linked, (3) the task stack 1601 of the interrupt task is initialized and (4) the TCB data structure 1201 is linked to the TCBRDYL list 1519.

Zero (0): there are no more events to process from the controller apparatus 100 and consequently it calls the SWITCH_SUSPEND_TASK 2701 to execute the next task.

The R_LST_EVN register 319 of the controller apparatus 100 is read until the value returned is equal to 0.

System Call Section 2605

Figure 31:
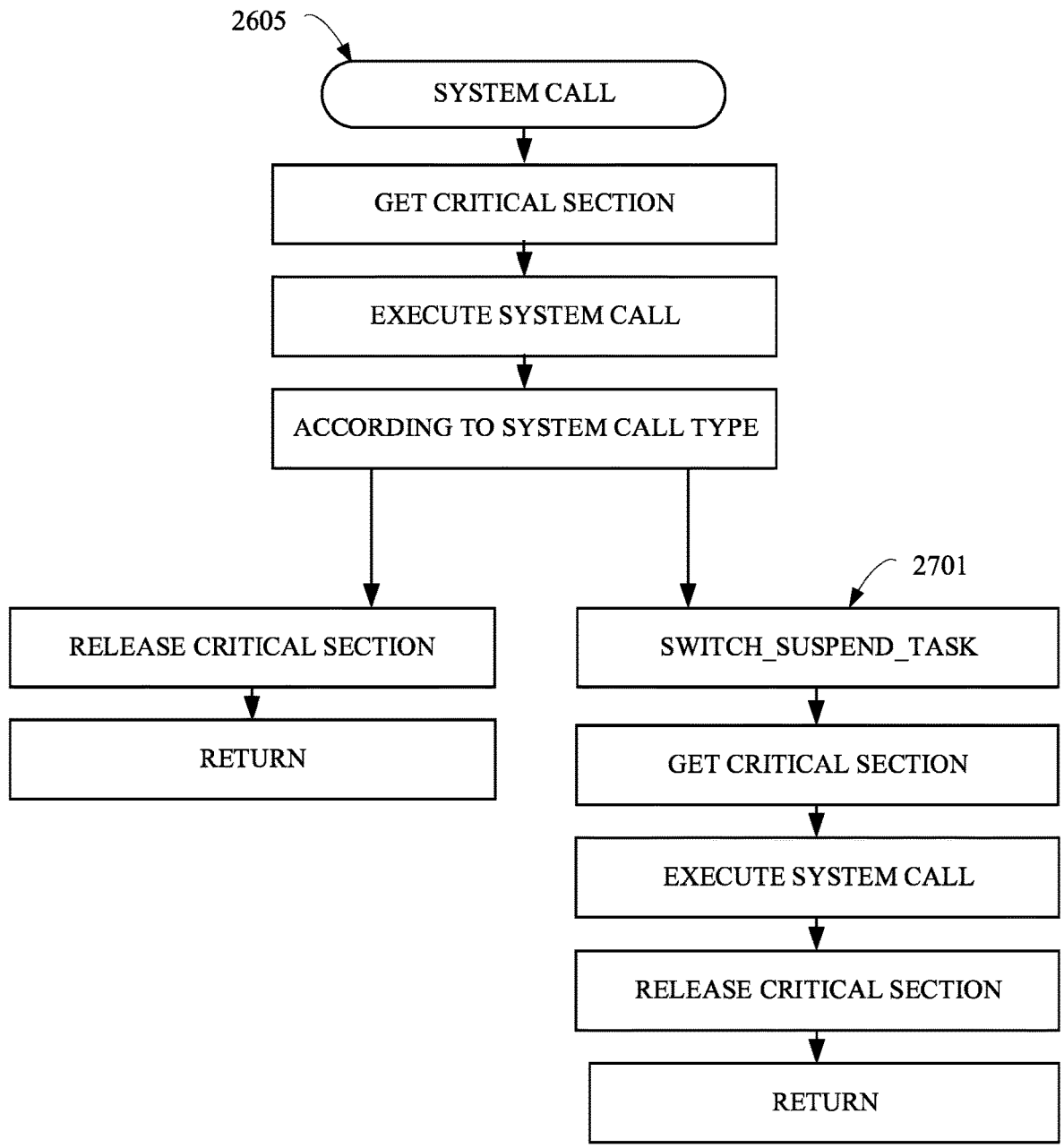
FIG. 31 shows an embodiment of a flow diagram of the system call routine of the computer program.

FIG. 31 shows an embodiment of the system call section 2605. System calls are called from tasks and are executed in the critical section of the controller apparatus 100. The execution of the system call depends on the specific system call. Some system calls do not require a context switch and consequently the critical section of the controller apparatus 100 is released before returning to the caller task. In contrast, when a task requires a context switch, the SWITCH_SUSPEND_TASK 2701 entry point in the task switch section 2604 (FIG. 27) is called. When the task is resumed, the system call should complete its execution but getting the critical section first.

Task Suspend Section 2606

Figure 32:
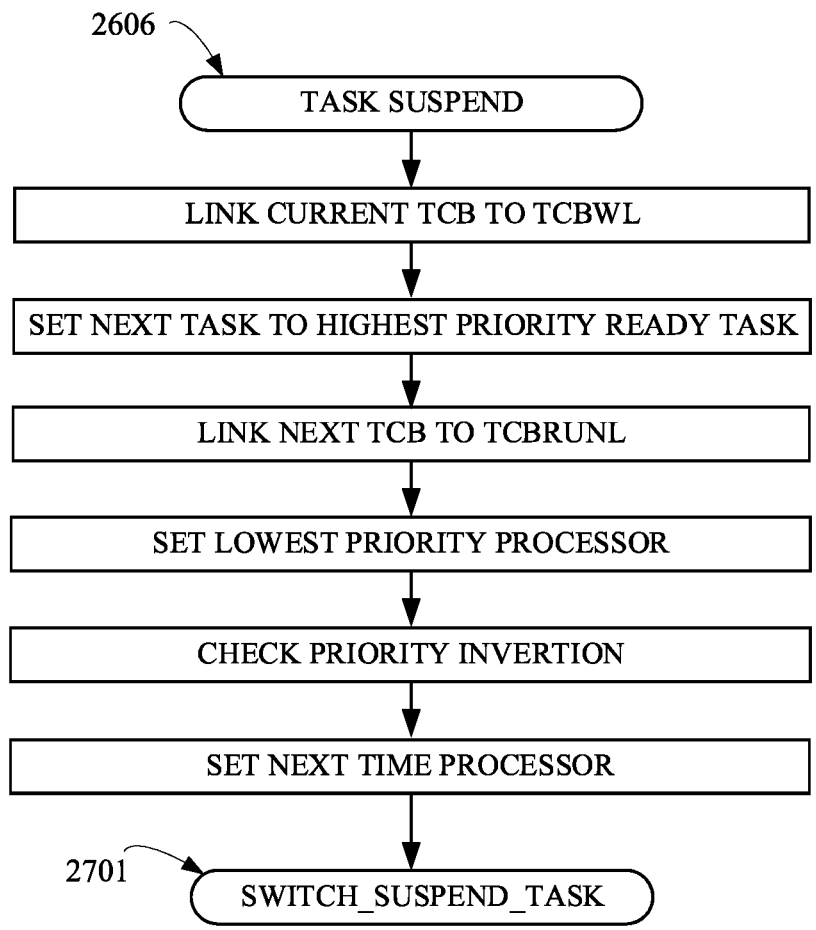
FIG. 32 shows an embodiment of a flow diagram of the suspend task routine of the computer program.

FIG. 32 shows an embodiment of the task suspend section 2606. When a task is suspended (a suspend event 1705 takes places), the following procedure is performed:

the TCB data structure 1201 of the current executing task of the current processor of the plurality of processors 110-112 is unlinked from the TCBRUNL list 1520 and then linked to the TCBWL list 1521. The task remains in the waiting state 1700 until a release event 1704 changes it to the ready state 1701.

the next task to execute is chosen among tasks in the ready state 1701 that may be executed by the current processor of the plurality of processors 110-112.

the next task is linked to the TCBRUNL list 1520 and its state is changed to the running state 1702.

the processor interrupt is set to the running priority of the next task, the LCBL list 1505 is updated accordingly and the lowest priority processor register is set in the controller apparatus 100.

the priority inversion is checked in order to verify that there is no task in the ready state 1701 with higher priority than any task in the running state 1702 for the TCBRUNL list 1520 of the next task. If there is a task in the ready state 1701 with a higher priority than a task that is currently being executed for a processor of the plurality of processors 110-112 in the TCBRUNL list 1520, then the processor interrupt request (PIRQ) of the plurality of processor interrupt requests (PIRQs) 107-109 in the controller apparatus 100 is triggered.

the next time processor is set in the controller apparatus 100.

the SWITCH_SUSPEND_TASK 2701 entry point in the task switch section 2604 (FIG. 27) is called to produce the context switching of a suspended task.

Task Complete Section 2602

Figure 33:
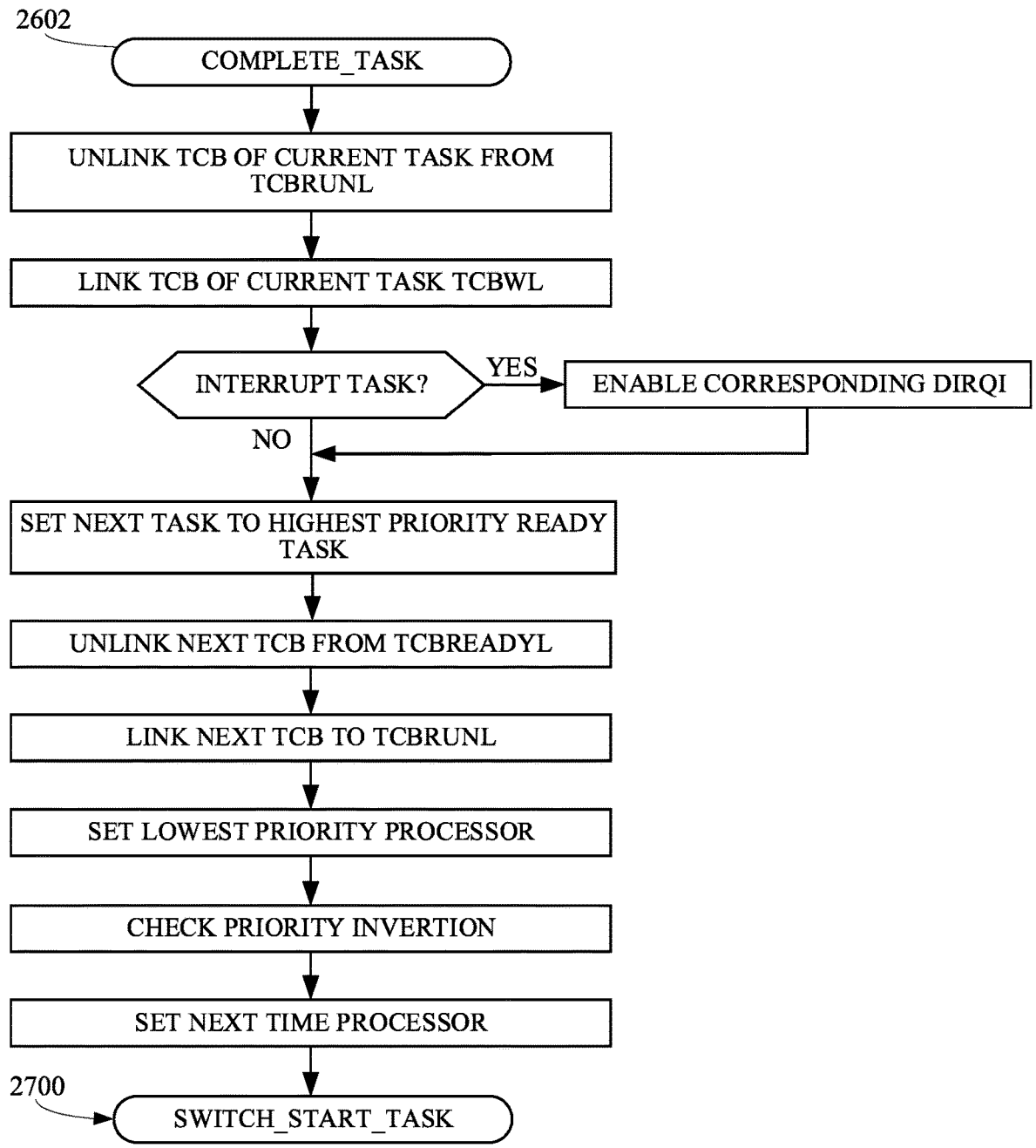
FIG. 33 shows an embodiment of a flow diagram of the complete task routine of the computer program.

FIG. 33 shows an embodiment of the task complete section 2602. The complete task section is executed when a task finishes its execution. Then, the COMPLETE_TASK 3300 entry is configured as the returning point when a task is started and consequently is the return address when the task finishes its execution. The following steps are executed to complete the execution of a task:

the TCB data structure 1201 of the current task is unlinked from the TCBRUNL list 1520.

the TCB data structure 1201 of the task is linked to the TCBWL list 1521.

if task is an Interrupt Task, then the corresponding device interrupt request (DIRQ) of the plurality device interrupt requests (DIRQs) 101-103 is enabled for further requests.

the highest priority task for the current processor of the plurality of processors 110-112 is selected as the next executing task.

the TCB data structure 1201 of the next task is unlinked from the TCBRDYL list 1519.

the TCB data structure 1201 of the next task is linked to the TCBRUNL list 1520 and its state is changed to the running state 1702, the R_LOW_PRI_PRC register 313 of the controller apparatus 100 is set with the processor of the plurality of processors 110-112 that is executing the lowest priority task.

the priority inversion is checked in order to verify that there is no task in the ready state 1701 with higher priority than any task in the running state 1702 for the TCBRUNL list 1520 of the next task. If there is a task in the ready state 1701 with a higher priority than a task that is being executed for a processor of the plurality of processors 110-112 in the TCBRUNL list 1520, then the processor interrupt request (PIRQ) of the plurality of processor interrupt requests (PIRQs) 107-109 in the controller apparatus 100 is triggered.

the R_NXT_TM_EVN_PRC register 312 in the controller apparatus 100 is set with the processor of the plurality of processors 110-112 that is executing the task that produces the next time event (0 if no task is executing the next time event).

the SWITCH_START_TASK 2700 entry point in the task switch section 2604 (FIG. 26) is called to produce context switching of a suspended task.

Main System Calls

Different system calls may be defined to manage the data structures (FIG. 12) of the computer program. Some of these system calls may be considered main system calls. The following describes an embodiment of some of them.

Task-Related System Calls

TASK_Create

The TASK_Create system call creates a new task. The created task may be either a User Task or an Interrupt Task. Several parameter's embodiments may be associated with the system call according to the temporal and functional features of the task created. A set of embodiments of parameters may include:

| Parameter | Description |
| --- | --- |
| Task_Type | User or Interrupt Type code |
| Ready_Priority | Priority of the task when it is in the ready state 1701 |
| Running_Priority | Priority of the task when it is in the running state 1702 |
| Period | Period of the task for a periodic released task |
| Deadline | Deadline of the task for real-time tasks |
| Start_Time | Time when the first release of the task should occur. |
| Stack_Bottom | Memory address of the bottom of the task stack 1601 |

These and other parameters may be required for the action that must be performed when a task is created. The TASK_Create function returns a pointer to the TCB data structure 1201 associated with the task for further references to the created task. The following are the main steps performed when a task is created:

task TCB data structure 1201 initialization: the fields of the task TCB data structure 1201 are configured accordingly when the task is created.

task stack 1601 initialization: a task stack 1601 should be associated with the created task. The task stack 1601 may be created before calling the TASK_Create system call (and, consequently, the information should be transferred through parameters) or it can be created internally in the TASK_Create system call. In both alternatives, the task stack 1601 should be initialized with the starting status of the task.

task timing configuration: the temporal behavior of the task depends on the timing configuration and it should be performed according to the features that the task must implement during runtime. Different embodiments may be included in the computer program to support common types of user tasks with particular timing configurations.

The following describes some embodiments of task types.

Task Type Examples

Different operating systems implement tasks differently. One example is a periodic task that should be executed periodically: the first release time is produced at the task's starting time and then it is released periodically according to its period. Another example is a oneshot task, which is implemented as an infinite loop that may contain a time delay. A oneshot task is released at its starting time and does not require any further release during runtime.

Periodic Task Code Structure

The following is an embodiment of the code structure of a computer program that supports a periodic task:

In the TASK_Create system call:
If the starting time is in the future (gk_now( )<Parameter.Start_Time):
  get a free ECB data structure 1202 from the ECBFL list 1502:
    pecb=gk_ECB_GetFree( ).
  get a free TCB data structure 1201 from the TCBFL list 1517:
    ptcb=gk_TCB_GetFree( )
  link the ECB data structure 1202 to the TCBAEL list 1515 of the TCB:
    gk_TCBAEL_Link(pecb, ptcb).
  link the ECB data structure 1202 with ECBType field 2001 equal to PERIODIC to the ECBTL list 1503 with ECB Value field 2002 equal to the starting time:
    pecb→ECBType=PERIODIC
    ptcb→TCBPeriod=Parameter.Period
    pecb→ECBValue=Parameter.Period
    gk_ECBTL_Link(pecb, ptcb).
  link the task TCB data structure 1201 to the TCBWL list 1521:
    gk_TCBWL_Link(ptcb).
  return the pointer to the TCB data structure 1201 (ptcb).
otherwise (gk_now( )≥Parameter.Start_Time):
  get a free ECB data structure 1202 from the ECBFL list 1502:
    pecb=gk_ECB_GetFree( ).
  get a free TCB data structure 1201 from the TCBFL list 1517:
    ptcb=gk_TCB_GetFree( ).
  link the ECB data structure 1202 to the TCBAEL list 1515 of the TCB data structure 1201:
    gk_TCBAEL_Link(pecb, ptcb).
  link the ECB data structure 1202 with type field equal to PERIODIC to the ECBTL list 1503 with occurrence time equal to the current time (now) plus the period of the task:
    pecb→ECBType=PERIODIC
    ptcb→TCBPeriod=Parameter.Period
    pecb→ECBValue=gk_now( )+Parameter.Period
    gk_ECBTL_Link (pecb, ptcb).
  link the task TCB data structure 1201 to the TCBRDYL list 1519:
    void gk_TCBRDYL_Link(GS_TCB*ptcb).
  return a pointer to the TCB data structure 1201 (ptcb).
In the TIME_EVENT routine, when the ECBType field 2001 of the current ECB data structure 1202 (pecb) is equal to PERIODIC:
  unlink the ECB data structure 1202 from the ECBTL list 1503:
    gk_ECBTL_Unlink(pecb).
  link the ECB data structure 1202 to the ECBTL list 1503 with occurrence time equal to the occurrence time plus the period of the task:
    ptcb=pecb→ECB_AssocTCB
    pecb→ECBValue=pecb→ECB Value+ptcb→TCBPeriod
    gk_ECBTL_Link (pecb, ptcb).
  unlink the TCB data structure 1201 of the associated task from the TCBWL list 1521 or the TCBRUNL list 1520:
    gk_TCB_Unlink(ptcb).
  initialize the task stack 1601 with the initial task state and the TCB_StackPointer field 1908.
  link the TCB data structure 1201 to the TCBRDYL list 1519:
    gk_TCBRDYL_Link(ptcb).

Different procedures may be implemented for aborting or skipping a task when that task has not completed before the next release event 1704 of the task.

Oneshot Task Code Structure

The following is an embodiment of the code structure to support a oneshot task:
  In the TASK_Create system call code:
    get a free ECB data structure 1202 from the ECBFL list 1502:
      pecb=gk_ECB_GetFree( ).
    get a free TCB data structure 1201 from the TCBFL list 1517:
      ptcb=gk_TCB_GetFree( ).
    link the ECB data structure 1202 to the TCBAEL list 1515 of the TCB:
      gk_TCBAEL_Link(pecb, ptcb).
    link the ECB data structure 1202 with ECBType field 2001 equal to ONESHOT to the ECBTL list 1503 with ECB Value field 2002 equal to the starting time:
      pecb→ECBType=ONESHOT
      ptcb→TCBPeriod=Parameter.Period
      pecb→ECBValue=Parameter.Period
      gk_ECBTL_Link (pecb, ptcb).
    link the task TCB data structure 1201 to the TCBWL list 1521:
      gk_TCBWL_Link(ptcb).
    return the pointer to the TCB data structure 1201 (ptcb).
  In the TIME_EVENT routine, when ECBType field 2001 is equal to ONESHOT:
    unlink the ECB data structure 1202 from the ECBTL list 1503:
      gk_ECBTL_Unlink(pecb).
    link the ECB data structure 1202 to the ECBFL list 1502:
      gk_ECBFL_Link(pecb).
    unlink the TCB data structure 1201 of the associated task from the TCBWL list 1521:
      gk_TCB_Unlink(ptcb).
    initialize the task stack 1601 with the initial task state and the TCB_StackPointer field 1908:
    link the TCB data structure 1201 to the TCBRDYL list 1519:
      gk_TCBRDYL_Link(ptcb).

TASK_Kill

The TASK_Kill system call destroys a task and returns its data structures to the corresponding free list. The system call should be called with the pointer to the TCB data structure 1201 (ptcb) of the task as the parameter.

The following is an embodiment of the code structure to support the TASK_Kill system call:
  unlink the task TCB data structure 1201:
    gk_TCB_Unlink(ptcb).
  link the task TCB data structure 1201 to the TCBWL list 1521:
    gk_TCBWL_Link(ptcb).
  deallocate task stack 1601.

TASK_Sleep

The TASK_Sleep system call suspends the execution of the current executing task for a certain interval. The state of the task changes from the running state 1702 to the waiting state 1700. A time event is configured to return the task to the ready state 1701 after the time interval elapses.

Several parameter embodiments may be associated with the system call. A set of parameters may include:

| Parameter | Description |
| --- | --- |
| ptcb | Pointer to the TCB data structure 1201 |
| Sleep_Time | Sleeping interval time |

The following describes an embodiment of the TASK_Sleep system call code structure:
In the TASK_Sleep system call code:
  get a free ECB data structure 1202 from the ECBFL list 1502:
    pecb=gk_ECB_GetFree( ).
  link the ECB data structure 1202 associated with the task TCB data structure 1201, with ECBType field 2001 equal to TASK_SLEEP, to the ECBTL list 1503 with ECBValue field 2002 equal to current time (now) plus the time interval:
    pecb→ECBType=TASK_SLEEP
    pecb→ECBValue=gk_now( )+Parameter. Sleep_Time
    gk_ECBTL_Link (pecb, ptcb).
  unlink the task TCB data structure 1201 from the TCBRUNL list 1520:
    gk_TCB_Unlink(ptcb).
  link the task TCB data structure 1201 to the TCBWL list 1521:
    gk_TCBWL_Link(ptcb).
In the TIME_EVENT routine, when ECBType field 2001 is equal to TASK_SLEEP:
  unlink the ECB data structure 1202 from the ECBTL list 1503:
    gk_ECBTL_Unlink(pecb).
  unlink the TCB data structure 1201 of the associated task from TCBWL list 1521:
    pctb=pecb→ECB_AssocTCB
    gk_TCBWL_Unlink(ptcb).
  link the ECB data structure 1202 to the ECBFL list 1502:
    gk_ECBFL_Link (pecb).
  link the TCB data structure 1201 to the TCBRDYL list 1519:
    gk_TCBRDYL_Link(ptcb).

TASK_Suspend

The TASK_Suspend system call suspends the execution of a specified task. The state of the task is changed from the running state 1702 or the ready state 1701 to the waiting state 1700. The system call should be called with the pointer to the TCB data structure 1201 as the parameter (ptcb).

The following describes an embodiment of the TASK_Suspend system call code structure:
In the TASK_Suspend system call code:
  unlink the task TCB data structure 1201 from the TCBRUNL list 1520 or TCBRDYL list 1519:
    gk_TCB_Unlink(ptcb).
  link the task TCB data structure 1201 to the TCBWL list 1521:
    gk_TCBWL_Lnk(ptcb).

TASK_Resume

The TASK_Resume system call resumes the execution of a specified task. The state of the task is changed from the waiting state 1700 to the ready state 1701. The system call should be called with the pointer to the TCB data structure 1201 as the parameter (ptcb).

The following describes an embodiment of the TASK_Resume system call code structure:
In the TASK_Resume system call code:
  unlink the task TCB data structure 1201 from the TCBWL list 1521:
    gk_TCBWL_Unlink(ptcb).
  link the task TCB data structure 1201 to the TCBRDYL list 1519:
    gk_TCBRDYL_Link(ptcb).

Resource-Related System Calls

Operating systems offer different kinds of resources for synchronization and task communication. Several types of resources may be defined according to the features wanted to be implemented for synchronization and task communication. The following describes two embodiments of resources:

Semaphore: used for task synchronization. A semaphore may be configured as a binary (mutual exclusion) or a counting semaphore.

Message Queue: used for Inter Task Communication (ITC). It is a flexible mechanism for communicating information among tasks.

Different operating system resources can be implemented based on the Resource Control Block (RCB data structure 1203) with the addition of data structures to support the specific information of the implemented resources.

The following describes some embodiments of basic resource system calls.

Semaphore System Calls

SEM_Create

The SEM_Create system call creates a new semaphore resource. An embodiment of parameters may include:

| Parameter | Description |
| --- | --- |
| Priority | Priority inherited by granted tasks. |
| Initial_Count | Initial count of the semaphore (defines the number of simultaneous grants). |
| Waiting_Timeout | Default timeout for a waiting ECB data structure 1202. |
| Granted_Timeout | Default timeout of a granted ECB data structure 1202. |

These and more parameters may be required for the operation that has to be performed when a semaphore is created.

The following is an embodiment of the steps performed when a semaphore is created:
  get a free RCB data structure 1203 from the RCBFL list 1509:
    prcb=gk_RCB_GetFree( ).
  configure the RCB data structure 1203 fields according to the system call parameters:
    return a pointer to the RCB data structure 1203 (ptcb).

Further references to the semaphore resource may be performed using the pointer returned by the SEM_Create system call.

SEM_Destroy

The SEM_Destroy system call destroys a semaphore resource. The destruction of a resource should be performed while considering the events associated with it. Some operating systems allow destroying only semaphores when no tasks are waiting for or granting them. This system call should be called with the pointer to the RCB data structure 1203 as the parameter (prcb).

The following describes an embodiment of the step performed when a semaphore is destroyed:

link the RCB data structure 1203 to the RCBFL list
1509: this function unlinks all the data structures
linked to the RCB data structure 1203 prior to link
the RCB data structure 1203 to the RCBFL list 1509:
gk_RCBFL_Link(prcb).

SEM_Wait

The SEM_Wait system call tries to grant a semaphore for the caller task. If the semaphore is unlocked, then it is granted to the caller task, otherwise, the task waits for the resource. The system call should be called with the pointer to the RCB data structure 1203 as the parameter (prcb).

An embodiment of parameters for the SEM_Wait system call may include:

| Parameter | Description |
| --- | --- |
| Waiting_Priority | Priority of the request for waiting |
| Granted_Priority | Priority of the request when it is granted |
| Waiting_Timeout | Default timeout of waiting ECB data structure 1202. |
| Granted_Timeout | Default timeout of granted ECB data structure 1202. |

The following describes an embodiment of the SEM_Wait system call code structure:
In the SEM_Wait system call:
  get the TCB data structure 1201 calling function
    gk_TCB_GetCurrent( ):
    ptcb=gk_TCB_GetCurrent( ).
  get a free ECB data structure 1202 (pecb1) from the
    ECBFL list 1502:
    pecb1=gk_ECB_GetFree( ).
  get a free RRDS data structure 1210 from the RRDSFL
    list 1513 and configure it with the calling parameters:
    prrds=gk_RRDS_GetFree( ).
  set the ECB_RRDS field 2011 of pecb1 to point the
    RRDS data structure 1210 to the ECB data structure
    1202 pointed to by pecb1:
    pecb1→ECB_RRDS=prrds
    pecb1→ECB_RRDS→RRDSGrantedPriority=
      Parameter.
    Granted_Priority
    pecb1→ECB_RRDS→RRDSWaitingPriority=
      Parameter.
    Waiting_Priority
    pecb1→ECB_RRDS→RRDSWaitingTimeout=
      Parameter.
    Waiting_Timeout
    pecb1→ECB_RRDS→RRDSGrantedTimeout=
      Parameter.
    Granted_Timeout.
  get a free ECB data structure 1202 (pecb2) from the
    ECBFL list 1502:
    pecb2=gk_ECB_GetFree( )
  if the RCB data structure 1203 is unlock (RCBCount
    field 2102 is greater than 0) then: (1) link the pecb1
    to the RCBGEL list 1510, (2) link the pecb2 to the
    ECBTL list 1503 with the Granted_Timeout as
    ECBValue field 2002 and ECBType field 2001 equal
    to GRANTEDTIMEOUT and (3) decrease the RCB-
    Count field 2102 of the RCB data structure 1203,
    else: (1) link the pecb1 to the RCBWEL list 1511, (2)
    link the pecb2 to the ECBTL list 1503 with the
    Waiting_Timeout as ECBValue field 2002 and ECB-
    Type field 2001 equal to WAITINGTIMEOUT, (3)
    associate pecb1 and pecb2, and (4) link the TCB to
    the TCBWL list 1521:
    if (prcb→RCBCount>0) then
      pecb1→ECBValue=pecb1→ECB_RRDS→
        RRDSGrantedPriority
      gk_RCBGEL_Link(prcb, pecb1)
      pecb2→ECBType=GRANTEDTIMEOUT
      pecb2→ECBValue=pecb1→ECB_RRDS→
        RRDSGrantedTimeout
      gk_ECBTL_Link (pecb2, ptcb)
      prcb→RCBCount=prcb→RCBCount−1
    else
      pecb1→ECBValue=pecb1→ECB_RRDS→
        RRDSWaitingPriority
      gk_RCBWEL_Link(prcb, pecb1)
      pecb2→ECBType=WAITINGTIMEOUT
      pecb2→ECBValue=Parameter. Waiting_Timeout
      gk_ECBTL_Link (pecb2, ptcb)
      gk_TCB_Unlink(ptcb)
      gk_TCBWL_Link(ptcb).
  In the TIME_EVENT routine, when ECBType field 2001
    is equal to GRANTEDTIMEOUT (handle as pecb1):
    unlink the ECB data structure 1202 pointed to by pecb1
      from the ECBTL list 1503 and get the associated
      TCB data structure 1201:
      gk_ECBTL_Unlink (pecb1)
    unlink the TCB data structure 1201 of the associated
      task from the TCBRUNL list 1520, the TCBRDYL
      list 1519 or the TCBWL list 1521:
      ptcb=pecb1→ECB_AssocTCB
      gk_TCB_Unlink(ptcb).
    link the ECB data structure 1202 to the ECBFL list
      1502:
      gk_ECBFL_Link (pecb1).
    if the TCBASL list 1516 of TCB has defined a SCB
      data structure 1207 with GRANTEDTIMEOUT
      then: (1) get a free SCB data structure 1207 from the
      SCBFL list 1514, (2) configure the SCB data struc-
      ture 1207 according to the GRANTEDTIMEOUT
      procedure and (3) link the SCB data structure 1207
      to the TCBPSL list 1518:
    link the TCB data structure 1201 to the TCBRDYL list
      1519:
      gk_TCBRDYL_Link(ptcb).
    increase the RCBCount field 2102 of the RCB data
      structure 1203:
      prcb→RCBCount=prcb→RCBCount+1.
    if there is an ECB data structure 1202 waiting for the
      RCB data structure 1203 then: (1) grant the RCB
      data structure 1203 to the waiting ECB data structure
      1202 with highest priority and (2) decrease the count
      field of the RCB data structure 1203:
      pecb2=prcb→RCB_NextRCBWEL
      if (pecb2/=NULL) then
        pecb1=pecb2→ECB_NextECBAEL
        gk_RCBGEL_Link(prcb, pecb1)
        gk_TCBRDYL_Link(ptcb)
        pecb2→ECBType=GRANTEDTIMEOUT
        pecb2→ECBValue=pecb1→ECB_RRDS→
          RRDSGrantedTimeout
        gk_ECBTL_Link (pecb2, ptcb)
        prcb→RCBCount=prcb→RCBCount−1.
  In the TIME_EVENT routine, when ECBType field 2001
    is equal to WAITINGTIMEOUT:
    unlink the ECB data structure 1202 pointed to by pecb1
      from the ECBTL list 1503:
      gk_ECBTL_Unlink (pecb1).
    unlink the associated ECB data structure 1202 (pecb2)
      from the RCBWEL list 1511:

```
pecb2=pevent→ECB_NextECBAEL
gk_RCBWEL_Unlink(pecb2)
gk_ECBAEL_Unlink(pecb1, pecb2).
```
unlink the TCB data structure 1201 of the associated task from TCBRUNL list 1520, TCBRDYL list 1519 or TCBWL list 1521:
```
ptcb=pecb1→ECB_AssocTCB
gk_TCB_Unlink(ptcb).
```
link the ECB data structures 1202 pecb1 and pecb2 to the ECBFL list 1502:
```
gk_ECBFL_Link (pecb1)
gk_ECBFL_Link (pecb2).
```
link the TCB data structure 1201 to the TCBRDYL list 1519:
```
gk_TCB_Unlink(ptcb)
gk_TCBRDYL_Link(ptcb).
```
SEM_Post The SEM_Post system call unlocks the specified semaphore granted to the current task. If another task is waiting for the semaphore, then it is granted to the task associated with the waiting ECB data structure 1202 with the highest priority.

The following describes an embodiment of the SEM_Wait system call code structure:

In the SEM_Post system call:
unlink the ECB data structure 1202 (pecb1) associated with the TCB data structure 1201 of the current executing task from the RCBGEL list 1510:
```
ptcb=gk_TCB_GetCurrent( )
pecb1=gk_TCB_in_RCBGEL    (G_RCB*prcb, GS_TCB*ptcb)
gk_RCBGEL_Unlink(pecb1).
```
unlink the associated ECB data structure 1202 (pecb2) from the ECBAEL list 1500 and from the ECBTL list 1503:
```
pecb2=pecb1→ECB_NextECBAEL
gk_ECBAEL_Unlink(pecb1, pecb2)
gk_ECBTL_Unlink (pecb2).
```
link ECB data structure 1202 pointed to by pecb1 to the ECBFL list 1502:
```
gk_ECBFL_Link (pecb1).
```
link ECB data structure 1202 pointed to by pecb2 to the ECBFL list 1502:
```
gk_ECBFL_Link (pecb2).
```
increase the count field of the RCB data structure 1203:
```
prcb→RCBCount=prcb→RCBCount+1.
```
if there is an ECB data structure 1202 waiting for the RCB then: (1) grant the RCB data structure 1203 to the waiting ECB data structure 1202 with highest priority and (2) decrease the count field of the RCB data structure 1203:
```
pecb1=prcb→RCB_NextRCBWEL
if (pecb1/=NULL) then
   gk_RCBWEL_Unlink(prcb, pecb1)
   pecb1→ECBValue=pecb→ECB_RRDS→
      RRDSGrantedPriority
   gk_RCBGEL_Link(prcb, pecb1)
   pecb2=pecb1→ECB_NextECBAEL
   if (pecb2/=NULL) then
      gk_ECBTL_Unlink (pecb2)
      pecb2→ECBType=GRANTEDTIMEOUT
      pecb2→ECBValue=pecb1→ECB_RRDS→
         RRDSGrantedTimeout
      gk_ECBTL_Link (pecb2, ptcb)
   prcb→RCBCount=prcb→RCBCount-1
   gk_TCBRDYL_Link(ptcb).
```

Message Queues Related System Calls

A Message Queue is a synchronization resource that permits transferring data structures among tasks.

MQ_Create

The MQ_Create system call creates a new message queue resource. A set of embodiments of parameters may include:

| Parameter | Description |
| --- | --- |
| Initial_Count | Initial count send messages (defines the number that must be received prior to deleting the message) |
| Max_Messages | Maximum number of sent messages allowed in the queue |

These and other parameters may be required for an operation that must be performed when a message queue is created.

The following describes an embodiment of the steps performed when a message queue is created:
get a free RCB data structure 1203 from the RCBFL list 1509:
```
prcb=gk_RCB_GetFree( ).
```
configure the RCB data structure 1203 fields according to the system call parameters:
```
prcb→RCBType=MQ
prcb→RCBCount=Paramater.Max_Messages
prcb→MCBCount=Parameter.Initial_Count.
```
return the pointer to the RCB data structure 1203:

Further references to the message queue resource may be performed using the pointer returned by the MQ_Create system call.

MQ_Destroy

The MQ_Destroy system call destroys a message queue resource. The destruction of a resource should be performed while considering the events associated with it. Some operating systems allow destroying only message queues when tasks are neither waiting for nor granting them.

The following describes an embodiment of the step performed when a message queue is destroyed:
link the RCB data structure 1203 to the RCBFL list 1509: this function unlinks all the data structures linked to the RCB prior to link the RCB data structure 1203 to the RCBFL list 1509:
```
gk_RCBFL_Link(prcb).
```
MQ_Send The MQ_Send system call tries to send a message to a message queue resource. If the message queue is full, then the caller task waits for the resource; otherwise, the message is linked to the message queue. An embodiment of a set of parameters for the MQ_Send system call may include:

| Parameter | Description |
| --- | --- |
| pmcb | Pointer to message to be sent. |
| prcb | Pointer to the RCB data structure 1203 of the message queue structure 1205. |
| Msg_length | Length of the message. |
| Receive_count | Number of times to be received before to be deleted from the resource |
| Waiting_Priority | Priority of the request for waiting. |
| Waiting_Timeout | Default timeout of waiting ECB data structures 1202. |

The following describes the embodiment of the MQ_Send system call code structure:

In the MQ_Send system call:
if the RCB data structure 1203 is unlock (RCBCount field 2102 is greater than 0 then: (1) link the MCB data structure 1206 pointed to by pmcb to the message queue structure 1205, (2) decrease the count field and (3) return, else: (1) get two free ECB data structures 1202 (pointed to by pecb 1 and pecb2) and link between them in a ECBAEL list 1500, (2) link the ECB data structures 1202 pointed to by pecb1 to the RCBWEL list 1511 with ECBValue field 2002 equal to Waiting_Priority, (3) link the ECB data structures 1202 pointed to by pecb2 to the ECBTL list 1503 with ECBValue field 2002 equal to Waiting_Timeout and ECBType field 2001 equal to MQSENDTIMEOUT and (4) link the TCB data structure 1201 to the TCBWL list 1521:

```
if (prcb→RCBCount>0) then
   gk_MCBQL_Link(pmcb, prcb)
   prcb→RCBCount=prcb→RCBCount-1
   /* If granted ECB data structure 1202 then link the
      copy the MCB data structure 1206 to the ECB
      data structure 1202 resume associated task*/
else
   pecb1=gk_ECB_GetFree( )
   pecb2=gk_ECB_GetFree( )
   gk_ECBAEL_Link(pecb1, pecb2)
   prrds=gk_RRDS_GetFree( )
   pecb1→ECB_RRDS=prrds
   pecb1→ECB_RRDS→RRDSWaitingPriority=
      Parameter.
   Waiting_Priority
      pecb1→ECB_RRDS→RRDSWaitingTimeout=
         Parameter.
   Waiting_Timeout
      pecb1→ECB
         Value=pecb1→ECB_RRDS→RRDSWaiting
            Priority
      gk_RCBWEL_Link(prcb, pecb1)
      pecb2→ECBType=MQSENDTIMEOUT
      pecb2→ECBValue=pecb1→ECB_RRDS→
         RRDSWaitingTimeout
      ptcb=gk_TCB_GetCurrenn)
      gk_ECBTL_Link (pecb2, ptcb).
```

In the TIME_EVENT routine, when ECBType field 2001 is equal to MQSENDTIMEOUT:
unlink the ECB from the ECBTL list 1503 and get the data structures information:

```
gk_ECBTL_Unlink (pecb1)
pecb2=pecb1→ECB_NextECBAEL
gk_ECBAEL_Unlink(pecb1, pecb2)
ptcb=pecb1→ECB_AssocTCB
prcb=pecb2→ECB_AssocRCB.
``` link the ECB data structures 1202 unlinked from the ECBTL list 1503 to the ECBFL list 1502:
   gk_ECBFL_Link(pecb1).
unlink the TCB data structure 1201 of the associated task from TCBWL list 1521.
   gk_TCB_Unlink(ptcb).
link the TCB data structure 1201 to the TCBRDYL list 1519:
   gk_TCBRDYL_Link(ptcb).

MQ_Receive

The MQ_Receive system call returns the next message available linked to the message queue or waits if there is no message available.

A set of parameters for the MQ_Receive system call may include:

| Parameter | Description |
|---|---|
| Last_Message_Received_ID | MCB_ID field of the last MCB received in order to get a new MCB data structure 1206 sent. |
| Waiting_Priority | Priority of the request for waiting. |
| Waiting_Timeout | Default timeout of waiting ECB data structures 1202. |

The following describes an embodiment of the MQ_Receive system call code structure:

In the MQ_Receive system call:
   if RCB has a message linked (RCBCount field 2102 greater than 0 and MCB_ID field is different from Last_Message_Received parameter) then: (1) decrease MCBCount field of the heading message, (2) if MCBCount field reaches cero then unlink message, link it to MCBFL list 1506 and grant the RCB data structure 1203 the waiting highest priority MCB data structure 1206 and (3) return a pointer to a copy of the MCB data structure 1206, else: (1) get two free ECB data structures 1202 (pointed to by pecb1 and pecb2), (2) link the ECB data structures 1202 pointed to by pecb1 to the RCBGEL list 1510 with ECBValue field 2002 equal to Waiting_Priority, (3) link the ECB data structures 1202 pointed to by pecb2 to the ECBTL list 1503 with ECBValue field 2002 equal to Waiting_Timeout and ECBType field 2001 equal to MQRECEIVETIMEOUT, (4) link the TCB data structure 1201 to the TCBWL list 1521 and (5) return the pointer of the MCB data structure 1206 read:

```
pmcb1=gk_MCBQL_GetNextID      (Last_Message_Received_ID, prcb)
if (pmcb1/=NULL) then
   pmcb2=gk_MCB_GetFree(void)
   gk_MCB_Copy(pmcb2, pmcb1)
   pmcb1→MCBCount=pmcb1→MCBCount-1
   if (pmcb1→MCBCount=0) then
      gk_MCBQL_Unlink(pmcb1, prcb)
      gk_MCBFL_Link(pmcb)
      /* If waiting ECB data structure 1202 then link
         the associated
         MCB data structure 1206 to the MCBQL list
         1507 of the
         RCB data structure 1203 unlinking the associ-
         ated
         ECB data structure 1202 from the ECBTL list
         1503*/
else
   pecb1=gk_ECB_GetFree( )
   pecb2=gk_ECB_GetFree( )
   gk_ECBAEL_Link(pecb1, pecb2)
   prrds=gk_RRDS_GetFree( )
   pecb1→ECB_RRDS=prrds
   pecb1→ECB_RRDS→RRDSWaitingPriority=
      Parameter.
   Waiting_Priority
      pecb1→ECB_RRDS→RRDSWaitingTimeout=
         Parameter.
   Waiting_Timeout
      pecb1→ECB
         Value=pecb1→ECB_RRDS→RRDSWaiting
            Priority
      gk_RCBGEL_Link(prcb, pecb1)
      pecb2→ECBType=MQRECEIVETIMEOUT
      pecb2→ECBValue=pecb
         1→ECB_RRDS→RRDSWaitingTimeout
``` ptcb=gk_TCB_GetCurrenn)
gk_ECBTL_Link (pecb2, ptcb).

In the TIME_EVENT routine, when ECBType field 2001 is equal to MQRECEIVETIMEOUT:
   unlink the ECB from the ECBTL list 1503 and get the data structures information.
   link the ECB to the ECBFL list 1502.
   unlink the TCB data structure 1201 of the associated task from the TCBRUNL list 1520, the TCBRDYL list 1519 or the TCBWL list 1521,
   if the TCBASL list 1516 of TCB data structure 1201 has defined a SCB data structure 1207 with MQRECEIVETIMEOUT then: (1) get a free SCB data structure 1207 from the SCBFL list 1514, (2) configure the SCB data structure 1207 according to the MQRECEIVETIMEOUT procedure and (3) link the SCB data structure 1207 to the TCBPSL list 1518,
   link the TCB data structure 1201 to the TCBRDYL list 1519.

MQ_Release

The MQ_Release system call releases the message received. When the receiving system calls release the message, the message is unlinked from the MCBQL list 1507 and linked to the MCBFL list 1506.

MQ_Check

The MQ_Check system call returns the next message available linked to the message. The system call does not wait for a new message when the queue is not available.

The following describes an embodiment of the MQ_Receive system call code structure:
   In the MQ_Check system call:
      if RCB has message linked (linked message queue is not empty) then: (1) decrease the reading count of the heading message, (2) if reading count reaches 0, then unlink message and link it to the MCBFL list 1506 and (3) return pointer to message, else: (1) return an NULL pointer.

Signal-Related System Calls

Signal routines are executed at the task level, just like the task code 1600 itself. When a context switch occurs, all the signal routines are executed prior to executing the task code 1600. The signal routines are executed according to the SCBPriority field 2202 of the SCB data structure 1207: higher priorities (lower indexes) first.

SIGNAL_Create

The SIGNAL_Create system call creates and associates a signal with a data structure. A set of SIGNAL_Create system call parameters may include:

| Parameter | Description |
| --- | --- |
| Signal_Type | Type of the signal to be created |
| Data_Structure_Handler | Pointer to the Control Block to associate the signal |
| Signal_Code | Start address of the program code to be executed when the signal occurs |

These and more parameters may be required for the operation that has to be performed when a signal is created.
The following describes an embodiment of the steps performed when a signal is created:
   get a free SCB data structure 1207 from the SCBFL list 1514.
   link the SCB data structure 1207 to the associated list of the control block data structure selected (the KCBASL list 1522, TCBASL list 1516, the ECBASL list 1501, the RCBASL list 1508, the RRDSASL list 1512 or the SCBAPSL list 1523).
   return a pointer to the SCB data structure 1207.

Further references to the SCB data structure 1207 may be performed using the pointer returned by the SIGNAL_Create system call.

SIGNAL_Destroy

The SIGNAL_Destroy system call destroys a signal associated with a data structure. A set of SIGNAL_Destroy system call parameters may include:

| Parameter | Description |
| --- | --- |
| Signal | Pointer to the signal to be destroyed |

These and others parameters may be required for the operation that has to be performed when a signal is destroyed.

The following is an embodiment of the steps performed when a signal is destroyed:
   unlink the SCB data structure 1207 from the associated list of the control block data structure it is associated (the KCBASL list 1522, the TCBASL list 1516, the ECBASL list 1501, the RCBASL list 1508, the RRDSASL list 1512 or the SCBAPSL list 1523).
   link the SCB data structure 1207 to the SCBFL list 1514, Data Structures Linked Lists and Runtime Consistency The controller apparatus 100 and the computer program should maintain data consistency to ensure correct behavior. Runtime consistency is preserved by verifying some conditions when specific events happen. In contrast to most operating systems that require a periodic update of system status, the computer program, and the controller apparatus 100 maintain data consistency by performing specific actions when events occur. The following are embodiments of some conditions that must be met during runtime:

Task in Running State 1702 with Lower Priority than the Highest Priority Task in Ready State 1701

Description: The plurality of system processors 110-112 should execute the highest priority tasks to guarantee that priority disciplines are met. LCB data structure 1208 holds the information about tasks in the ready state 1701 and running state 1702 assigned to that LCB data structure 1208.

Condition to Meet:

For each LCB data structure 1208,

The LCBRunPriority field 2302 contains a higher priority value than the TCBCurrentPriority field 1905 of the TCB data structure 1201 pointed to by the *LCB_NextTCBRDYL field 2304 when the *LCB_NextTCBRDYL field 2304 is not NULL.

Condition Check-Points:

This condition should be checked when:
   the *LCB_NextTCBRDYL field 2304 is modified: the *LCB_NextTCBRDYL field 2304 is modified when a task is linked to the TCBRDYL list 1519 with the lowest priority. Consequently, the condition should be checked when the following functions are executed:
   void gk_TCBRDYL_Link(GS_TCB*ptcb)
      before releasing the critical section: before leaving the critical section, the processor of the plurality of processors 110-112 should check if this condition is met for the LCB data structure 1208 defined in the first element in the PCB_RDY_LCBL[ . . . ] field 2404 array of its PCB data structure 1209. This check must be performed considering that a processor of the plurality of processors 110-112 may release more than one task during the interval that it is granting the critical section; consequently, this condition may require interrupting several processors of the plurality of processors 110-112 to produce adequate context switching.

Action to Perform when Condition is not Met:
The processor of the plurality of processors 110-112 executing the task associated with the TCB data structure 1201 pointed to by the *LCB_NextTCBRUNL field 2303 should be interrupted by executing:
  data=the TCB_AssocPCB field 1918 of the TCB data structure 1201 pointed to by the *LCB_NextTCBRUNL field 2303.
  address=address of the R_TRG_PRC_INT register 314 of the controller apparatus 100.
  mem_write(ADDRESS, WRITE_DATA).

Free Processor 110-112 when the TCBRDYL List 1519 is not Empty
Description: a PCB data structure 1209 is linked to the LCBFPL list 1504 when the processor of the plurality of processors 110-112 associated with it executes either its Idle Task or a task assigned to an LCB data structure 1208 that is not in the first element in the PCB_RDY_LCBL[ . . . ] field 2404 array of the PCB data structure 1209. Consequently, if there exists a ready task linked to the LCBFPL list 1504, then the processor of the plurality of processors 110-112 should be interrupted to switch to the ready task.

Condition to Meet:
For each LCB data structure 1208,
  the *LCB_NextLCBFPL field 2307 is NULL when the *LCB_NextTCBRDYL field 2304 is not NULL Condition Check-Points:
This condition should be checked when:
  the *LCB_NextTCBRDYL field 2304 is NULL and a ready task is linked to the TCBRDYL list 1519. Consequently, the condition should be checked when the following functions are executed:
    void gk_TCBRDYL_Link(GS_TCB*ptcb)
    before releasing the critical section: before leaving the critical section, the processor of the plurality of processors 110-112 should check if this condition is met for the LCB data structure 1208 defined in the first element in the PCB_RDY_LCBL[ . . . ] field 2404 array of its PCB data structure 1209. This check must be performed considering that a processor of the plurality of processors 110-112 may release more than one task during the interval that it is granting the critical section; consequently, this condition may require interrupting several processors of the plurality of processors 110-112 to produce adequate context switching.

Action to Performed when Condition is not Met:
The processor of the plurality of processors 110-112 executing the task associated with the TCB data structure 1201 pointed to by the *LCB_NextTCBRUNL field 2303 should be interrupted by executing:
  data=TCB_AssocPCB field 1918 of TCB data structure 1201 pointed to by the *LCB_NextTCBRUNL field 2303.
  address=address of the R_TRG_PRC_INT register 314 of the controller apparatus 100.
  mem_write(ADDRESS, WRITE_DATA)

Processor Executes its Idle Task with Task in Ready State 1701
Description: a processor of the plurality of processors 110-112 executes its idle task when an LCB data structure 1208, included in the PCB_RDY_LCBL[ . . . ] field 2404 array of its PCB data structure 1209, does not have a NULL value in the *LCB_NextTCBRDYL field 2304.

Condition to Meet:
For each PCB data structure 1209,
  if the *PCB_EXECTCB field 2406 is equal to the *PCB_IDLETCB field 2405, then there is no LCB data structure 1208 such that *LCB_NextTCBRDYL field 2304 is not NULL.

Condition Check-Points:
This condition should be checked when:
  the *LCB_NextTCBRDYL field 2304 is NULL and a ready task is linked to the TCBRDYL list 1519. Consequently, the condition should be checked when the following functions are executed:
    void gk_TCBRDYL_Link(GS_TCB*ptcb)
    before releasing the critical section: before leaving the critical section, the processor of the plurality of processors 110-112 should check if this condition is met for the LCBFPL list 1504 included in the PCB_RDY_LCBL[ . . . ] field 2404 array of its PCB data structure 1209. This check has to be performed considering that a processor of the plurality of processors 110-112 may release more than one task during the interval that it is granting the critical section; consequently, this condition may require interrupting several processors of the plurality of processors 110-112 to produce adequate context switching.

Action to Performed when Condition is not Met:
The processor of the plurality of processors 110-112 executing the idle task should be interrupted by executing:
  data=the PCBID field 2400 of PCB data structure 1209 that executes the idle task,
  address=address of the R_TRG_PRC_INT register 314 of controller apparatus 100,
  mem_write(ADDRESS, WRITE_DATA)

Task in the Running State 1702 with Pending Signals
Description: a processor of the plurality of processors 110-112 executes a task when the *TCB_NextTCBPSL field 1917 is not NULL Condition to Meet:
For each PCB data structure 1209,
  if the *PCB_EXECTCB field 2406 is equal to the *PCB_IDLETCB field 2405, then there is no LCB data structure 1208 such that *LCB_NextTCBRDYL field 2304 is not NULL.

Condition Check-Points:
This condition should be checked when:
  the *LCB_NextTCBRDYL field 2304 is NULL and a ready task is linked to the TCBRDYL list 1519. Consequently, the condition should be checked when the following functions are executed:
    void gk_TCBRDYL_Link(GS_TCB*ptcb)
    before releasing the critical section: before leaving the critical section, the processor of the plurality of processors 110-112 should check if this condition holds for the processors of the plurality of processors 110-112 that execute its idle task. This check has to be performed considering that a processor of the plurality of processors 110-112 may release more than one task during the interval that it is granting the critical section; consequently, this condition may require interrupting several processors of the plurality of processors 110-112 to produce adequate context switching.

Action to Performed when Condition is not Met:
The processor of the plurality of processors 110-112 executing the idle task should be interrupted by executing:
data=PCBID field 2400 of PCB data structure 1209 that executes the idle task,
address=address of the R_TRG_PRC_INT register 314 of controller apparatus 100,
mem_write(ADDRESS, WRITE_DATA)

Resource Available with a Resource Request Waiting
Description: an RCB data structure 1203 is available when the *RCB_NextRCBWEL field 2107 is not NULL.
Condition to Meet:
For each RCB data structure 1203,
If RCB data structure 1203 is available, then the *RCB_NextRCBWEL field 2107 is NULL.
Condition Check-Points:
This condition should be checked when:
the *RCB_NextRCBWEL field 2107 is not NULL and the RCB data structure 1203 becomes available or a request is produced and the RCB data structure 1203 is available. Consequently, the condition should be checked when the following function is executed:
void gk_RCBGEL_Unlink(GS_ECB*pevent).
GS_ECB*gk_RCBWEL_Link(G_RCB*presource, GS_ECB*pevent).
Action to Performed when Condition is not Met:
The RCB data structure 1203 is granted to the highest priority waiting request available.

Priority Management
Priority discipline determines the sequence in which tasks are executed. A priority discipline defines a total order among tasks in the ready state 1701. The TCBRDYL lists 1519 sort the TCB data structures 1201 of the tasks according to the TCBReadyPriority field 1902. By previously setting the TCBReadyPriority field 1902 to link the TCB data structure 1201 to the TCBRDYL lists 1519 (by executing the gk_TCBRDYL_Link(GS_TCB*ptcb) function), different priority disciplines may be implemented. The gk_TCBRDYL_Link(GS_TCB*ptcb) function calls back the gk_TCB_SetPriority in order to let the designer implement the priority discipline for the TCBRDYL lists 1519. For instance, leaving a constant value in the TCBReadyPriority field 1902 implements a Fixed Priority discipline, while assigning TCBReadyPriority field 1902=gk_now+ TCBDeadline field 1907 implements an Earliest Deadline First priority discipline.

Figure 34:
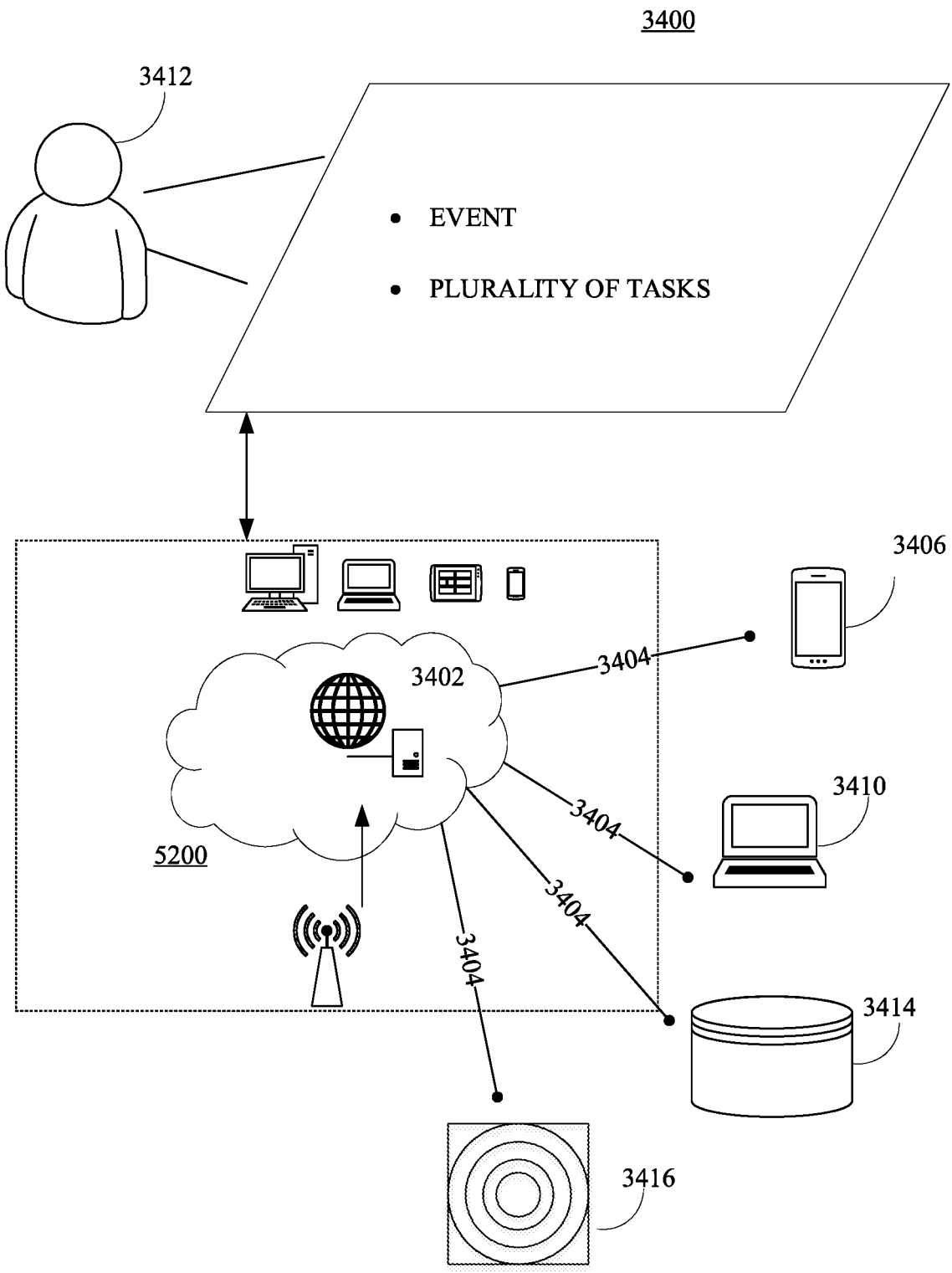
FIG. 34 is an illustration of an online platform consistent with various embodiments of the present disclosure.

FIG. 34 is an illustration of an online platform 3400 consistent with various embodiments of the present disclosure. By way of non-limiting example, the online platform 3400 to facilitate real-time multitasking processing may be hosted on a centralized server 3402, such as, for example, a cloud computing service. The centralized server 3402 may communicate with other network entities, such as, for example, a mobile device 3406 (such as a smartphone, a laptop, a tablet computer etc.), other electronic devices 3410 (such as desktop computers, server computers etc.), databases 3414, and sensors 3416 over a communication network 3404, such as, but not limited to, the Internet. Further, users of the online platform 3400 may include relevant parties such as, but not limited to, end-users, administrators, service providers, service consumers and so on. Accordingly, in some instances, electronic devices operated by the one or more relevant parties may be in communication with the platform.

A user 3412, such as the one or more relevant parties, may access online platform 3400 through a web based software application or browser. The web based software application may be embodied as, for example, but not be limited to, a website, a web application, a desktop application, and a mobile application compatible with a computing device 5200.

Figure 35:
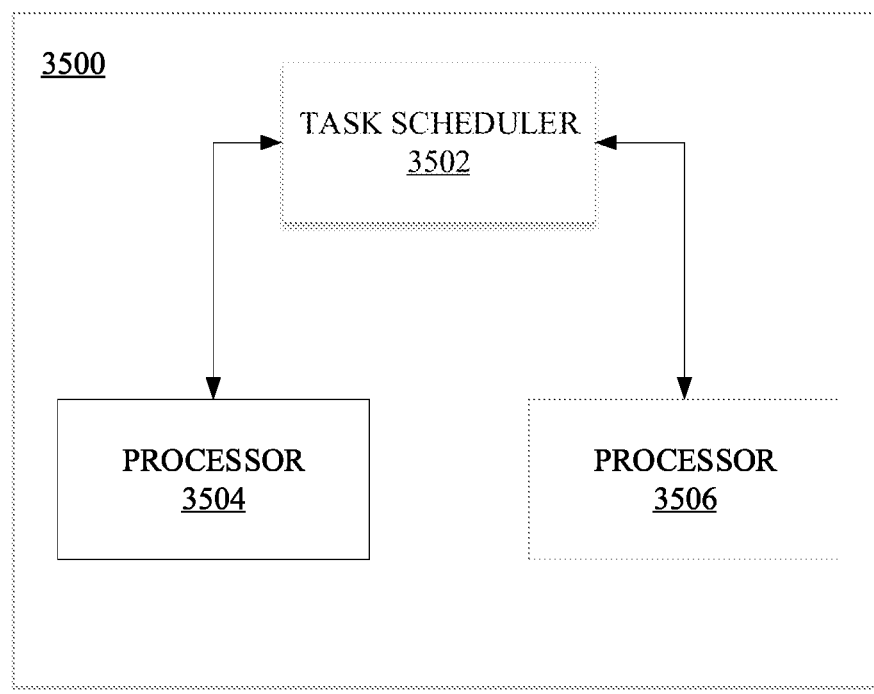
FIG. 35 is a multiprocessor system for facilitating real-time multitasking processing, in accordance with some embodiments.

FIG. 35 is a multiprocessor system 3500 for facilitating real-time multitasking processing, in accordance with some embodiments. Further, the multiprocessor system 3500 may include a task scheduler 3502 and a plurality of processors 3504-3506.

Further, the task scheduler 3502 may be configured for receiving an event associated with the multiprocessor system 3500. Further, the task scheduler 3502 may be configured for evaluating a plurality of task priorities associated with a plurality of tasks based on the event. Further, the task scheduler 3502 may be configured for determining a plurality of new task priorities for the plurality of tasks. Further, the task scheduler 3502 may be configured for assigning the plurality of tasks to a plurality of lists based on the determining.

Further, the task scheduler 3502 may include a dedicated processor for scheduling tasks for the plurality of processors.

Further, in some embodiments, the event may include a plurality of events. Further, each event of the plurality of events may be characterized by a plurality of event characteristics. Further, the task scheduler 3502 may be configured for analyzing the plurality of events. Further, the task scheduler 3502 may be configured for determining an event of the plurality of events based on the analyzing. Further, the evaluating of the plurality of task priorities associated with the plurality of tasks may be based on the event.

Further, the plurality of processors 3504-3506 may be communicatively coupled with the task scheduler 3502. Further, the plurality of processors 3504-3506 serves the plurality of lists. Further, a processor of the plurality of processors 3504-3506 may be configured for processing the plurality of tasks assigned to a list of the plurality of lists based on the plurality of new task priorities.

Further, in some embodiments, a task of the plurality of tasks may be associated with a task state of a plurality of task states. Further, the processor may be configured for updating the task state of the task based on the processing. Further, the processor may be configured for generating the event based on the updating.

Figure 36:
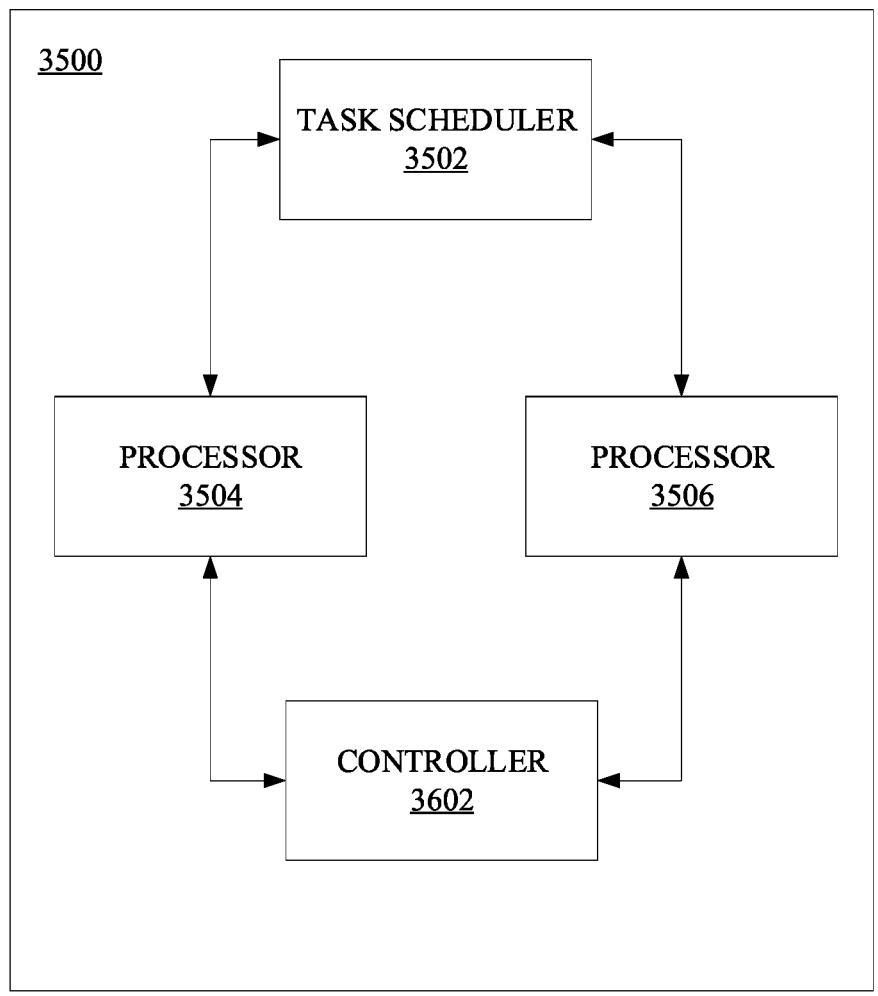
FIG. 36 is the multiprocessor system for facilitating real-time multitasking processing, in accordance with some embodiments.

In further embodiments, the multiprocessor system 3500 may include a controller 3602 (as shown in FIG. 36) communicatively coupled with the plurality of processors 3504-3506 and the task scheduler 3502. Further, the controller 3602 may be configured for managing the event.

Figure 37:
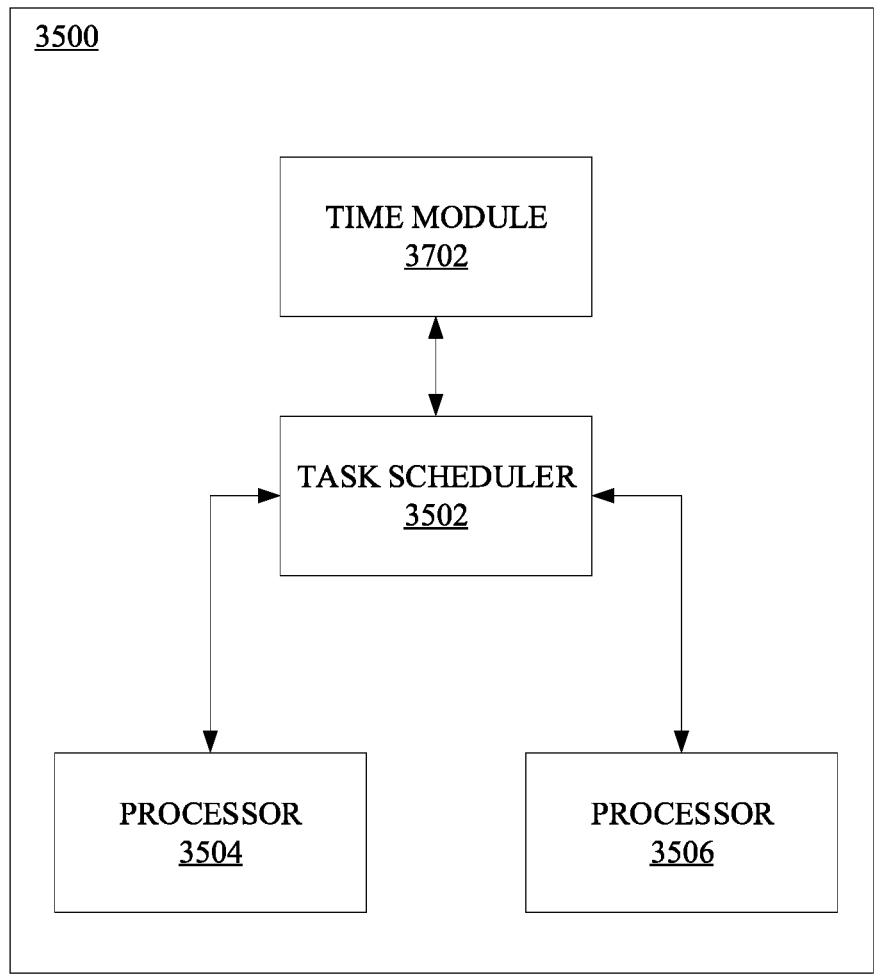
FIG. 37 is the multiprocessor system for facilitating real-time multitasking processing, in accordance with some embodiments.

In further embodiments, the multiprocessor system 3500 may include a time module 3702 (as shown in FIG. 37) communicatively coupled with the task scheduler 3502. Further, the time module 3702 may be configured for generating a time event. Further, the event may include the time event.

Figure 38:
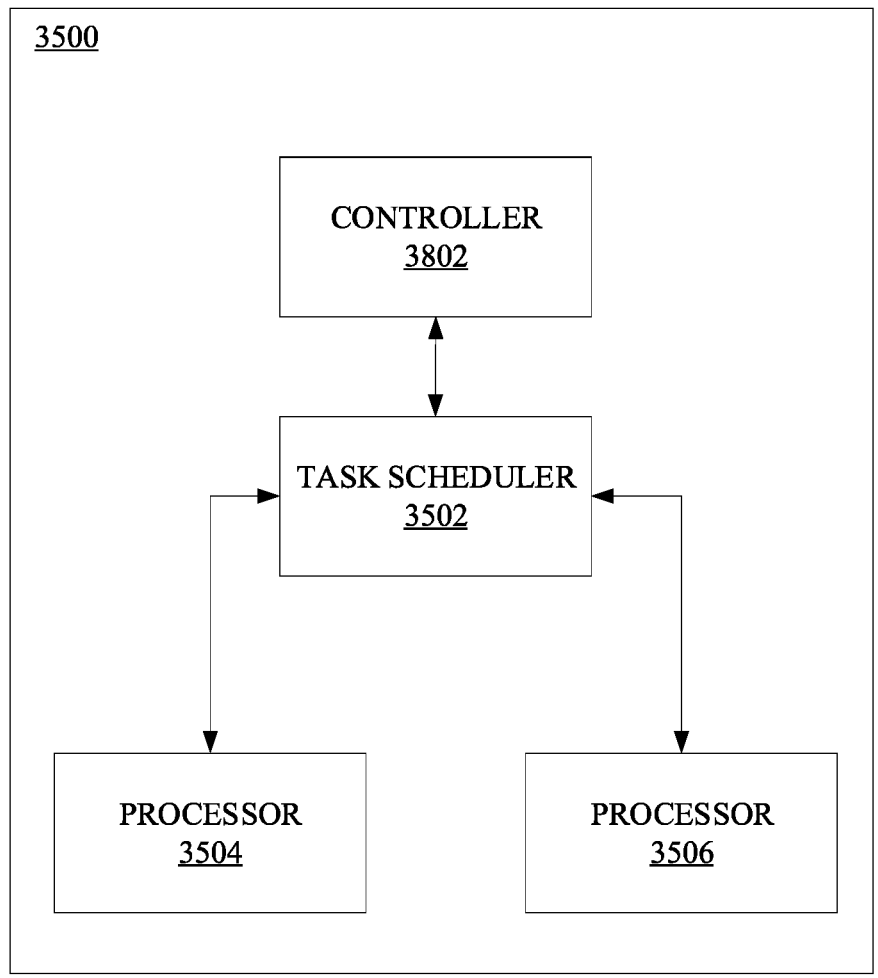
FIG. 38 is the multiprocessor system for facilitating real-time multitasking processing, in accordance with some embodiments.

In further embodiments, the multiprocessor system 3500 may include a controller 3802 (as shown in FIG. 38) communicatively coupled with the task scheduler 3502. Further, the controller 3802 may be associated with a mode. Further, the mode may include a frozen mode and an unfrozen mode. Further, the task scheduler 3502 may be configured for receiving the event based on the mode. Further, the frozen mode inhibits the receiving of the event and the unfrozen mode allows the receiving of the event.

In further embodiments, the multiprocessor system 3500 may include an interface element 3902 (as shown in FIG.

Figure 40:
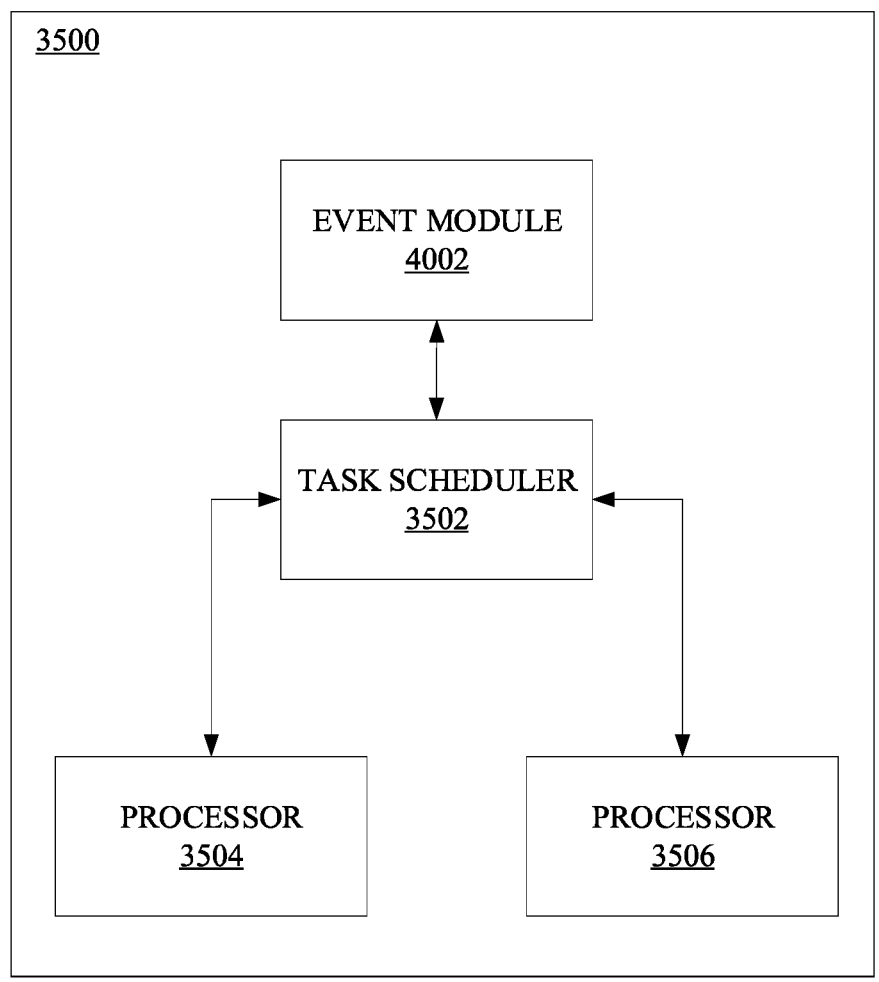
FIG. 40 is the multiprocessor system for facilitating real-time multitasking processing, in accordance with some embodiments.

39) communicatively coupled with the controller 3802. Further, the interface element 3902 may be configured for receiving an interface command. Further, the controller 3802 may be configured for transitioning between the frozen mode and the unfrozen mode based on the interface command In further embodiments, the multiprocessor system 3500 may include an event module 4002 (as shown in FIG. 40) communicatively coupled with the task scheduler 3502. Further, the event module 4002 may be configured for sorting at least two events associated with the multiprocessor system 3500 in at least one order. Further, the task scheduler 3502 may be configured for receiving an event of the at least two events based on the at least one order.

Figure 41:
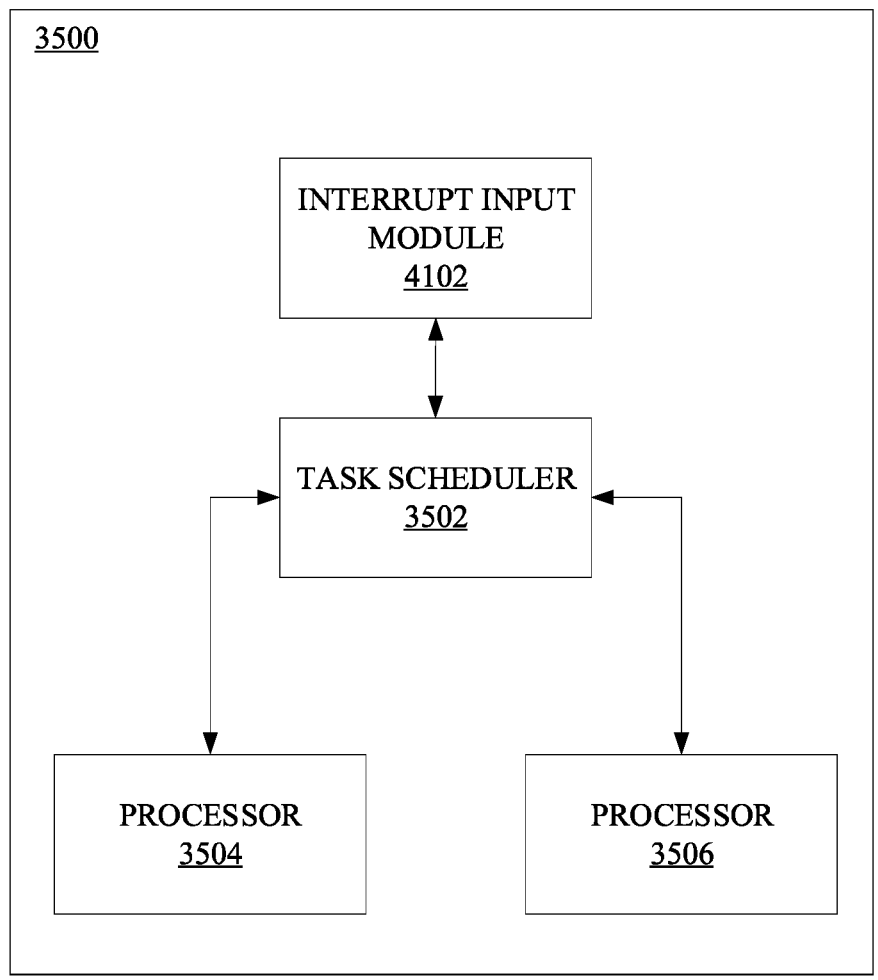
FIG. 41 is the multiprocessor system for facilitating real-time multitasking processing, in accordance with some embodiments.

In further embodiments, the multiprocessor system 3500 may include an interrupt input module 4102 (as shown in FIG. 41) communicatively coupled with the task scheduler 3502. Further, the interrupt input module 4102 may be configured for receiving an interrupt event from at least one of an input device and an output device. Further, the event may include the interrupt event.

Figure 42:
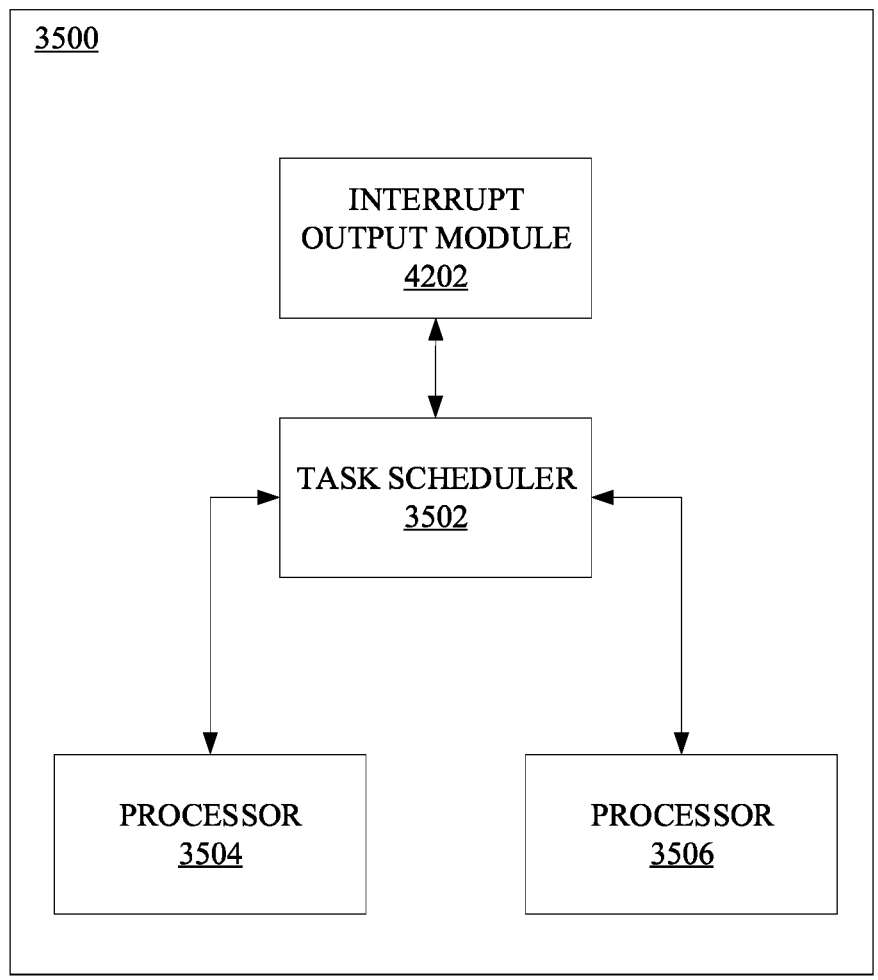
FIG. 42 is the multiprocessor system for facilitating real-time multitasking processing, in accordance with some embodiments.

In further embodiments, the multiprocessor system 3500 may include an interrupt output module 4202 (as shown in FIG. 42) communicatively coupled with the task scheduler 3502. Further, the interrupt output module 4202 may be configured for generating a processor interrupt. Further, the event may include the processor interrupt.

Figure 43:
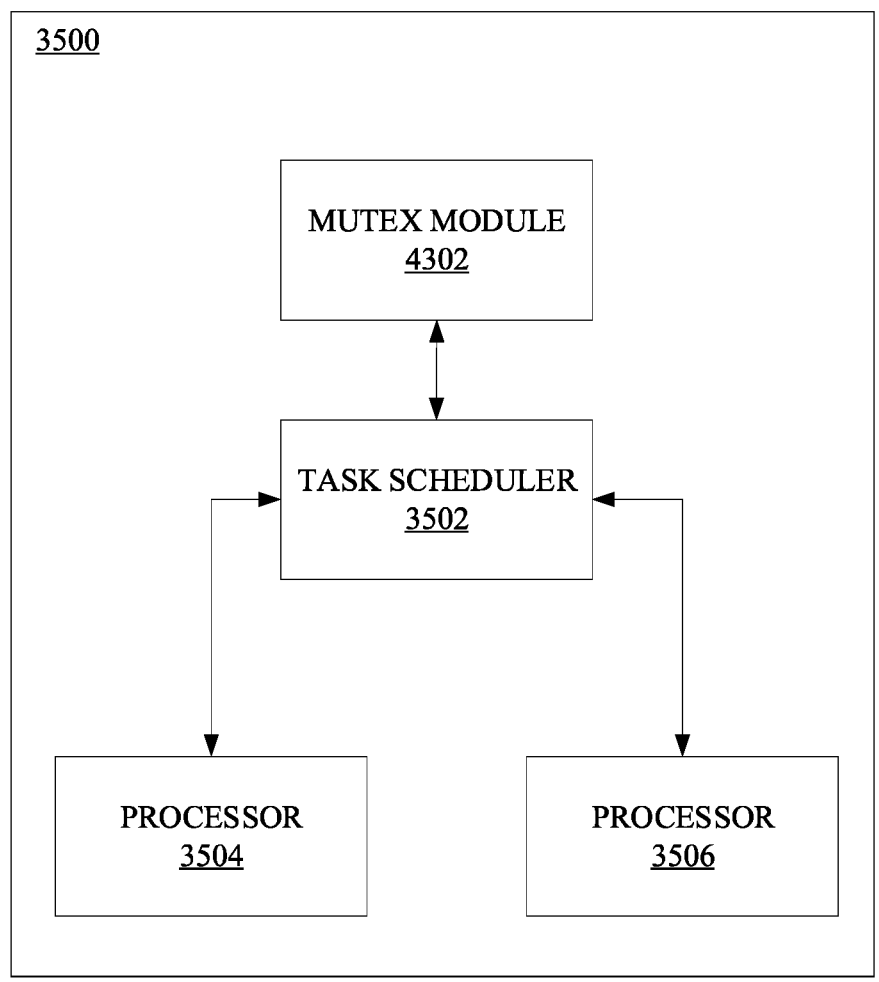
FIG. 43 is the multiprocessor system for facilitating real-time multitasking processing, in accordance with some embodiments.

In further embodiments, the multiprocessor system 3500 may include a mutex module 4302 (as shown in FIG. 43) communicatively coupled with the task scheduler 3502. Further, the mutex module 4302 employs a reservation method and an access mechanism for preserving a system consistency of the multiprocessor system 3500. Further, the mutex module 4302 may be configured for enabling a single processor of the plurality of processors 3504-3506 for the processing of a task of the plurality of tasks.

FIG. 36 is a multiprocessor system 3500 for facilitating real-time multitasking processing, in accordance with some embodiments.

FIG. 37 is a multiprocessor system 3500 for facilitating real-time multitasking processing, in accordance with some embodiments.

FIG. 38 is a multiprocessor system 3500 for facilitating real-time multitasking processing, in accordance with some embodiments.

Figure 39:
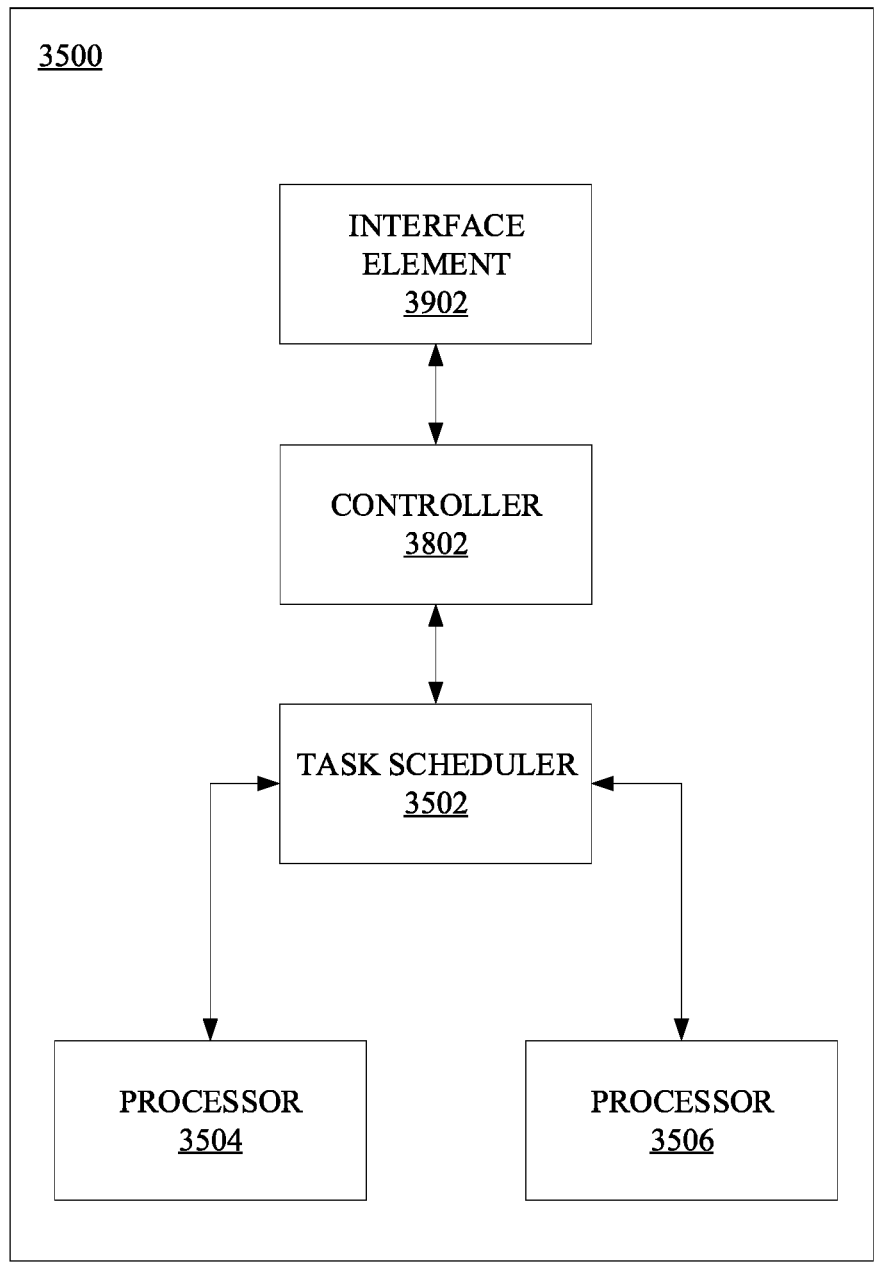
FIG. 39 is the multiprocessor system for facilitating real-time multitasking processing, in accordance with some embodiments.

FIG. 39 is a multiprocessor system 3500 for facilitating real-time multitasking processing, in accordance with some embodiments.

FIG. 40 is a multiprocessor system 3500 for facilitating real-time multitasking processing, in accordance with some embodiments.

FIG. 41 is a multiprocessor system 3500 for facilitating real-time multitasking processing, in accordance with some embodiments.

FIG. 42 is a multiprocessor system 3500 for facilitating real-time multitasking processing, in accordance with some embodiments.

FIG. 43 is a multiprocessor system 3500 for facilitating real-time multitasking processing, in accordance with some embodiments.

Figure 44:
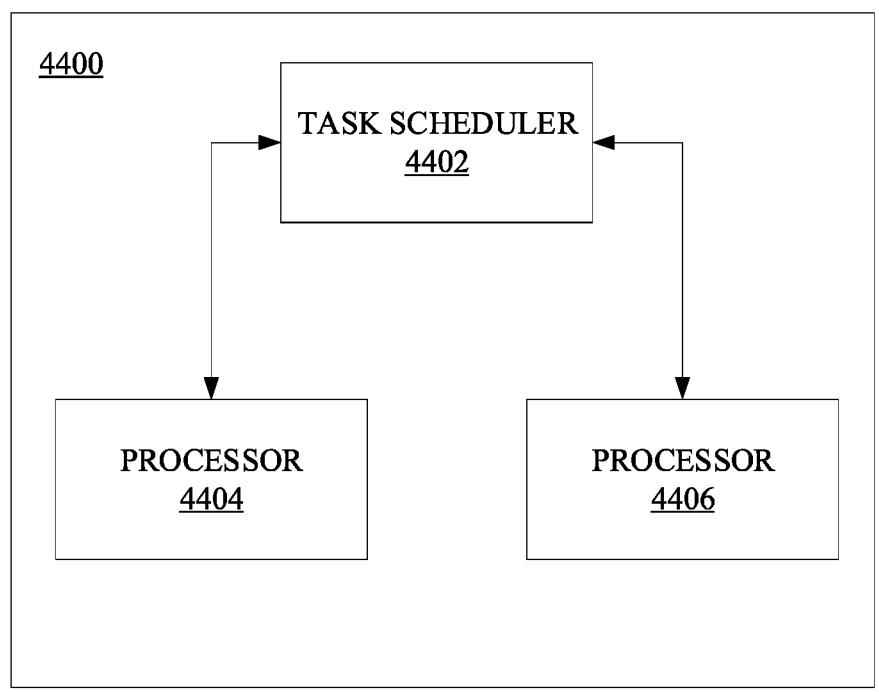
FIG. 44 is a multiprocessor system for facilitating real-time multitasking processing, in accordance with some embodiments.

FIG. 44 is a multiprocessor system 4400 for facilitating real-time multitasking processing, in accordance with some embodiments. Further, the multiprocessor system 4400 may include a task scheduler 4402 and a plurality of processors 4404-4406.

Further, the task scheduler 4402 may be configured for receiving a plurality of events associated with the multiprocessor system. Further, each event of the plurality of events may be associated with a plurality of event characteristics. Further, the task scheduler 4402 may be configured for analyzing the plurality of events. Further, the task scheduler 4402 may be configured for determining an event of the plurality of events based on the analyzing. Further, the task scheduler 4402 may be configured for evaluating a plurality of task priorities associated with a plurality of tasks based on the event. Further, the task scheduler 4402 may be configured for determining a plurality of new task priorities for the plurality of tasks. Further, the task scheduler 4402 may be configured for assigning the plurality of tasks to a plurality of lists based on the determining.

Further, the task scheduler 4402 may include a dedicated processor for scheduling tasks for the plurality of processors.

Further, in some embodiments, a task of the plurality of tasks may be associated with a task state of a plurality of task states. Further, the processor may be configured for updating the task state of the task based on the processing. Further, the processor may be configured for generating the event based on the updating.

Further, the plurality of processors 4404-4406 may be communicatively coupled with the task scheduler 4402. Further, the plurality of processors 4404-4406 serves the plurality of lists. Further, a processor of the plurality of processors 4404-4406 may be configured for processing the plurality of tasks assigned to a list of the plurality of lists based on the plurality of new task priorities.

Figure 45:
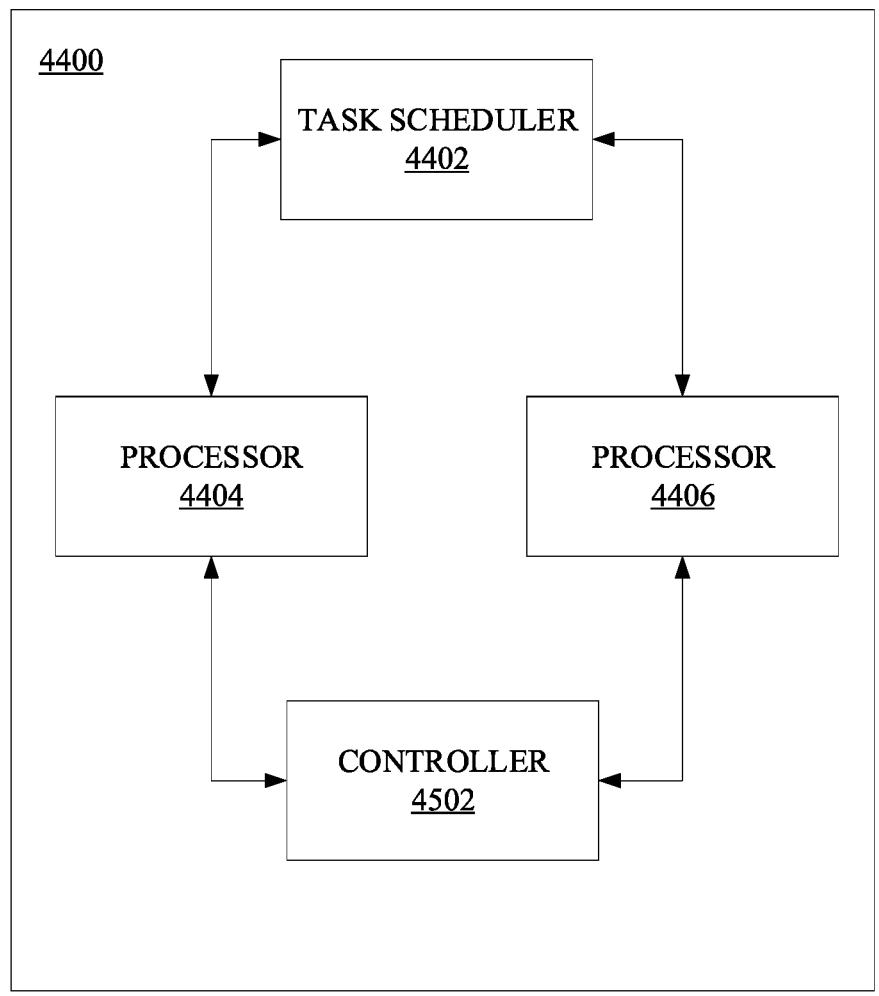
FIG. 45 is the multiprocessor system for facilitating real-time multitasking processing, in accordance with some embodiments.

In further embodiments, the multiprocessor system 4400 may include a controller 4502 (as shown in FIG. 45) communicatively coupled with the plurality of processors 4404-4406 and the task scheduler 4402. Further, the controller 4502 may be configured for managing the event.

Figure 46:
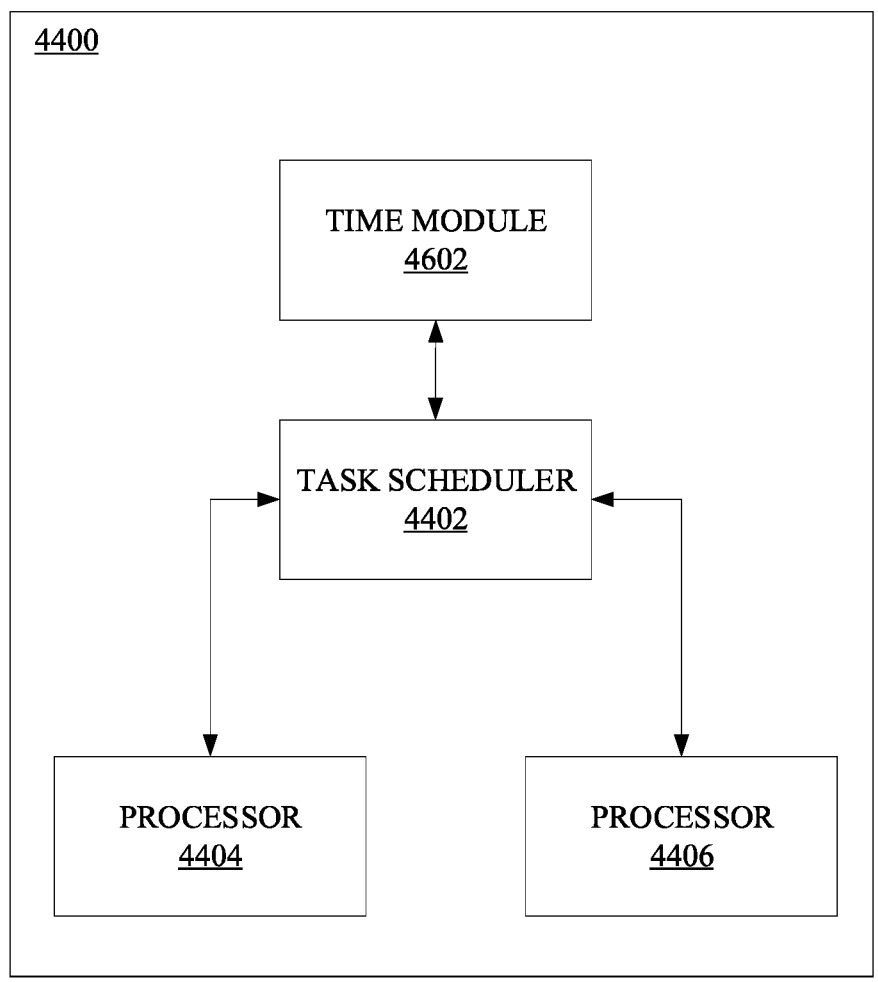
FIG. 46 is the multiprocessor system for facilitating real-time multitasking processing, in accordance with some embodiments.

In further embodiments, the multiprocessor system 4400 may include a time module 4602 (as shown in FIG. 46) communicatively coupled with the task scheduler 4402. Further, the time module 4602 may be configured for generating a time event. Further, the event may include the time event.

Figure 47:
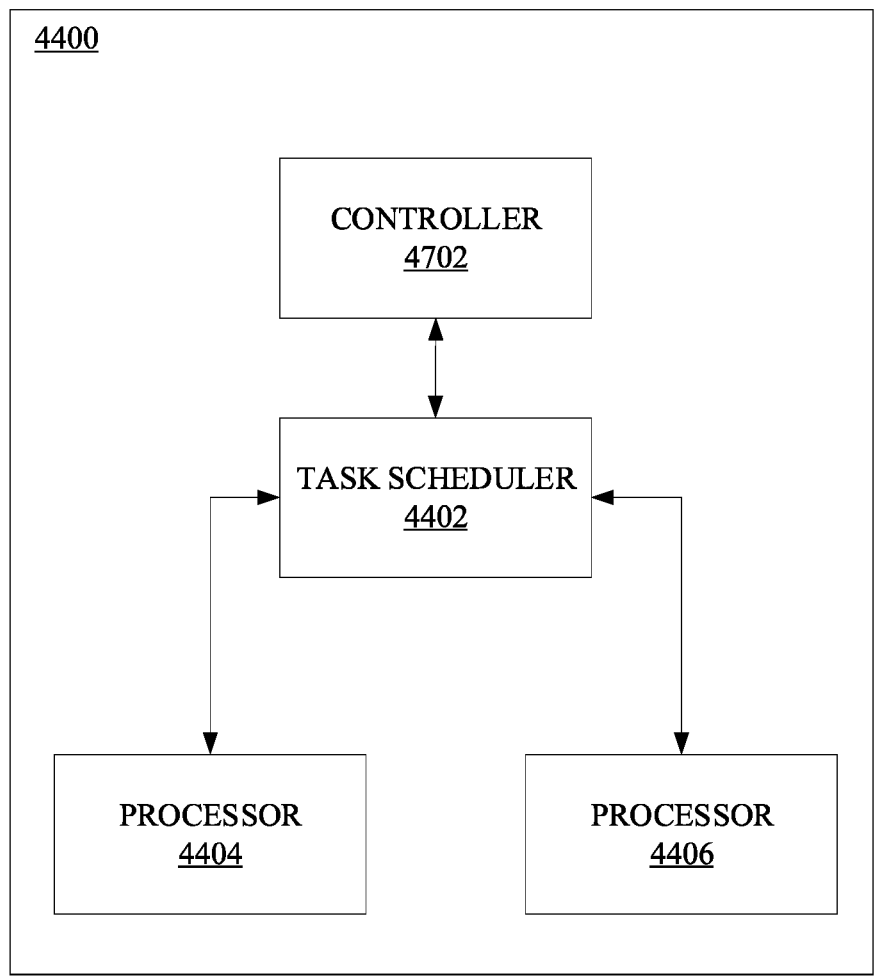
FIG. 47 is the multiprocessor system for facilitating real-time multitasking processing, in accordance with some embodiments.

In further embodiments, the multiprocessor system 4400 may include a controller 4702 (as shown in FIG. 47) communicatively coupled with the task scheduler 4402. Further, the controller 4702 may be associated with a mode. Further, the mode may include a frozen mode and an unfrozen mode. Further, the task scheduler 4402 may be configured for receiving the event based on the mode. Further, the frozen mode inhibits the receiving of the event and the unfrozen mode allows the receiving of the event.

Figure 48:
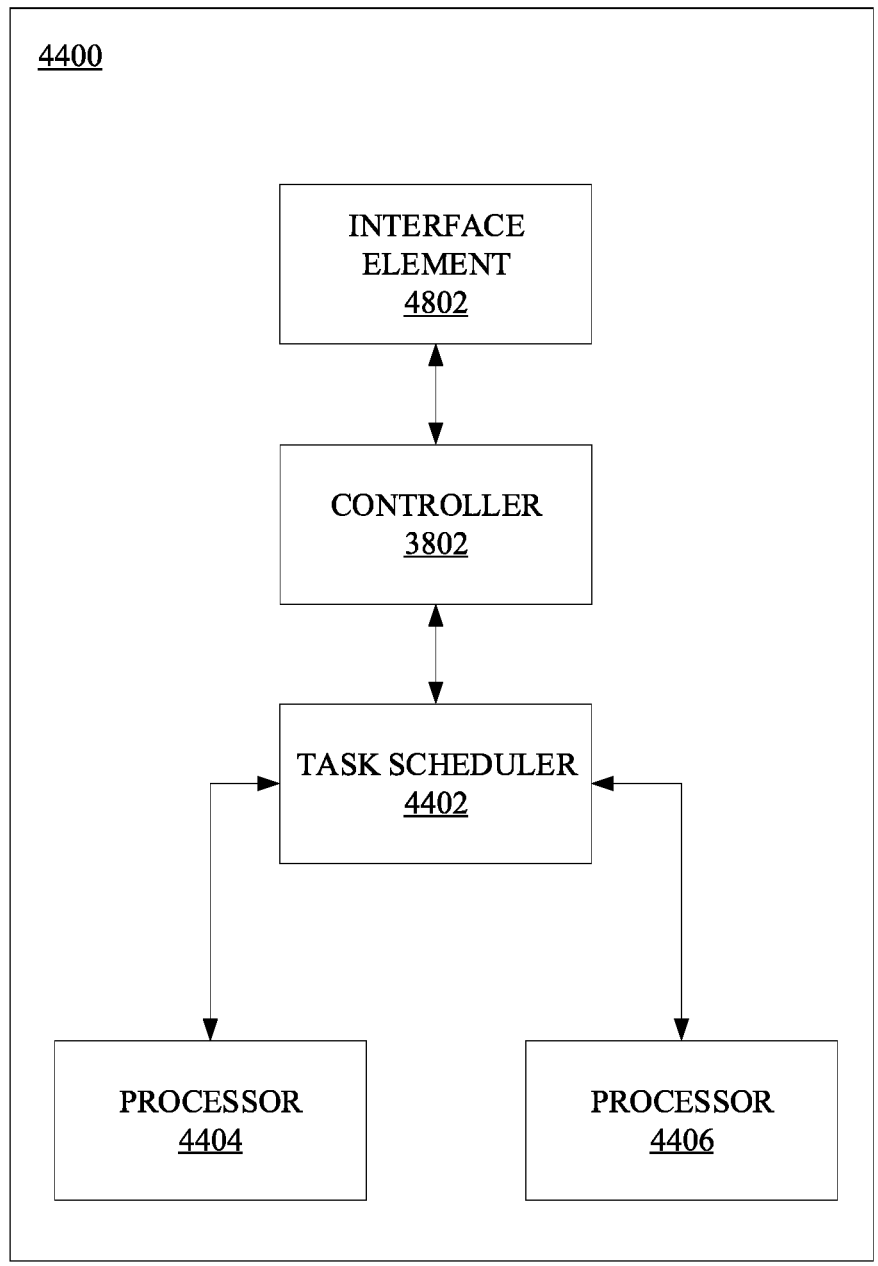
FIG. 48 is the multiprocessor system for facilitating real-time multitasking processing, in accordance with some embodiments.
Figure 49:
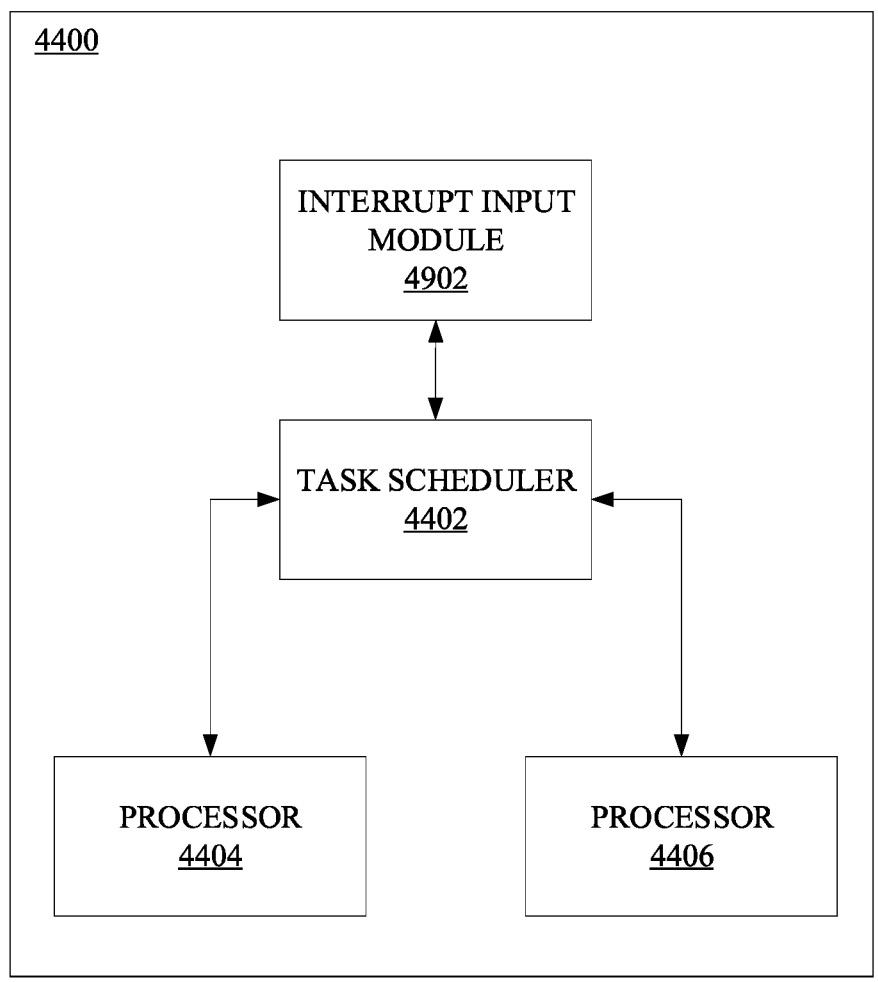
FIG. 49 is the multiprocessor system for facilitating real-time multitasking processing, in accordance with some embodiments.

In further embodiments, the multiprocessor system 4400 may include an interface element 4802 (as shown in FIG. 48) communicatively coupled with the controller 4702. Further, the interface element 4802 may be configured for receiving an interface command Further, the controller 4702 may be configured for transitioning between the frozen mode and the unfrozen mode based on the interface command In further embodiments, the multiprocessor system 4400 may include an interrupt input module 4902 (as shown in FIG. 49) communicatively coupled with the task scheduler 4402. Further, the interrupt input module 4902 may be configured for receiving an interrupt event from at least one of an input device and an output device. Further, the event may include the interrupt event.

Figure 50:
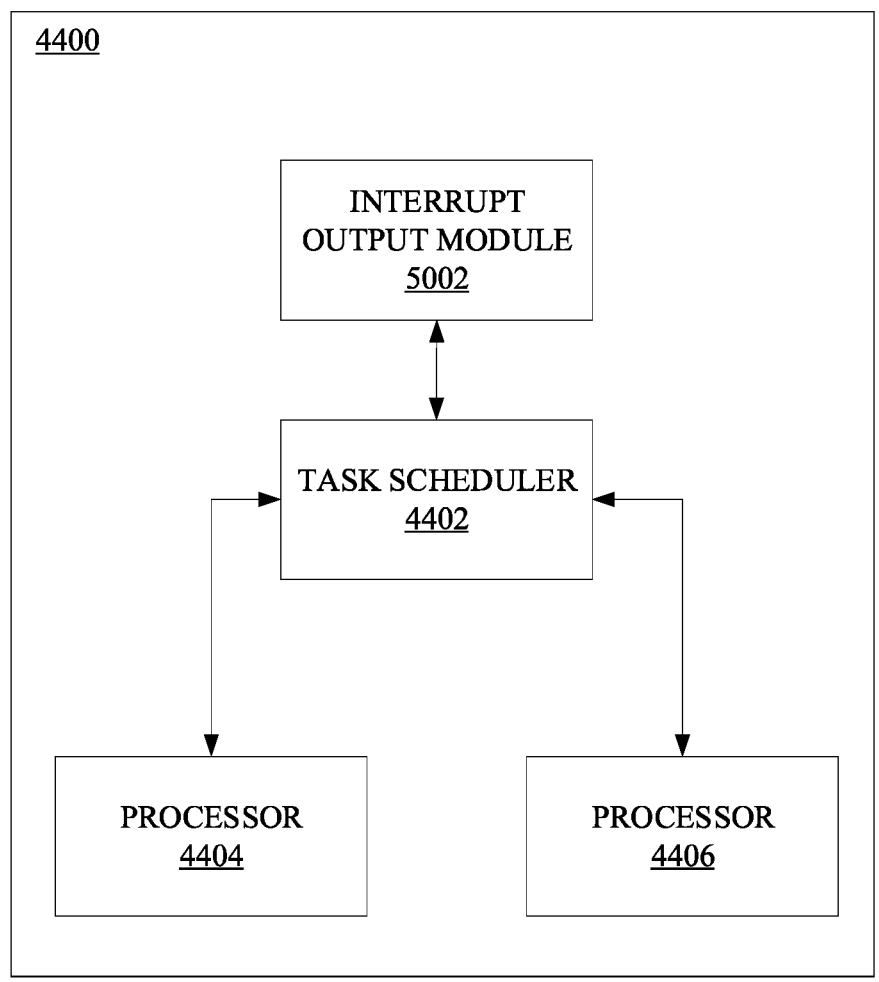
FIG. 50 is the multiprocessor system for facilitating real-time multitasking processing, in accordance with some embodiments.

In further embodiments, the multiprocessor system 4400 may include an interrupt output module 5002 (as shown in FIG. 50) communicatively coupled with the task scheduler 4402. Further, the interrupt output module 5002 may be configured for generating a processor interrupt. Further, the event may include the processor interrupt.

Figure 51:
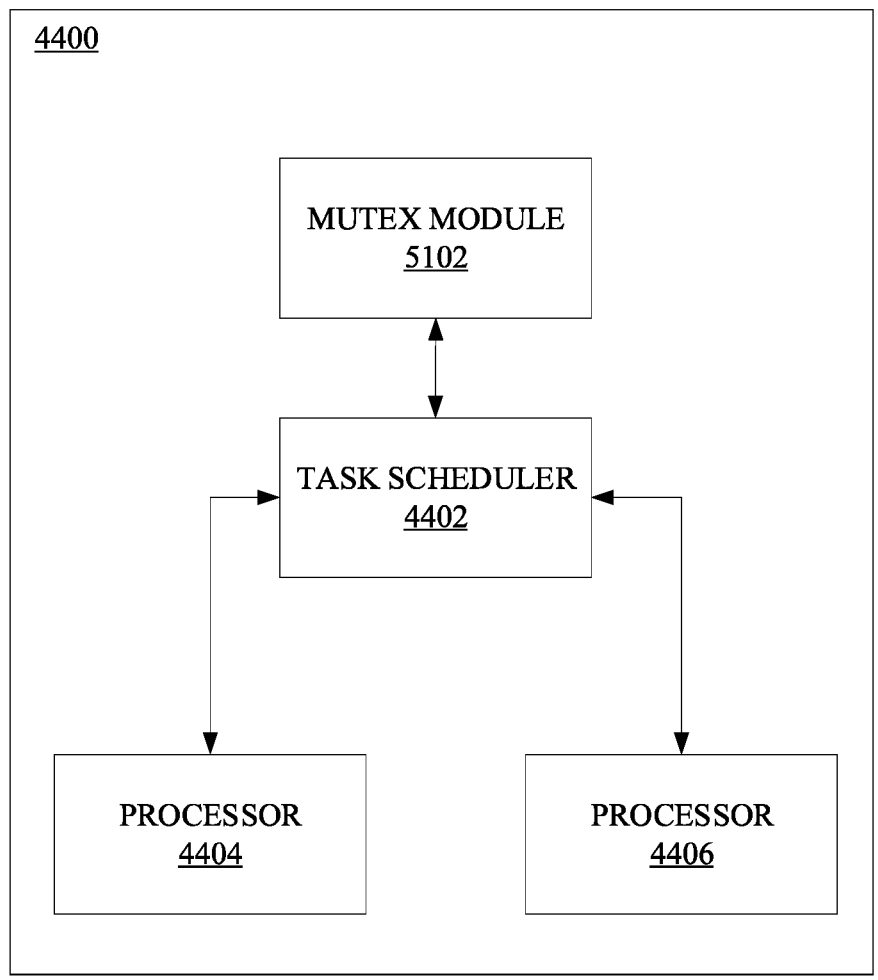
FIG. 51 is the multiprocessor system for facilitating real-time multitasking processing, in accordance with some embodiments.

In further embodiments, the multiprocessor system 4400 may include a mutex module 5102 (as shown in FIG. 51) communicatively coupled with the task scheduler 4402. Further, the mutex module 5102 employs a reservation method and an access mechanism for preserving a system consistency of the multiprocessor system. Further, the mutex module 5102 may be configured for enabling a single processor of the plurality of processors 4404-4406 for the processing of a task of the plurality of tasks.

FIG. 45 is a multiprocessor system 4400 for facilitating real-time multitasking processing, in accordance with some embodiments.

FIG. 46 is a multiprocessor system 4400 for facilitating real-time multitasking processing, in accordance with some embodiments.

FIG. 47 is a multiprocessor system 4400 for facilitating real-time multitasking processing, in accordance with some embodiments.

FIG. 48 is a multiprocessor system 4400 for facilitating real-time multitasking processing, in accordance with some embodiments.

FIG. 49 is a multiprocessor system 4400 for facilitating real-time multitasking processing, in accordance with some embodiments.

FIG. 50 is a multiprocessor system 4400 for facilitating real-time multitasking processing, in accordance with some embodiments.

FIG. 51 is a multiprocessor system 4400 for facilitating real-time multitasking processing, in accordance with some embodiments.

Figure 52:
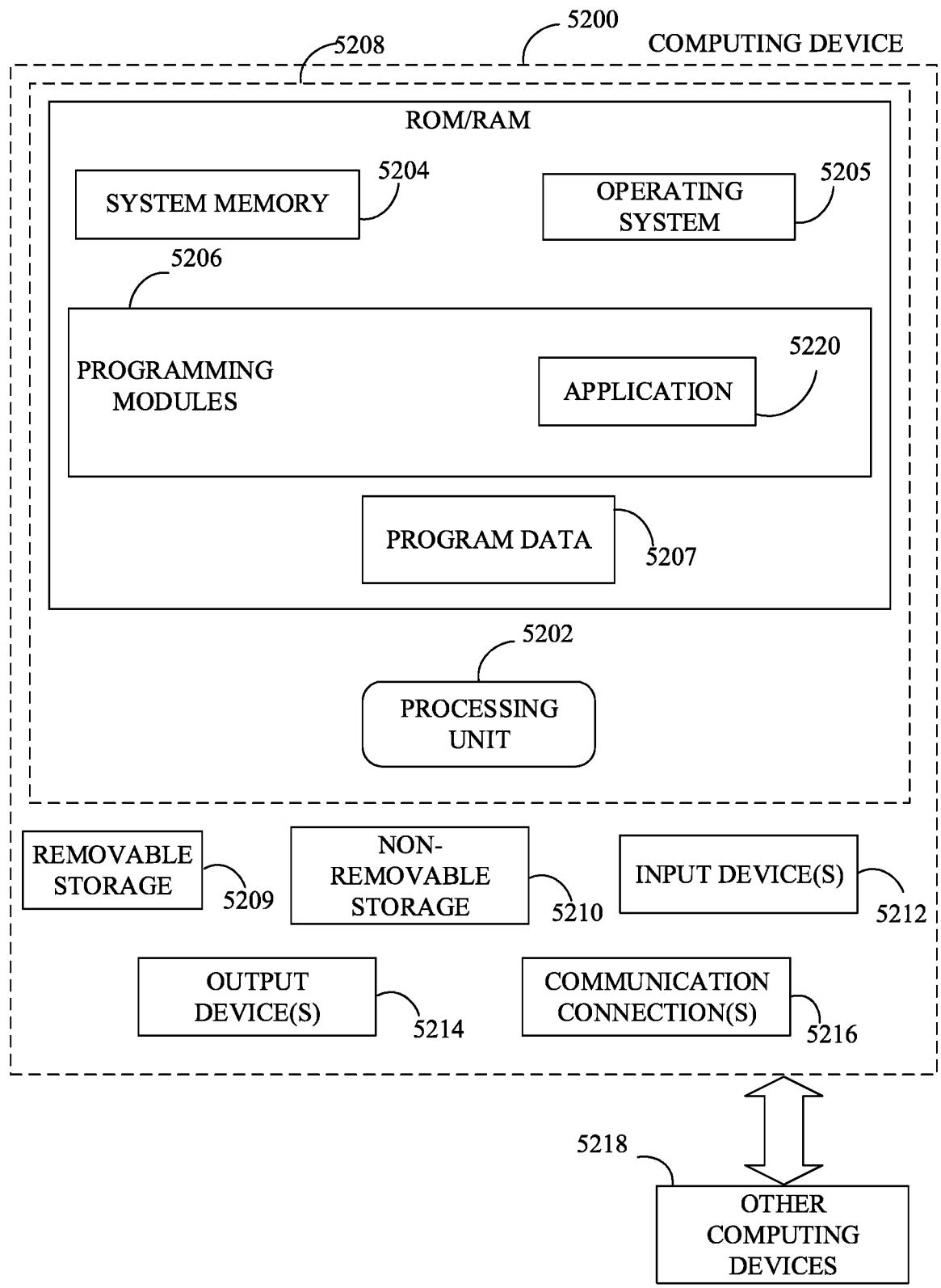
FIG. 52 is a block diagram of a computing device for implementing the methods disclosed herein, in accordance with some embodiments.

With reference to FIG. 52, a system consistent with an embodiment of the disclosure may include a computing device or cloud service, such as computing device 5200. In a basic configuration, computing device 5200 may include at least one processing unit 5202 and a system memory 5204. Depending on the configuration and type of computing device, system memory 5204 may comprise, but is not limited to, volatile (e.g. random-access memory (RAM)), non-volatile (e.g. read-only memory (ROM)), flash memory, or any combination. System memory 5204 may include operating system 5205, one or more programming modules 5206, and may include a program data 5207. Operating system 5205, for example, may be suitable for controlling computing device 5200's operation. In one embodiment, programming modules 5206 may include image-processing module, machine learning module. Furthermore, embodiments of the disclosure may be practiced in conjunction with a graphics library, other operating systems, or any other application program and is not limited to any particular application or system. This basic configuration is illustrated in FIG. 52 by those components within a dashed line 5208.

Computing device 5200 may have additional features or functionality. For example, computing device 5200 may also include additional data storage devices (removable and/or non-removable) such as, for example, magnetic disks, optical disks, or tape. Such additional storage is illustrated in FIG. 52 by a removable storage 5209 and a non-removable storage 5210. Computer storage media may include volatile and non-volatile, removable and non-removable media implemented in any method or technology for storage of information, such as computer-readable instructions, data structures, program modules, or other data. System memory 5204, removable storage 5209, and non-removable storage 5210 are all computer storage media examples (i.e., memory storage.). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 5200. Any such computer storage media may be part of device 5200. Computing device 5200 may also have input device(s) 5212 such as a keyboard, a mouse, a pen, a sound input device, a touch input device, a location sensor, a camera, a biometric sensor, etc. Output device(s) 5214 such as a display, speakers, a printer, etc. may also be included. The aforementioned devices are examples and others may be used.

Computing device 5200 may also contain a communication connection 5216 that may allow device 5200 to communicate with other computing devices 5218, such as over a network in a distributed computing environment, for example, an intranet or the Internet. Communication connection 5216 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 5204, including operating system 5205. While executing on processing unit 5202, programming modules 5206 (e.g., application 5220 such as a media player) may perform processes including, for example, one or more stages of methods, algorithms, systems, applications, servers, databases as described above. The aforementioned process is an example, and processing unit 5202 may perform other processes.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies.

Embodiments of the disclosure, for example, may be implemented as a hardware controller and a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and in software (including firmware, resident software, microcode, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

ASPECTS

1. A controller apparatus hardware for managing time events and device requests in a multiprocessor system, comprising a set of registers, a mutex module, a time module, an interrupt input module, an interrupt output module, an event module, whereby said set of registers will configure said controller apparatus hardware to produce time events by said time module, internals events by said event module, managing interrupt events by said interrupt input module and produce processors interrupts trough said interrupt output module, controlling mutual exclusion implementing a critical section using said mutex module.
2. The controller apparatus hardware of aspect 1, wherein said set of registers comprises the configuration and management of all the hardware events produced in the multiprocessor system.
3. The controller apparatus hardware of aspect 1, wherein said mutex module comprises a reservation method and access mechanism of a mutex register to preserve the system consistency, enabling only one processor at a time to execute the critical section of the computer program and determining the strategy to avoid ties when more than one processor request access to the critical section simultaneously.
4. The controller apparatus hardware of aspect 1, wherein said time module comprises:
    a time counting register that produces the time information to trigger the time events; and
    a frozen time counting register that freezes said time counting register when time events cannot be processed before the configured frozen threshold time.
5. The controller apparatus hardware of aspect 1, wherein said interrupt input module receives interrupt requests from the devices that demand the execution of the respective interrupt service routines.
6. The controller apparatus hardware of aspect 1, wherein said interrupt output module asserts interrupt processor requests.
7. The controller apparatus hardware of aspect 1, wherein said event module comprises the mechanism to determine the next event to be processed by a processor executing the interrupt handler routine.
8. Data structures for holding the information of the computing system, comprising a Kernel Control Block, Task Control Blocks, Event Control Blocks, Resource Control Blocks, Signal Control Blocks, List Control Blocks, Processor Control Blocks.
9. Linked lists of control blocks of aspect 8 to hold the state of the computing system.
10. A method for managing the controller apparatus hardware of aspect 1; data structures of aspect 8; and linked lists of aspect 9 in a computing system, comprising:
    receiving interrupt requests from the controller apparatus hardware of claim 1;
    configuring the controller apparatus hardware of claim 1 to produce programmable event requests, and granting the critical section, and updating said data structures of claim 8 and said linked list of claim 9, preserving system consistency;

managing resource synchronization and signaling events.

11. The method of aspect 10, wherein comprising the initialization code, the system call code, the interrupt handler code and the task switching code that are executed in critical section and modified said data structures and said linked list to update the multiprocessor system status.

12. A computer program that implements the method of aspect 10 for a multiprocessor operating system in a timer tickless manner 13. The computer program of aspect 12, wherein the improvement comprises:
an efficient mechanism to handle time events in a timer tickless manner,
a multiple ready and running lists that shares the processors among the tasks of the system.

14. The computer program of aspect 11, wherein said ready and running lists may implement different priority disciplines over each one of said ready and running lists.

The following is claimed:

1. A multiprocessor system for facilitating real-time multitasking processing, the multiprocessor system comprising:
a task scheduler configured for:
receiving an event associated with the multiprocessor system;
evaluating a plurality of task priorities associated with a plurality of tasks based on the event;
determining a plurality of new task priorities for the plurality of tasks; and
assigning the plurality of tasks to a plurality of lists based on the determining;
a controller communicatively coupled with the task scheduler, wherein the controller is associated with a mode, wherein the mode comprises a frozen mode and an unfrozen mode, wherein the task scheduler is configured for receiving the event based on the mode, wherein the frozen mode inhibits the receiving of the event and the unfrozen mode allows the receiving of the event; and
a plurality of processors communicatively coupled with the task scheduler, wherein the plurality of processors serves the plurality of lists, wherein a processor of the plurality of processors is configured for processing the plurality of tasks assigned to a list of the plurality of lists based on the plurality of new task priorities.

2. The multiprocessor system of claim 1, wherein a task of the plurality of tasks is associated with a task state of a plurality of task states, wherein the processor is configured for:
updating the task state of the task based on the processing; and
generating the event based on the updating.

3. The multiprocessor system of claim 1 further comprising a controller communicatively coupled with the plurality of processors and the task scheduler, wherein the controller is configured for managing the event.

4. The multiprocessor system of claim 1 further comprising a time module communicatively coupled with the task scheduler, wherein the time module is configured for generating a time event, wherein the event comprises the time event.

5. The multiprocessor system of claim 1 further comprising an interface element communicatively coupled with the controller, wherein the interface element is configured for receiving an interface command, wherein the controller is configured for transitioning between the frozen mode and the unfrozen mode based on the interface command.

6. The multiprocessor system of claim 1 further comprising an event module communicatively coupled with the task scheduler, wherein the event module is configured for sorting at least two events associated with the multiprocessor system in at least one order, wherein the task scheduler is configured for receiving an event of the at least two events based on the at least one order.

7. The multiprocessor system of claim 1 further comprising an interrupt input module communicatively coupled with the task scheduler, wherein the interrupt input module is configured for receiving an interrupt event from at least one of an input device and an output device, wherein the event comprises the interrupt event.

8. The multiprocessor system of claim 1 further comprising an interrupt output module communicatively coupled with the task scheduler, wherein the interrupt output module is configured for generating a processor interrupt, wherein the event comprises the processor interrupt.

9. The multiprocessor system of claim 1 further comprising a mutex module communicatively coupled with the task scheduler, wherein the mutex module employs a reservation method and an access mechanism for preserving a system consistency of the multiprocessor system, wherein the mutex module is configured for enabling a single processor of the plurality of processors for the processing of a task of the plurality of tasks.

10. The multiprocessor system of claim 1, wherein the event comprises a plurality of events, wherein each event of the plurality of events is characterized by a plurality of event characteristics, wherein the task scheduler is configured for:
analyzing the plurality of events; and
determining an event of the plurality of events based on the analyzing, wherein the evaluating of the plurality of task priorities associated with the plurality of tasks is based on the event.

11. A multiprocessor system for facilitating real-time multitasking processing, the multiprocessor system comprising:
a task scheduler configured for:
receiving a plurality of events associated with the multiprocessor system, wherein each event of the plurality of events is associated with a plurality of event characteristics;
analyzing the plurality of events;
determining an event of the plurality of events based on the analyzing;
evaluating a plurality of task priorities associated with a plurality of tasks based on the event;
determining a plurality of new task priorities for the plurality of tasks; and
assigning the plurality of tasks to a plurality of lists based on the determining;
a controller communicatively coupled with the task scheduler, wherein the controller is associated with a mode, wherein the mode comprises a frozen mode and an unfrozen mode, wherein the task scheduler is configured for receiving the event based on the mode, wherein the frozen mode inhibits the receiving of the event and the unfrozen mode allows the receiving of the event; and
a plurality of processors communicatively coupled with the task scheduler, wherein the plurality of processors serves the plurality of lists, wherein a processor of the plurality of processors is configured for processing the plurality of tasks assigned to a list of the plurality of lists based on the plurality of new task priorities.

12. The multiprocessor system of claim 11, wherein a task of the plurality of tasks is associated with a task state of a plurality of task states, wherein the processor is configured for:
updating the task state of the task based on the processing; and
generating the event based on the updating.

13. The multiprocessor system of claim 11 further comprising a controller communicatively coupled with the plurality of processors and the task scheduler, wherein the controller is configured for managing the event.

14. The multiprocessor system of claim 11 further comprising a time module communicatively coupled with the task scheduler, wherein the time module is configured for generating a time event, wherein the event comprises the time event.

15. The multiprocessor system of claim 11 further comprising an interface element communicatively coupled with the controller, wherein the interface element is configured for receiving an interface command, wherein the controller is configured for transitioning between the frozen mode and the unfrozen mode based on the interface command.

16. The multiprocessor system of claim 11 further comprising an interrupt input module communicatively coupled with the task scheduler, wherein the interrupt input module is configured for receiving an interrupt event from at least one of an input device and an output device, wherein the event comprises the interrupt event.

17. The multiprocessor system of claim 11 further comprising an interrupt output module communicatively coupled with the task scheduler, wherein the interrupt output module is configured for generating a processor interrupt, wherein the event comprises the processor interrupt.

18. The multiprocessor system of claim 11 further comprising a mutex module communicatively coupled with the task scheduler, wherein the mutex module employs a reservation method and an access mechanism for preserving a system consistency of the multiprocessor system, wherein the mutex module is configured for enabling a single processor of the plurality of processors for the processing of a task of the plurality of tasks.

* * * * *